United States Patent
Kim et al.

(10) Patent No.: US 11,849,460 B2
(45) Date of Patent: Dec. 19, 2023

(54) METHODS AND APPARATUS FOR MANAGING A BANDWIDTH PART

(71) Applicant: Samsung Electronics Co., Ltd., Suwon-si (KR)

(72) Inventors: Donggun Kim, Suwon-si (KR); Taehyoung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 9 days.

(21) Appl. No.: 17/168,741

(22) Filed: Feb. 5, 2021

(65) Prior Publication Data
US 2021/0250920 A1    Aug. 12, 2021

(30) Foreign Application Priority Data
Feb. 6, 2020  (KR) ........................ 10-2020-0014523

(51) Int. Cl.
*H04W 76/27* (2018.01)
*H04L 5/00* (2006.01)
(Continued)

(52) U.S. Cl.
CPC ............. *H04W 72/23* (2023.01); *H04L 5/001* (2013.01); *H04L 5/0098* (2013.01);
(Continued)

(58) Field of Classification Search
CPC ........... H04W 72/042; H04W 72/0453; H04W 76/27; H04W 76/28; H04W 76/38;
(Continued)

(56) References Cited

U.S. PATENT DOCUMENTS

2020/0396684 A1* 12/2020 Lin ...................... H04W 24/10
2021/0051584 A1*  2/2021 Cheng ................ H04W 72/048
(Continued)

FOREIGN PATENT DOCUMENTS

EP          3 567 791 A1   11/2019
WO    WO-2015023128 A1 *  2/2015  ........... H04B 7/2603

OTHER PUBLICATIONS

English translation of WO-2015023128-A1, 2015, retrieved from PE2E Search dated Feb. 22, 2023 (Year: 2015).*

(Continued)

*Primary Examiner* — Omar J Ghowrwal
(74) *Attorney, Agent, or Firm* — Jefferson IP Law, LLP

(57) ABSTRACT

A terminal for managing a bandwidth part in a wireless communication system is provided. The terminal includes a transceiver and at least one processor configured to receive, from a base station, a first radio resource control (RRC) message including a bandwidth part (BWP) configuration, receive, from the base station, downlink control information including a bitmap indicating whether each of at least one downlink (DL) BWP is activated as a first BWP or a second BWP, wherein the first BWP is configured with a non-dormant BWP in the first RRC message, and the second BWP is configured with a dormant BWP in the first RRC message, when a first bit of the bitmap is 0, determine an active DL BWP corresponding to the first bit as the second BWP, and when the first bit of the bitmap is 1, determine whether a current active DL BWP corresponding to the first bit is the second BWP, when the current active DL BWP is the second BWP, set the current active DL BWP to the first BWP, and when the current active DL BWP is not the second BWP, determine to maintain the current active DL BWP.

13 Claims, 16 Drawing Sheets

(51) Int. Cl.
  *H04W 72/23*     (2023.01)
  *H04W 72/0453*   (2023.01)
  *H04W 72/53*     (2023.01)
  *H04W 76/38*     (2018.01)
  *H04W 76/28*     (2018.01)

(52) U.S. Cl.
  CPC ....... *H04W 72/0453* (2013.01); *H04W 72/53* (2023.01); *H04W 76/27* (2018.02); *H04W 76/28* (2018.02); *H04W 76/38* (2018.02)

(58) Field of Classification Search
  CPC . H04W 72/0493; H04W 72/23; H04W 72/53; H04L 5/001; H04L 5/0098
  See application file for complete search history.

(56) References Cited

U.S. PATENT DOCUMENTS

| | | | |
|---|---|---|---|
| 2021/0051640 A1* | 2/2021 | Pao | H04W 72/21 |
| 2021/0176030 A1* | 6/2021 | Tsai | H04B 7/0626 |

OTHER PUBLICATIONS

U.S. Appl. No. 62/945,005, filed 2019, retrieved from PE2E Search dated Feb. 25, 2023 (Year: 2019).*
ZTE Corporation, Discussion on low latency SCell activation, R1-1911972, 3GPP TSG RAN WG1 Meeting #99, Nov. 9, 2019, Reno, USA.
Qualcomm Incorporated, SCell Dormancy and Fast SCell Activation, R1-1912980, 3GPP TSG-RAN WG1 #99, Nov. 9, 2019, Reno, USA.
3rd Generation Partnership Project; Technical Specification Group Radio Access Network; NR; Multiplexing and channel coding (Release 16), 3GPP TS 38.212 V16.0.0, Jan. 11, 2020.
Vivo, Fast Scell activation and dormancy like behavior, R1-1912055, 3GPP TSG RAN WG1 #99, Nov. 8, 2019, Reno, USA.
Qualcomm Incorporated, Offline discussion summary of UL dormancy behaviour, R2-1916581, 3GPP TSG RAN WG2 Meeting #108, Nov. 23, 2019, Reno, Nevada, US.
International Search Report dated Apr. 22, 2021, issued in International Application No. PCT/KR2021/001552.
Ericsson, "Reduced latency Scell management for NR CA"; 3GPP Draft; R1-1912786; 3rd Generation Partnership Project (3GPP), Mobile Competence Center; 650, Route Des Lucioles; F-06921 Sophia-Antipolis Cedex; France.
Extended European Search Report dated Nov. 8, 2022, issued in European Patent Application No. 21750218.6-1215.

* cited by examiner

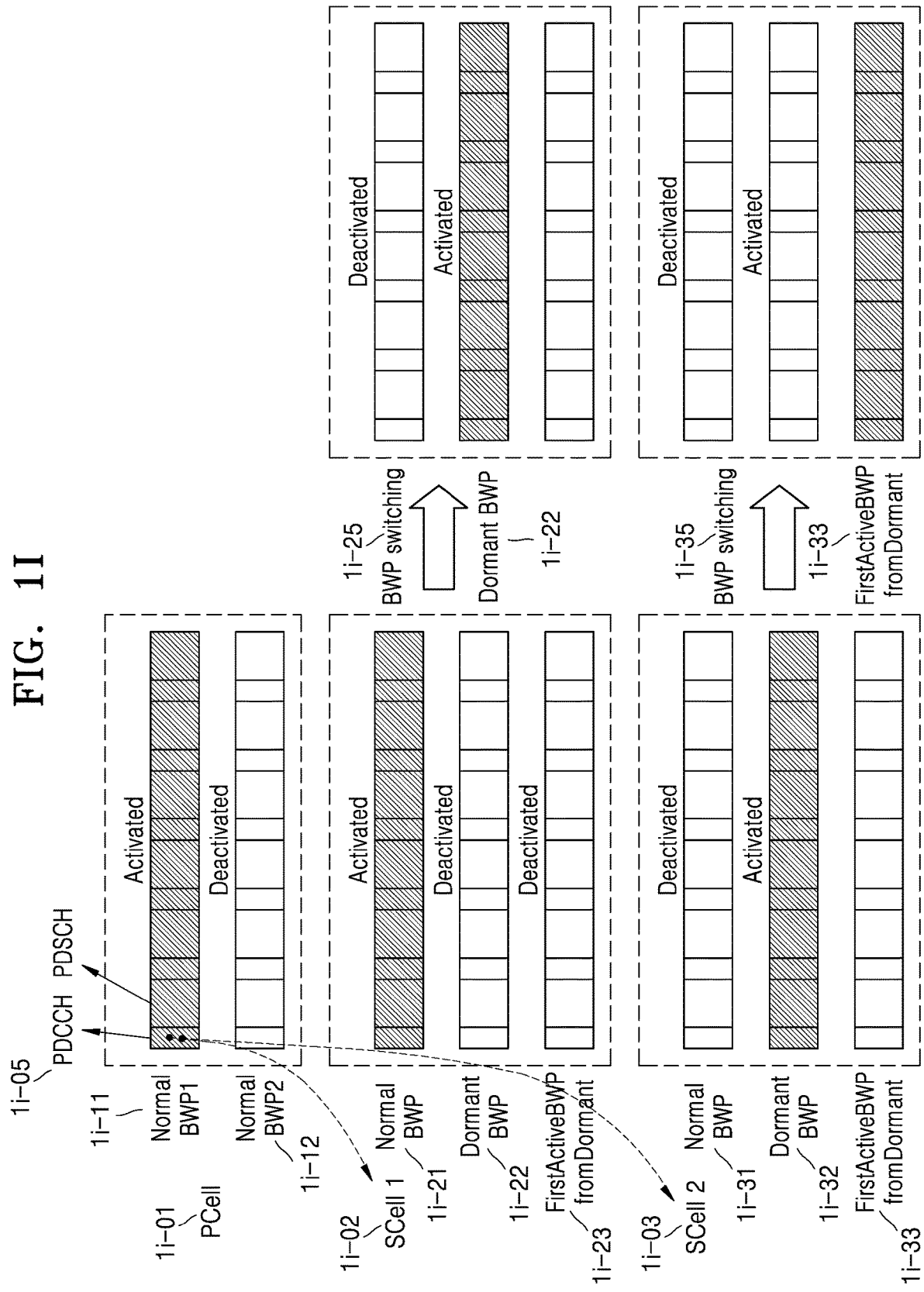

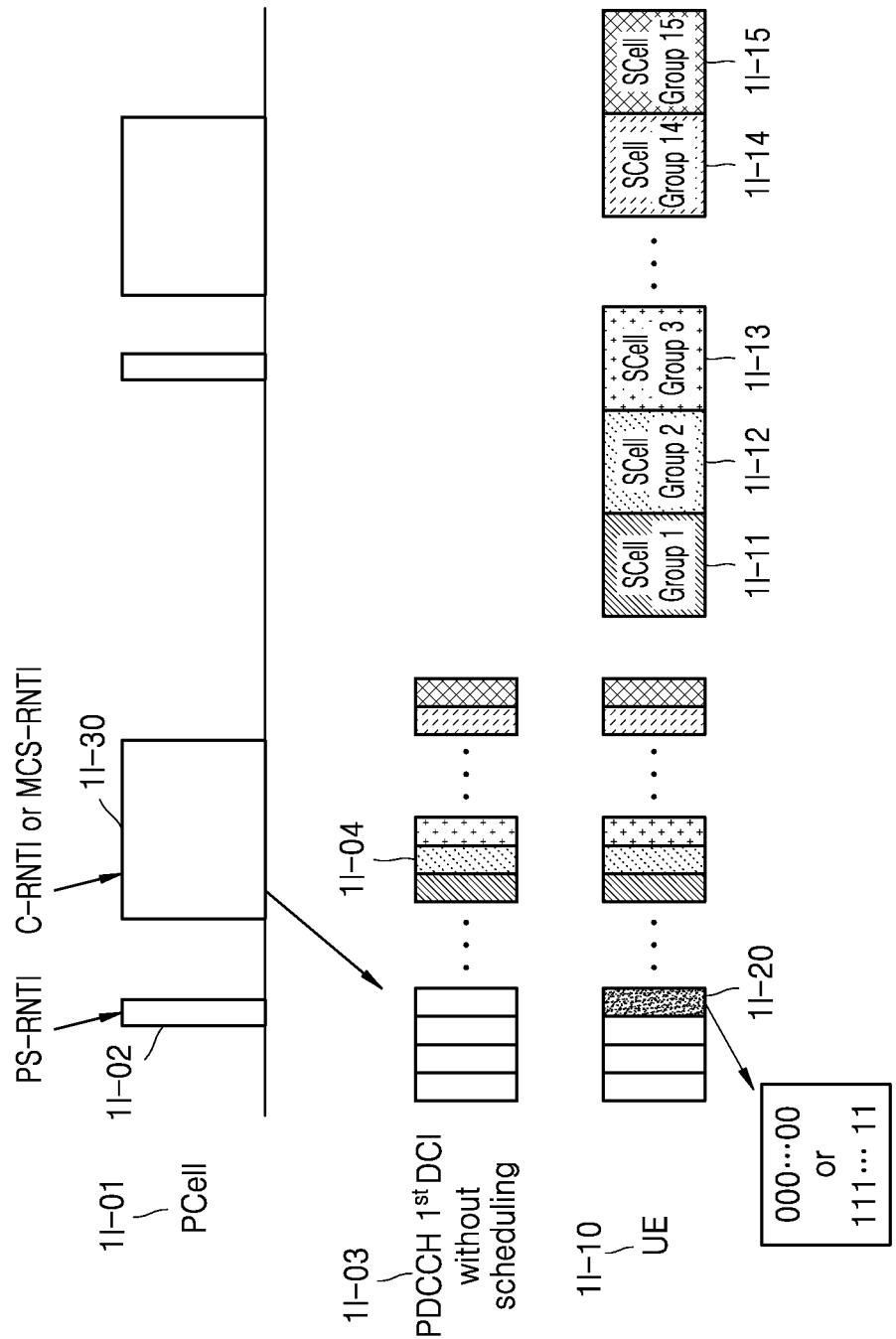

METHODS AND APPARATUS FOR MANAGING A BANDWIDTH PART

CROSS-REFERENCE TO RELATED APPLICATION(S)

This application is based on and claims priority under 35 U.S.C. § 119(a) of a Korean patent application number 10-2020-0014523, filed on Feb. 6, 2020, in the Korean Intellectual Property Office, the disclosure of which is incorporated by reference herein in its entirety.

BACKGROUND

1. Field

The disclosure relates to a method and an apparatus for configuring a bandwidth in a mobile communication system. More particularly, the disclosure relates to a method and an apparatus for efficiently operating a dormant bandwidth part (BWP) in a next-generation mobile communication system.

2. Description of Related Art

To meet increasing demand with respect to wireless data traffic after the commercialization of $4^{th}$ generation (4G) communication systems, efforts have been made to develop $5^{th}$ generation (5G) or pre-5G communication systems. For this reason, 5G or pre-5G communication systems are called 'beyond 4G network' communication systems or 'post Long Term Evolution (post-LTE)' systems. To achieve high data rates, implementation of 5G communication systems in an ultra-high frequency or millimeter-wave (mmWave) band (e.g., a 60 GHz band) is being considered. To reduce path loss of radio waves and increase a transmission distance of radio waves in the ultra-high frequency band for 5G communication systems, various technologies, such as beamforming, massive multiple-input and multiple-output (massive MIMO), full-dimension MIMO (FD-MIMO), array antennas, analog beamforming, and large-scale antennas are being studied. To improve system networks for 5G communication systems, various technologies, such as evolved small cells, advanced small cells, cloud radio access networks (cloud RAN), ultra-dense networks, device-to-device (D2D) communication, wireless backhaul, moving networks, cooperative communication, coordinated multi-points (CoMP), and interference cancellation have been developed. In addition, for 5G communication systems, advanced coding modulation (ACM) technologies, such as hybrid frequency-shift keying (FSK) and quadrature amplitude modulation (QAM) (FQAM) and sliding window superposition coding (SWSC), and advanced access technologies, such as filter bank multi-carrier (FBMC), non-orthogonal multiple access (NOMA), and sparse code multiple access (SCMA), have been developed.

The Internet has evolved from a human-based connection network, where humans create and consume information, to the Internet of things (IoT), where distributed elements, such as objects exchange information with each other to process the information. Internet of everything (IoE) technology has emerged, in which the IoT technology is combined with, for example, technology for processing big data through connection with a cloud server. To implement the IoT, various technological elements, such as sensing technology, wired/wireless communication and network infrastructure, service interface technology, and security technology are required and, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields, such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, and MTC are being implemented by using 5G communication technology including beamforming, MIMO, and array antennas. Application of a cloud RAN as the above-described big data processing technology may be an example of convergence of 5G communication technology and IoT technology.

Because various services may be provided according to the foregoing and the development of wireless communication systems, a scheme for operating a dormant bandwidth part (BWP) is required to efficiently provide such services.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus for configuring a bandwidth in a mobile communication system may be provided. More particularly, an aspect of the disclosure is to provide a method and an apparatus for efficiently operating a dormant bandwidth part (BWP) in a next-generation mobile communication system.

Additional aspects will be set forth in part in the description which follows and, in part, will be apparent from the description, or may be learned by practice of the presented embodiments.

In accordance with an aspect of the disclosure, a terminal for managing a bandwidth part in a wireless communication system is provided. The terminal includes a transceiver, and at least one processor configured to receive, from a base station, a first radio resource control (RRC) message including a bandwidth part (BWP) configuration, receive, from the base station, downlink control information (DCI) including a bitmap indicating whether each of at least one downlink (DL) BWP is activated as a first BWP or a second BWP, wherein the first BWP is configured with a non-dormant BWP in the first RRC message, and the second BWP is configured with a dormant BWP in the first RRC message, when a first bit of the bitmap is 0, determine an active DL BWP corresponding to the first bit as the second BWP, and when the first bit of the bitmap is 1, determine whether a current active DL BWP corresponding to the first bit is the second BWP, when the current active DL BWP is the second BWP, set the current active DL BWP to the first BWP, and when the current active DL BWP is not the second BWP, determine to maintain the current active DL BWP.

Each of bits of the bitmap may correspond to a secondary cell (SCell) group in ascending order of SCell group indices from most significant bit (MSB) to least significant bit (LSB), and each of the bits of the bitmap may indicate whether DL BWPs of SCells belonging to a corresponding SCell group are the first BWP or the second BWP.

Each bit of the bitmap indicating whether each of the at least one DL BWP is the first BWP or the second BWP may correspond to a SCell in ascending order of SCell indices from MSB to LSB.

Bits of the bitmap may be respectively mapped to SCells belonging to one cell group.

When the downlink control information is transmitted as a first format to one or more terminals via a wake up signal, a downlink control channel of the first format may be scrambled by power saving radio network temporary identity (PS-RNTI), when the downlink control information is transmitted as a second format to the terminal via discontinuous reception (DRX) active time, the downlink control channel may be scrambled by cell RNTI (C-RNTI), configured scheduling RNTI (CS-RNTI), semi-persistent channel state information RNTI (SP-CSI-RNTI) or modulation coding scheme cell RNTI (MCS-C-RNTI), and when the downlink control information is transmitted as a third format to the terminal via DRX active time, the downlink control channel may be scrambled by C-RNTI, or MCS-C-RNTI.

The least one processor may be further configured to identify that the downlink control information is transmitted as a third format, determine whether the downlink control information is scrambled by a C-RNTI or a MCS-C-RNTI, when the downlink control information is scrambled by the C-RNTI or the MCS-C-RNTI, identify all bits of a frequency domain resource assignment field are equal to 0 or 1, and determine that a subsequent field is a bitmap associated with SCell dormancy in case that all bits of the frequency domain resource assignment field are equal to 0 or 1, wherein the subsequent field includes a modulation and coding scheme field, a new data indicator field, a redundancy version field, a hybrid automatic repeat request (HARQ) process number filed, an antenna port field, and a demodulation reference signal (DMRS) sequence initialization field.

A downlink BWP may be configured with the dormant BWP, and an uplink BWP may not be configured with the dormant BWP.

In accordance with another aspect of the disclosure, a base station for managing a bandwidth part in a wireless communication system is provided. The base station includes a transceiver, and at least one processor configured to transmit, to a terminal, a first RRC message including a BWP configuration, and transmit, to the terminal, downlink control information including a bitmap indicating whether each of at least one DL BWP is a first BWP or a second BWP, wherein the first BWP is configured with a non-dormant BWP in the first RRC message, and the second BWP is configured with a dormant BWP in the first RRC message, wherein, when a first bit of the bitmap is 0, the first bit indicates that an active DL BWP corresponding to the first bit is the second BWP, wherein, when the first bit of the bitmap is 1 and a current active DL BWP corresponding to the first bit is the second BWP, the first bit indicates that the current active DL BWP is the first BWP, and wherein, when the first bit of the bitmap is 1 and the current active DL BWP is not the second BWP, the first bit indicates that the current active DL BWP is maintained.

Each of bits of the bitmap may correspond to a SCell group in ascending order of SCell group indices from MSB to LSB, and each of the bits of the bitmap may indicate whether DL BWPs of SCells belonging to a corresponding SCell group are the first BWP or the second BWP.

Each bit of the bitmap indicating whether each of the at least one DL BWP is the first BWP or the second BWP may correspond to a SCell in ascending order of SCell indices from MSB to LSB.

Bits of the bitmap may be respectively mapped to SCells belonging to one cell group.

When the downlink control information is transmitted as a first format to one or more terminals via a wake up signal, a downlink control channel of the first format may be scrambled by PS-RNTI, when the downlink control information is transmitted as a second format to the terminal via DRX active time, the downlink control channel may be scrambled by C-RNTI, CS-RNTI, SP-CSI-RNTI or MCS-C-RNTI, and when the downlink control information is transmitted as a third format to the terminal via DRX active time, the downlink control channel may be scrambled by C-RNTI, or MCS-C-RNTI.

The downlink control information may be transmitted as a third format and scrambled by a C-RNTI or a MCS-C-RNTI, all bits of a frequency domain resource assignment field may be equal to 0 or 1, a subsequent field may be determined as a bitmap associated with SCell dormancy in case that all bits of the frequency domain resource assignment field are equal to 0 or 1, and the subsequent field may include a modulation and coding scheme field, a new data indicator field, a redundancy version field, a HARQ process number filed, an antenna port field, and a DMRS sequence initialization field.

A downlink BWP may be configured with the dormant BWP, and an uplink BWP may not be configured with the dormant BWP.

In accordance with another aspect of the disclosure, a method, performed by a terminal, for managing a bandwidth part in a wireless communication system is provided. The method includes receiving, from a base station, a first RRC message including a BWP configuration, receiving, from the base station, downlink control information including a bitmap indicating whether each of at least one DL BWP is activated as a first BWP or a second BWP, wherein the first BWP is configured with a non-dormant BWP in the first RRC message, and the second BWP is configured with a dormant BWP in the first RRC message, when a first bit of the bitmap is 0, determining an active DL BWP corresponding to the first bit as the second BWP, and when the first bit of the bitmap is 1, determining whether a current active DL BWP corresponding to the first bit is the second BWP, when the current active DL BWP is the second BWP, setting the current active DL BWP to the first BWP, and when the current active DL BWP is not the second BWP, determining to maintain the current active DL BWP.

Each of bits of the bitmap may correspond to a SCell group in ascending order of SCell group indices from MSB to LSB, and each of the bits of the bitmap may indicate whether DL BWPs of SCells belonging to a corresponding SCell group are the first BWP or the second BWP, or each of the bits of the bitmap indicating whether each of the at least one DL BWP is the first BWP or the second BWP may correspond to a SCell in ascending order of SCell indices from MSB to LSB.

Bits of the bitmap may be respectively mapped to SCells belonging to one cell group.

The method may further include identifying that the downlink control information is transmitted as a third format, determining whether the downlink control information is scrambled by a C-RNTI or a MCS-C-RNTI, when the downlink control information is scrambled by the C-RNTI or the MCS-C-RNTI, identifying all bits of a frequency domain resource assignment field are equal to 0 or 1, and determining that a subsequent field is a bitmap associated with SCell dormancy in case that all bits of the frequency domain resource assignment field are equal to 0 or 1, wherein the subsequent field may include a modulation and coding scheme field, a new data indicator field, a redundancy version field, a HARQ process number filed, an antenna port field, and a DMRS sequence initialization field.

A downlink BWP may be configured with the dormant BWP, and an uplink BWP may not be configured with the dormant BWP.

In accordance with another aspect of the disclosure, a method, performed by a base station, for managing a bandwidth part in a wireless communication system is provided. The method includes transmitting, to a terminal, a first RRC message including a BWP configuration, and transmitting, to the terminal, downlink control information including a bitmap indicating whether each of at least one DL BWP is a first BWP or a second BWP, wherein the first BWP is configured with a non-dormant BWP in the first RRC message, and the second BWP is configured with a dormant BWP in the first RRC message, wherein, when a first bit of the bitmap is 0, the first bit indicates that an active DL BWP corresponding to the first bit is the second BWP, wherein, when the first bit of the bitmap is 1 and a current active DL BWP corresponding to the first bit is the second BWP, the first bit indicates that the current active DL BWP is the first BWP, and wherein, when the first bit of the bitmap is 1 and the current active DL BWP is not the second BWP, the first bit indicates that the current active DL BWP is maintained.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1I is a diagram for describing a method of operating a dormant BWP in an activated SCell according to an embodiment of the disclosure;

FIG. 1L illustrates Embodiment 3 of the method of operating a dormant BWP in an activated SCell described in FIG. 1I according to an embodiment of the disclosure;

FIG. 1O illustrates a structure of a terminal according to an embodiment of the disclosure.

Throughout the drawings, it should be noted that like reference numbers are used to depict the same or similar elements, features, and structures.

DETAILED DESCRIPTION

Figure 1A:
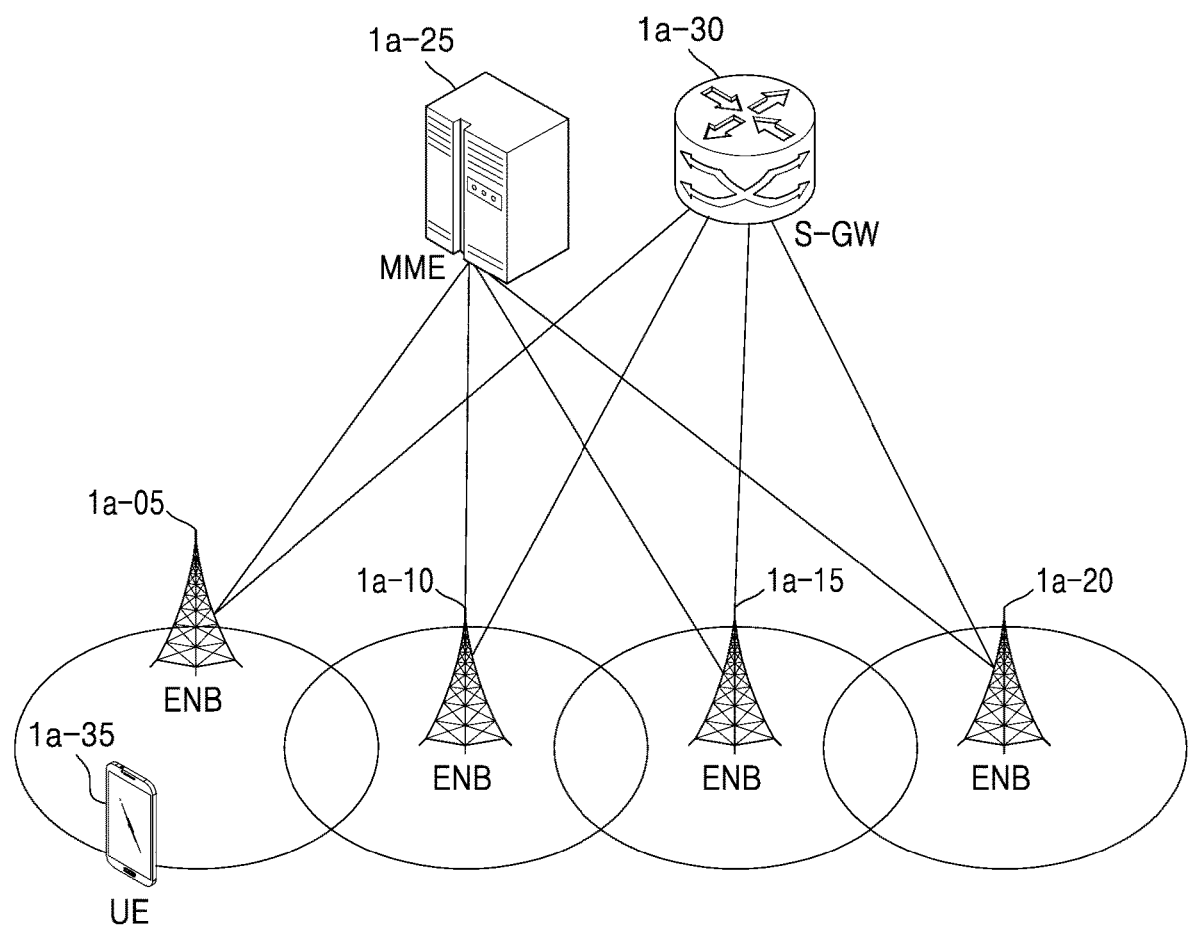
FIG. 1A is a diagram illustrating a structure of a Long Term Evolution (LTE) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, some components in the accompanying drawings may be exaggerated, omitted, or schematically illustrated. In addition, the size of each component may not completely reflect the actual size thereof. In the drawings, the same or corresponding elements may be given the same reference numerals.

The advantages and features of the disclosure and the accomplishing methods thereof will become apparent from the embodiments of the disclosure described below in detail with reference to the accompanying drawings. The disclosure may, however, be embodied in many different forms and should not be construed as being limited to the embodiments of the disclosure described below; rather, the present embodiments are provided to complete the disclosure and fully convey the scope of the disclosure to those of ordinary skill in the art and the disclosure will be defined only by the scope of the claims. Throughout the specification, like reference numerals may denote like elements.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

It will be understood that each block of process flowchart diagrams and combinations of flowchart diagrams may be performed by computer program instructions. Because these computer program instructions may be mounted on a processor of a general-purpose computer, special-purpose computer, or other programmable data processing equipment, the instructions executed through a processor of a computer or other programmable data processing equipment may generate a means of performing the functions described in the flowchart block(s). Because these computer program instructions may be stored in a computer-usable or computer-readable memory that may be directed to a computer or other programmable data processing equipment to implement a function in a particular manner, the instructions stored in the computer-usable or computer-readable memory may also produce a production item containing an instruction means of performing the functions described in the flowchart block(s). Because the computer program instructions may also be mounted on a computer or other programmable data processing equipment, the instructions performing a series of operations on the computer or other programmable data processing equipment to generate a computer-implemented process to perform the computer or other programmable data processing equipment may also provide operations for executing the functions described in the flowchart block(s).

In addition, each block may represent a portion of a module, segment, or code including one or more executable instructions for executing one or more specified logical functions. In addition, it should be noted that the functions mentioned in the blocks may also occur in a different order in some alternative implementation examples. For example, two blocks illustrated in succession may actually be performed substantially at the same time or may sometimes be performed in the opposite order depending on the corresponding function.

In this case, the term "~ unit" used in the present embodiments may refer to a software component or a hardware component, such as a field programmable gate array (FPGA) or an application specific integrated circuit (ASIC) and the "~ unit" may perform certain functions. However, the "~ unit" is not limited to software or hardware. The "~ unit" may be configured to be in an addressable storage medium or may be configured to operate one or more processors. Thus, as an example, the "~ unit" may include components, such as software components, object-oriented software components, class components, and task components and may include processes, functions, attributes, procedures, subroutines, segments of program code, drivers, firmware, microcode, circuits, data, databases, data structures, tables, arrays, and variables. A function provided by the components and "~ units" may be associated with the smaller number of components and "~ units" or may be further divided into additional components and "~ units". In addition, the components and "~ units" may be implemented to operate one or more central processing units (CPUs) in a device or a security multimedia card. In addition, in embodiments of the disclosure, the "~ unit" may include one or more processors.

In the following description, terms for identifying access nodes, terms referring to network entities, terms referring to messages, terms referring to interfaces between network entities, terms referring to various identification information, and the like are used for convenience of description. Thus, the disclosure is not limited to the terms used below and other terms referring to objects having equivalent technical meanings may be used.

In the following description, terms and names defined in the 3rd generation partnership project long term evolution (3GPP LTE) standards may be used for convenience of description. However, the disclosure is not limited to those terms and names and may be equally applied to systems according to other standards. In the disclosure, evolved Node B (eNB) may be used interchangeably with next-generation node B (gNB) for convenience of description. For example, a base station described as an eNB may represent a gNB.

In next-generation mobile communication systems, a carrier aggregation technology may be used to provide a terminal with a service having a high data rate and low transmission delay. However, there is a need for a method of preventing a processing delay that may occur when the carrier aggregation technology is configured and activated in a terminal configured for connection to the network or when the carrier aggregation technology is used and then deactivated. Particularly, when the terminal maintains a plurality of cells in an active state in order to use the carrier aggregation technology, because the terminal may need to perform physical downlink control channel (PDCCH) monitoring for each cell, battery consumption of the terminal may increase. On the other hand, when the plurality of cells are maintained in an inactive state in order to reduce battery consumption of the terminal, a data transmission/reception delay may occur due to a delay that occurs when activating the plurality of cells when using the carrier aggregation technology.

FIG. 1A is a diagram illustrating a structure of an LTE system according to an embodiment of the disclosure.

Referring to FIG. 1A, as illustrated, a radio access network of the LTE system may include next-generation base stations (e.g., evolved Node Bs (eNBs), Node Bs, or base stations) 1a-05, 1a-10, 1a-15, and 1a-20, a mobility management entity (MME) 1a-25, or a serving-gateway (S-GW) 1a-30. A user terminal (e.g., a user equipment (UE) or a terminal) 1a-35 may access an external network through the eNBs 1a-05 to 1a-20 or the S-GW 1a-30.

In FIG. 1A, the eNBs 1a-05 to 1a-20 may correspond to the existing Node Bs of a universal mobile telecommunication system (UMTS) system. The eNB may be connected to the UE 1a-35 through a wireless channel and may perform a more complex function than the existing Node B. In the LTE system, because all user traffic including real-time services, such as voice over IP (VoIP) through the Internet protocol is serviced through a shared channel, an apparatus for collecting and scheduling state information, such as UEs' buffer states, available transmission power states, or channel states may be required, which may be managed by the eNBs 1a-05 to 1a-20. One eNB may generally control a plurality of cells. For example, in order to implement a transmission rate of 100 Mbps, the LTE system may use orthogonal frequency division multiplexing (OFDM) in a 20 MHz bandwidth as a radio access technology. In addition, an adaptive modulation & coding (AMC) scheme may be applied to determine a modulation scheme and a channel coding rate according to the channel state of a terminal. The S-GW 1a-30 may be an apparatus for providing a data bearer and may generate or remove a data bearer under the control of the MME 1a-25. The MME 1a-25 may be an apparatus for performing various control functions as well as a mobility management function for a terminal and may be connected to a plurality of base stations.

Figure 1B:
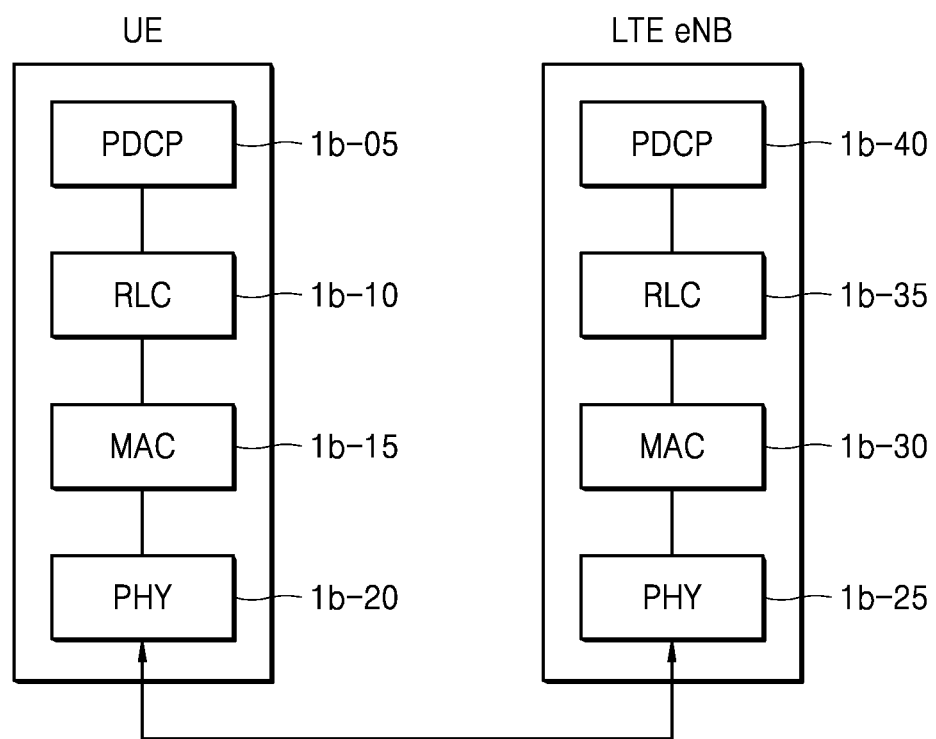
FIG. 1B is a diagram illustrating a radio protocol architecture in an LTE system according to an embodiment of the disclosure.

FIG. 1B is a diagram illustrating a radio protocol architecture in an LTE system according to an embodiment of the disclosure.

Referring to FIG. 1B, the radio protocol of the LTE system may include packet data convergence protocol (PDCP) 1b-05 and 1b-40, radio link control (RLC) 1b-10 and 1b-35, and medium access control (MAC) 1b-15 and 1b-30 in a terminal and an eNB, respectively. The PDCP 1b-05 and 1b-40 may perform operations, such as IP header compression/decompression. The main functions of the PDCP may be summarized as follows. However, the PDCP is not limited to the following examples and may perform various functions.

Header compression or decompression function (Header compression and decompression RObust header compression (ROHC) only)
User data transmission function (Transfer of user data)
Sequential transmission function (In-sequence delivery of upper layer packet data units (PDUs) at PDCP re-establishment procedure for RLC Acknowledge Mode (AM))
Reordering function (For split bearers in dual connectivity (DC) (only support for RLC AM): PDCP PDU routing for transmission and PDCP PDU reordering for reception)
Duplicate detection function (Duplicate detection of lower layer service data units (SDUs) at PDCP re-establishment procedure for RLC AM)
Retransmission function (Retransmission of PDCP SDUs at handover and, for split bearers in DC, of PDCP PDUs at PDCP data-recovery procedure, for RLC AM)
Ciphering or deciphering function (Ciphering and deciphering)
Timer-based SDU discard function (Timer-based SDU discard in uplink)

The RLC 1b-10 and 1b-35 may reconfigure a PDCP packet data unit (PDU) in a suitable size to perform an automatic repeat request (ARQ) operation or the like. The main functions of the RLC may be summarized as follows. However, the RLC is not limited to the following examples and may perform various functions.

Data transmission function (Transfer of upper layer PDUs)
ARQ function (Error Correction through ARQ (only for AM data transfer))
Concatenation, segmentation, and reassembly function (Concatenation, segmentation, and reassembly of RLC SDUs (only for unacknowledged mode (UM) and AM data transfer))
Re-segmentation function (Re-segmentation of RLC data PDUs (only for AM data transfer))
Reordering function (Reordering of RLC data PDUs (only for UM and AM data transfer))
Duplicate detection function (Duplicate detection (only for UM and AM data transfer))
Error detection function (Protocol error detection (only for AM data transfer))
RLC SDU discard function (RLC SDU discard (only for UM and AM data transfer))
RLC re-establishment function (RLC re-establishment)

The MAC 1b-15 and 1b-30 may be connected to multiple RLC layers configured in one terminal and may perform an operation of multiplexing RLC PDUs into MAC PDUs and demultiplexing RLC PDUs from MAC PDUs. The main functions of the MAC may be summarized as follows. However, the MAC is not limited to the following examples and may perform various functions.

Mapping function (Mapping between logical channels and transport channels)
Multiplexing or demultiplexing function (Multiplexing/demultiplexing of MAC SDUs belonging to one or different logical channels into/from transport blocks (TB) delivered to/from the physical layer on transport channels)
Scheduling information report function (Scheduling information reporting)
HARQ function (Error correction through HARQ)
Priority handling function between logical channels (Priority handling between logical channels of one UE)
Priority handling function between terminals (Priority handling between UEs by means of dynamic scheduling)
Multimedia broadcast multicast service (MBMS) service identification function (MBMS service identification)
Transport format selection function (Transport format selection)
Padding function (Padding)

Physical layers 1b-20 and 1b-25 may channel-code or modulate upper layer data, generate OFDM symbols, and transmit the same on wireless channels or may demodulate and channel-decode OFDM symbols received on wireless channels and transmit the result thereof to the upper layer. However, the physical (PHY) is not limited to the following examples and may perform various functions.

Figure 1C:
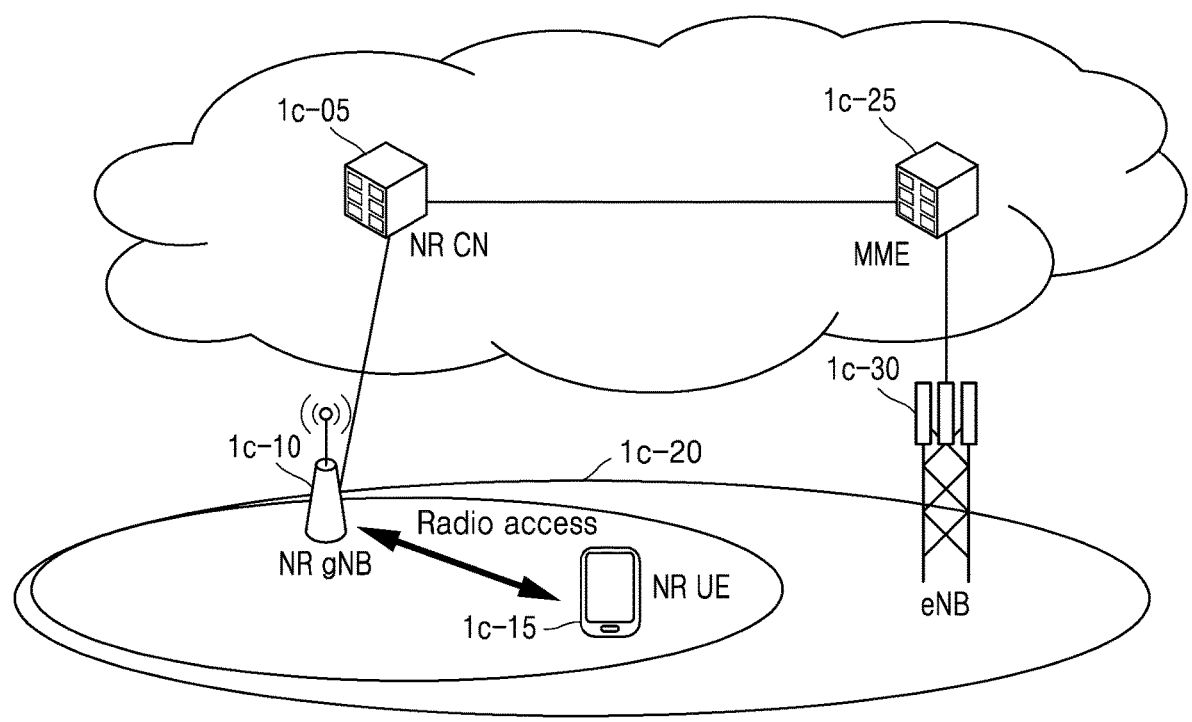
FIG. 1C is a diagram illustrating a structure of a next-generation mobile communication system according to an embodiment of the disclosure.

FIG. 1C is a diagram illustrating a structure of a next-generation mobile communication system according to an embodiment of the disclosure.

Referring to FIG. 1C, a radio access network of the next-generation mobile communication system (hereinafter NR or 5G) may include a next-generation base station (e.g., a new radio node B (NR gNB) or an NR base station) 1c-10 and a new radio core network (NR CN) 1c-05. A user terminal (e.g., a new radio user equipment (NR UE) or a terminal) 1c-15 may access an external network 1c-20 through the NR gNB 1c-10 or the NR CN 1c-05.

In FIG. 1C, the NR gNB 1c-10 may correspond to an evolved Node B (eNB) of the existing LTE system. The NR gNB 1c-10 may be connected to the NR UE 1c-15 through a wireless channel and may provide a better service than the existing Node B. In the next-generation mobile communication system, because all user traffic is serviced through a shared channel, an apparatus for collecting and scheduling state information, such as UEs' buffer states, available transmission power states, or channel states may be required, which may be managed by the NR gNB 1c-10. One NR gNB 1c-10 may generally control a plurality of cells. In order to implement ultra-high speed data transmission in comparison with the LTE, an existing maximum bandwidth or more may be provided and a beamforming technology may be additionally grafted by using orthogonal frequency division multiplexing (OFDM) as a radio access technology. In addition, an adaptive modulation & coding (AMC) scheme may be applied to determine a modulation scheme and a channel coding rate according to the channel state of a terminal. The NR CN 1c-05 may perform functions, such as mobility support, bearer configuration, and quality of service (QoS) configuration. The NR CN 1c-05 may be an apparatus for performing various control functions as well as a mobility management function for a terminal and may be connected to a plurality of base stations. In addition, the next-generation mobile communication system may also be linked with the existing LTE system, and the NR CN 1c-05 may be connected to an MME 1c-25 through a network interface. The MME 1c-25 may be connected to an eNB 1c-30 that is an existing base station.

Figure 1D:
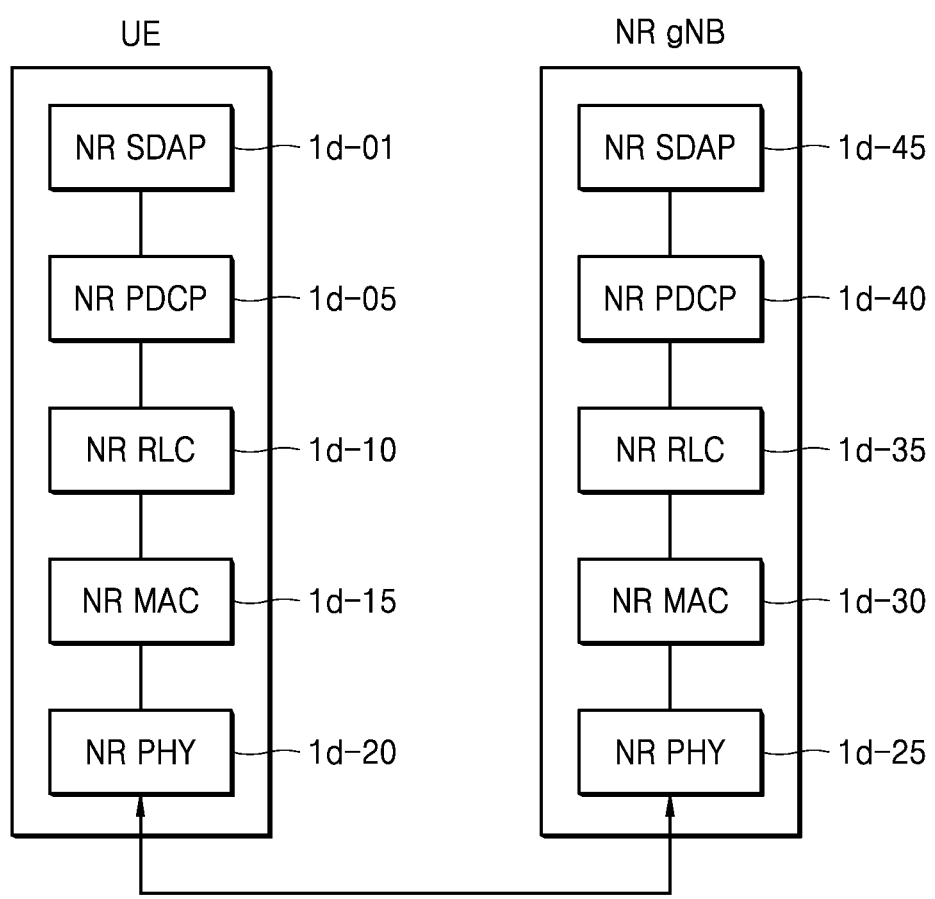
FIG. 1D is a diagram illustrating a radio protocol architecture of a next-generation mobile communication system according to an embodiment of the disclosure.

FIG. 1D is a diagram illustrating a radio protocol architecture of a next-generation mobile communication system according to an embodiment of the disclosure.

Referring to FIG. 1D, the radio protocol of the next-generation mobile communication system may include NR service data adaptation protocol (SDAP) 1d-01 and 1d-45, NR PDCP 1d-05 and 1d-40, NR RLC 1d-10 and 1d-35, and NR MAC 1d-15 and 1d-30 in each of a terminal and an NR base station.

The main functions of the NR SDAP 1d-01 and 1d-45 may include some of the following functions. However, the NR SDAP is not limited to the following examples and may perform various functions.

User data transmission function (Transfer of user plane data)

Function of mapping between QoS flow and data bearer for uplink and downlink (Mapping between a QoS flow and a data radio bearer (DRB) for both DL and UL)

Function of marking QoS flow identifier (ID) for uplink and downlink (Marking QoS flow ID in both DL and UL packets)

Function of mapping reflective QoS flow to data bearer for uplink SDAP PDUs (Reflective QoS flow to DRB mapping for the UL SDAP PDUs)

With respect to an SDAP layer, the terminal may be configured with an RRC message whether to use a header of the SDAP layer for each PDCP layer, bearer, or logical channel or whether to use a function of the SDAP layer, and when an SDAP header is configured, a 1-bit non-access stratum quality of service (NAS QoS) reflection configuration indicator (NAS reflective QoS) and a 1-bit access stratum quality of service (AS QoS) reflection configuration indicator (AS reflective QoS) of the SDAP header may indicate the terminal to update or reconfigure mapping information between the QoS flow and a data bearer for the uplink and downlink. The SDAP header may include QoS flow ID information representing the QoS. The QoS information may be used as data processing priority and scheduling information or the like to support a smooth service.

The main functions of the NR PDCP 1d-05 and 1d-40 may include some of the following functions. However, the NR PDCP is not limited to the following examples and may perform various functions.

Header compression or decompression function (Header compression and decompression: ROHC only)

User data transmission function (Transfer of user data)

Sequential transmission function (In-sequence delivery of upper layer PDUs)

Non-sequential transmission function (Out-of-sequence delivery of upper layer PDUs)

Reordering function (PDCP PDU reordering for reception)

Duplicate detection function (Duplicate detection of lower layer SDUs)

Retransmission function (Retransmission of PDCP SDUs)

Ciphering or deciphering function (Ciphering and deciphering)

Timer-based SDU discard function (Timer-based SDU discard in uplink)

The reordering function of the NR PDCP entity may include a function of reordering the PDCP PDUs received from the lower layer in order based on a PDCP sequence number (SN) and a function of transmitting data to the upper layer in a reordered sequence. Alternatively, the reordering function of the NR PDCP entity may include, for example, a function of directly transmitting without consideration of sequence, a function of reordering sequence and recording missing PDCP PDUs, a function of reporting the state of the missing PDCP PDUs to the transmitting side, and a function of requesting retransmission of the missing PDCP PDUs.

The main functions of the NR RLC 1d-10 and 1d-35 may include some of the following functions. However, the NR RLC is not limited to the following examples and may perform various functions.

Data transmission function (Transfer of upper layer PDUs)

Sequential transmission function (In-sequence delivery of upper layer PDUs)

Non-sequential transmission function (Out-of-sequence delivery of upper layer PDUs)

ARQ function (Error correction through ARQ)

Concatenation, segmentation, and reassembly function (Concatenation, segmentation, and reassembly of RLC SDUs)

Re-segmentation function (Re-segmentation of RLC data PDUs)

Reordering function (Reordering of RLC data PDUs)

Duplicate detection function (Duplicate detection)

Error detection function (Protocol error detection)

RLC SDU discard function (RLC SDU discard)

RLC re-establishment function (RLC re-establishment)

The sequential transmission (in-sequence delivery) function of the NR RLC entity may mean a function of sequentially transmitting the RLC SDUs received from the lower layer to the upper layer. The sequential transmission (in-sequence delivery) function of the NR RLC entity may include a function of, when one original RLC SDU is segmented into multiple RLC SDUs and received, reassembling and transmitting the received RLC SDUs, a function of reordering the received RLC PDUs based on the RLC sequence number (SN) or the PDCP sequence number (SN), a function of reordering the sequence and recording missing RLC PDUs, a function of reporting the state of missing RLC PDUs to the transmitting side, a function of requesting retransmission of missing RLC PDUs, a function of, when there is a missing RLC SDU, sequentially transmitting only the RLC SDUs before the missing RLC SDU to the upper layer, a function of, when a certain timer has expired even when there is a missing RLC SDU, sequentially transmitting all the RLC SDUs received before the start of the timer to the upper layer, or a function of, when a certain timer has expired even when there is a missing RLC SDU, sequentially transmitting all the RLC SDUs received until now to the upper layer.

In addition, through the non-sequential transmission (out-of-sequence delivery) function of the NR RLC entity, the RLC PDUs may be processed in order of reception (in order of arrival regardless of the order of sequence numbers) and then transmitted to the PDCP entity regardless of the sequence (out-of-sequence delivery), and in the case of segments, the segments stored in the buffer or to be received may be received, reconfigured into one complete RLC PDU, and then processed and transmitted to the PDCP entity. The NR RLC layer may not include the concatenation function, and the concatenation function may be performed in the NR MAC layer or may be replaced with the multiplexing function of the NR MAC layer.

The non-sequential transmission (out-of-sequence delivery) function of the NR RLC entity may include a function of directly transmitting the RLC SDUs received from the lower layer to the upper layer regardless of the order thereof. The non-sequential transmission (out-of-sequence delivery) function of the RLC entity may include at least one of a function of, when one RLC SDU is segmented into multiple RLC SDUs and received, reassembling and transmitting the received RLC SDUs or a function of storing the RLC SN or PDCP SN of received RLC PDUs, ordering the sequence, and recording missing RLC PDUs.

The NR MAC 1d-15 and 1d-30 may be connected to multiple NR RLC layers configured in one terminal, and the main functions of the NR MAC may include some of the following functions. However, the NR MAC is not limited to the following examples and may perform various functions.

Mapping function (Mapping between logical channels and transport channels)
Multiplexing or demultiplexing function (Multiplexing/demultiplexing of MAC SDUs)
Scheduling information report function (Scheduling information reporting)
HARQ function (Error correction through HARQ)
Priority handling function between logical channels (Priority handling between logical channels of one UE)
Priority handling function between terminals (Priority handling between UEs by means of dynamic scheduling)
MBMS service identification function (MBMS service identification)
Transport format selection function (Transport format selection)
Padding function (Padding)

NR PHY layers 1d-20 and 1d-25 may channel-code or modulate upper layer data, generate OFDM symbols, and transmit the same on wireless channels or may demodulate and channel-decode OFDM symbols received on wireless channels and transmit the results thereof to the upper layer.

In the next-generation mobile communication system, because frequencies of a very high frequency band may be used, the frequency bandwidth may also be very wide. However, from the viewpoint of the terminal, supporting all of the very wide bandwidth may require high implementation complexity and incur high cost. Thus, in the next-generation mobile communication system, the concept of a bandwidth part (BWP) may be introduced, a plurality of BWPs may be configured in one cell special cell (SpCell or SCell), and data may be transmitted/received in one or more BWPs according to the instruction of the base station.

In the disclosure, a state transition method or a BWP switching method and particular operations thereof considering the state of a SCell and a plurality of BWPs configured in the SCell when introducing a dormant BWP according to an embodiment of the disclosure will be described. In addition, a method of managing a dormant mode in BWP units (BWP-level) and performing a state transition or a BWP switching method will be described, and an operation of a particular BWP according to the state of each SCell or the state or mode of each BWP (activation or deactivation (inactivity) or hibernation (dormancy)) will be described.

In addition, according to an embodiment of the disclosure, a plurality of BWPs may be configured for each downlink or uplink in one cell (SpCell) or primary cell (PCell) or primary secondary cell group (SCG) cell (PSCell) or SCell), and an active BWP (active DL or UL BWP) or a dormant BWP (dormant DL BWP) or an inactive BWP (inactive or deactivated DL/UL BWP) may be configured and operated through BWP switching. For example, a data transmission rate may be increased in a similar way to the carrier aggregation technology by transitioning the BWP of the downlink or uplink for one cell to the active state, and the battery may be saved by not performing PDCCH monitoring on the cell by transitioning or switching the downlink BWP to the dormant BWP. In addition, rapid activation of the cell or BWP may be supported by allowing the terminal to perform channel measurement on the downlink BWP and report the channel measurement result. In addition, the battery of the terminal may be saved by transitioning the downlink (or uplink) BWP to the inactive state in one cell. In this case, a BWP-by-BWP state transition indication or a BWP switching indication for each cell may be configured and indicated by an RRC message or a MAC control element (CE) or downlink control information (DCI) of the PDCCH.

In the disclosure, the BWP may be used without discriminating between the uplink and the downlink, and the meaning thereof may indicate each of the uplink BWP and the downlink BWP depending on the context.

In the disclosure, the link may be used without discriminating between the uplink and the downlink, and the meaning thereof may indicate each of the uplink and the downlink depending on the context.

In an embodiment of the disclosure, a dormant BWP may be configured or introduced for the S Cell of the terminal performing the carrier aggregation technology. According to an embodiment of the disclosure, the battery consumption of the terminal may be reduced by not monitoring the PDCCH in the dormant BWP. In an embodiment of the disclosure, when channel measurement is performed and reported in the dormant BWP (e.g., channel state information (CSI) or channel quality information (CQI) measurement or report) or beam measurement or beam tracking or beam operation is performed and thus data transmission is required, data transmission may be rapidly started in the normal BWP by switching to the normal BWP or by activating the normal BWP. In this case, the dormant BWP may not be configured or applied for the SpCell (PCell of master cell group (MCG) or PCell (or PSCell) of SCG) or the SCell with the physical uplink control channel (PUCCH) configured in which signals should be continuously monitored, feedback should be transmitted or received, or synchronization should be checked and maintained.

In an embodiment of the disclosure, various embodiments of operating based on the DCI of the PDCCH or the MAC CE or the RRC message in order to operate the above dormant BWP for the SCell of the terminal will be described.

The network or the base station may configure SpCells (PCell and PSCell) and a plurality of SCells to the terminal. In this case, when the terminal communicates with one base station, the SpCell may indicate the PCell, and when the terminal communicates with two base stations (master base station and secondary base station), the SpCell may indicate the PCell of the master base station or the PSCell of the secondary base station. The PCell or PSCell may represent a main cell used when the terminal and the base station communicate in each MAC layer, and may refer to a cell that performs timing for synchronization, performs random access, transmits HARQ acknowledgment (ACK)/negative acknowledgment (NACK) feedback on PUCCH transmission resources, and transmits/receives most control signals. The technology in which a base station increases transmission resources and increases uplink or downlink data transmission resources by operating a plurality of SCells together with the SpCell will be referred to as the carrier aggregation technology.

When the terminal is configured with the SpCell and a plurality of SCells through the RRC message, the state or mode may be configured for the BWP of each SCell or each SCell through the RRC message or the MAC CE or the DCI of the PDCCH. The state or mode of the SCell may be configured as an active (activated) mode or an active (activated) state and an inactive (deactivated) mode or an inactive (deactivated) state. When the SCell is in the active mode or in the active state, the terminal may exchange uplink or downlink data with the base station in the active mode or in the activated SCell in the BWP other than the activated BWP or the activated normal BWP or the activated dormant BWP of the SCell. In addition, the PDCCH may be monitored to check the indication of the base station, channel measurement may be performed on the downlink of the SCell of the active mode or the active state (or the BWP other than the activated BWP or the activated normal BWP or the activated dormant BWP of the S Cell), the measurement information thereof may be periodically reported to the base station, and the terminal may periodically transmit a pilot signal (sounding reference signal (SRS)) to the base station such that the base station may perform uplink channel measurement.

In comparison to this, when the SCell is in the inactive mode or in the inactive state, the terminal may not exchange data with the base station because the BWPs configured in the SCell are in the inactive state or the configured BWPs are not activated or there is no activated BWP among the configured BWPs. In addition, the PDCCH for checking the indication of the base station may not be monitored, channel measurement may not be performed, measurement report may not be performed, and a pilot signal may not be transmitted.

Thus, in order to activate the SCells in the inactive mode, the base station may first configure frequency measurement configuration information to the terminal through an RRC message, and the terminal may perform cell or frequency measurement based on the configured frequency measurement configuration information. In addition, the base station may activate the deactivated SCells based on the frequency/channel measurement information after receiving a cell or frequency measurement report of the terminal Due to this, a lot of delay may occur when the base station activates the carrier aggregation technology and starts data transmission/reception to/from the terminal.

In the disclosure, in order to save the battery of the terminal and rapidly start data transmission or reception, a dormant mode or a dormant state will be described with respect to each activated SCell (or active SCell), and configuring or introducing a dormant BWP for each activated SCell will be described.

In an embodiment of the disclosure, in a BWP or a dormant BWP that is a dormant mode of an activated SCell (dormant BWP in activated SCell), or when a dormant BWP is activated, the terminal may not exchange data with the base station, or may not monitor the PDCCH to check the indication of the base station, or may not transmit a pilot signal but may perform channel measurement, and may report the measurement results about the measured frequency/cell/channel periodically according to the base station configuration or when an event occurs. Thus, because the terminal does not monitor the PDCCH in the dormant BWP of the activated SCell and does not transmit a pilot signal, the battery may be saved compared to the normal BWP of the activated SCell (or the BWP other than the dormant BWP) or compared to when the normal BWP of the activated SCell (or the BWP other than the dormant BWP) is activated. In addition, unlike when the SCell is deactivated, because a channel measurement report is performed, the base station may rapidly activate the normal BWP of the activated SCell based on the measurement report or based on the measurement report of the dormant BWP of the activated SCell to enable rapid use of the carrier aggregation technology to reduce the transmission delay.

Thus, in an embodiment of the disclosure, when the SCell is in the active mode or in the active state, the terminal may exchange uplink or downlink data with the base station in the active mode or in the activated SCell in the BWP other than the activated BWP or the activated normal BWP or the activated dormant BWP of the SCell. In addition, the PDCCH may be monitored to check the indication of the base station, channel measurement may be performed on the downlink of the SCell of the active mode or the active state (or the BWP other than the activated BWP or the activated normal BWP or the activated dormant BWP of the SCell), the measurement information thereof may be periodically reported to the base station, and a pilot signal (sounding reference signal (SRS)) may be periodically transmitted to the base station such that the base station may perform uplink channel measurement. In addition, when the S Cell is in the active mode or in the active state, the terminal may not exchange uplink or downlink data with the base station in the activated dormant BWP of the SCell in the active mode or the activated SCell, or may not monitor the PDCCH in order to check the indication of the base station, but may perform channel measurement on the downlink of the activated dormant BWP of the SCell in the active mode or the active state, and may periodically report measurement information to the base station.

In addition, in an embodiment of the disclosure, the dormant BWP may represent the state of the BWP, or the dormant BWP may be used as the name of a logical concept indicating a particular BWP. Thus, the dormant BWP may be activated or may be deactivated or may be switched. For example, an indication to switch the first BWP activated in the first SCell to the dormant BWP or an indication to transition the first SCell to the hibernation or dormant mode or an indication to activate the dormant BWP of the first SCell may be interpreted as the same meaning.

In addition, in an embodiment of the disclosure, the normal BWP may represent BWPs other than the dormant BWP among the BWPs configured in each SCell of the terminal through an RRC message, and the terminal may exchange uplink or downlink data with the base station in the normal BWP. In addition, the PDCCH may be monitored to check the indication of the base station, channel measurement may be performed on the downlink, the measurement information thereof may be periodically reported to the base station, and the terminal may periodically transmit a pilot signal (sounding reference signal (SRS)) to the base station such that the base station may perform uplink channel measurement. In addition, the normal BWP may indicate a first active BWP or a default BWP or a first active BWP activated from dormancy or an initial BWP.

In an embodiment of the disclosure, among the BWPs configured in each SCell of the terminal, only one dormant BWP may be configured for the downlink. In another embodiment of the disclosure, among the BWPs configured in each SCell of the terminal, one dormant BWP may be configured for the uplink or downlink.

Figure 1E:
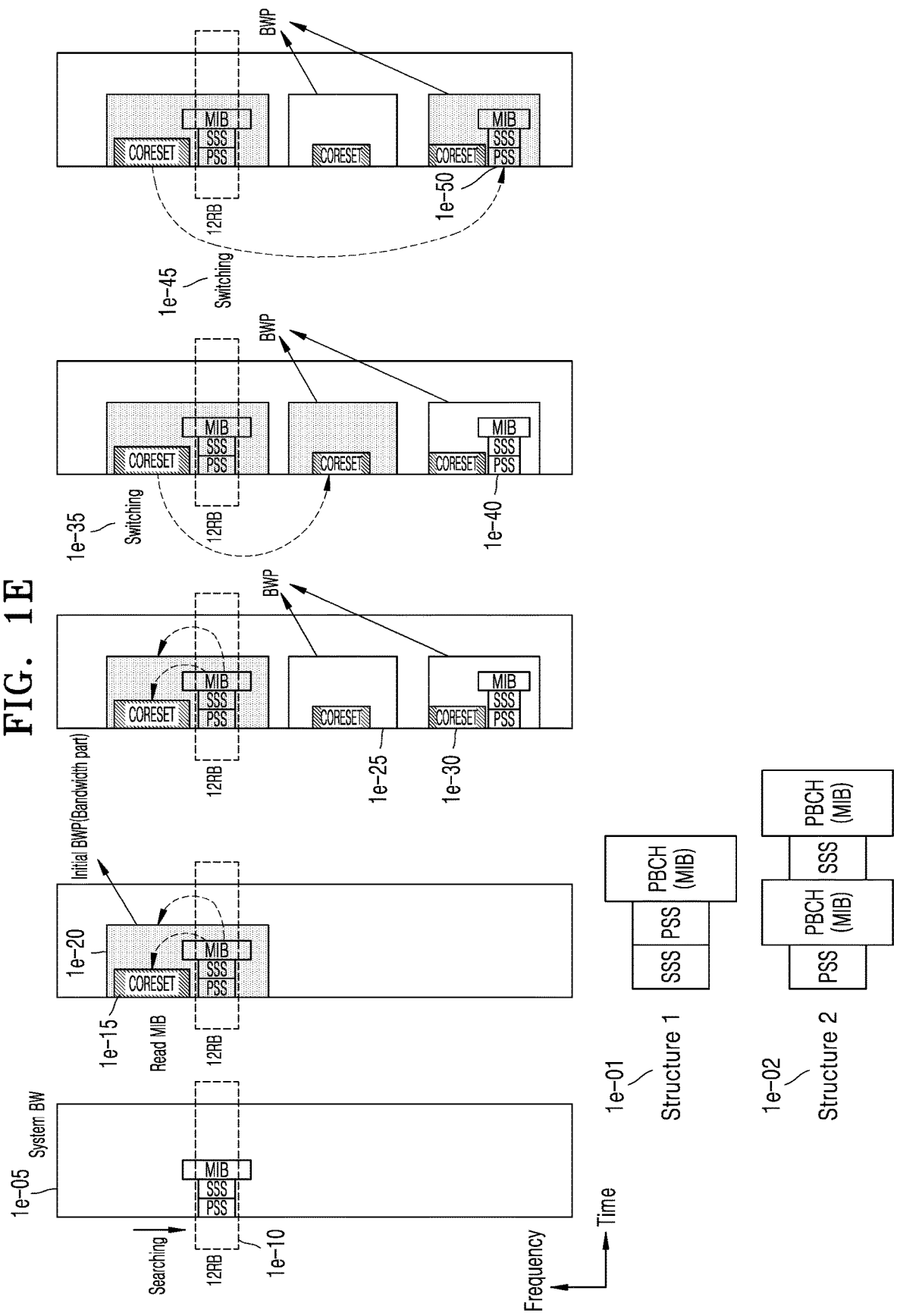
FIG. 1E is a diagram illustrating a procedure of providing a service a terminal in a mobile communication system by efficiently using a very wide frequency bandwidth according to an embodiment of the disclosure.

FIG. 1E is a diagram illustrating a procedure of providing a service a terminal in a next-generation mobile communication system by efficiently using a very wide frequency bandwidth according to an embodiment of the disclosure.

Referring to FIG. 1E, a description will be given of how the next-generation mobile communication system may efficiently use a very wide frequency bandwidth to provide services to terminals having different capabilities (or categories) and save the battery.

One cell served by the base station may serve a very wide frequency band like 1e-05. However, the base station may divide a wide frequency band into a plurality of BWPs and manage the same as one cell in order to provide services to terminals having different capabilities.

First, when initially turned on, the terminal may search the entire frequency band provided by a service provider (e.g., a Public Land Mobile Network (PLMN)), in units of certain resource blocks (e.g., in units of 12 resource blocks (RBs)). For example, the terminal may start to monitor a primary synchronization sequence (PSS)/secondary synchronization sequence (SSS) in the entire system bandwidth in units of resource blocks (1e-10). When relevant signals are detected while finding the PSS/SSS in units of resource blocks (1e-01 or 1e-02), the relevant signals may be read and interpreted (decoded) to identify the boundary of a subframe and a radio transmission resource frame (radio frame). Accordingly, subframes may be discriminated in units of 1 ms, and downlink signals may be synchronized with the base station. In this case, a resource block (RB) may be defined as a two-dimensional unit with a size of a certain frequency resource and a certain time resource. For example, the time resource may be defined in units of 1 ms, and the frequency resource may be defined as 12 subcarriers (1 carrier×15 kHz=180 kHz).

When the synchronization is completed, the terminal may identify a master system information block (MIB) or minimum system information (MSI) to identify information of a control resource set (CORESET) and identify initial access BWP information (1e-15 and 1e-20). In this case, the CORESET information may refer to the position of a time/frequency transmission resource on which a control signal is transmitted from the base station, and may represent, for example, a resource position where a PDCCH channel is transmitted. For example, the CORESET information may be information indicating where the first system information (system information block 1 (SIB1)) is transmitted, and may indicate on which frequency/time resource the PDCCH is transmitted. When the terminal reads the first system information, the terminal may identify information about the initial BWP. As such, when the terminal completes synchronization of a downlink signal with the base station and becomes able to receive a control signal, the terminal may perform a random access procedure in an initial BWP of a cell on which the terminal camps, request an RRC connection configuration, receive an RRC message, and perform an RRC connection configuration.

In this RRC connection configuration process, a plurality of BWPs may be configured for each cell (PCell or PSCell or SpCell or S Cell). In one cell, a plurality of BWPs may be configured for downlink, and a plurality of BWPs may be configured separately for uplink.

A plurality of BWPs may be indicated and configured by a BWP identifier to be used as an initial BWP or a default BWP or a first active BWP or a dormant BWP or a first active BWP activated from dormancy.

The initial BWP (initial BWP) may be used as a cell-specific BWP that is one BWP in each cell, and may be used as a BWP in which the terminal first accessing the cell may configure a connection to the cell through a random access procedure or the terminal having configured the connection may perform synchronization. The base station may configure, for each cell, an initial downlink BWP to be used in the downlink and an initial uplink BWP to be used in the uplink. Configuration information about the initial BWP may be broadcast in the first system information (system information 1 (SIB1)) indicated by the CORESET (1e-25 and 1e-30), and the base station may reconfigure a connection to the accessed terminal through an RRC message. The initial BWP may be used by being designated as the number 0 of a BWP identifier in each of the uplink and the downlink. For example, all terminals accessing the same cell may use the same initial BWP by designating the same as the same BWP identifier #0. For example, when a random access procedure is performed, because the base station may transmit a random access response (RAR) message in the initial BWP that may be read by all the terminals, a contention-based random access procedure may be facilitated.

The first active BWP may be configured differently for each terminal (UE specific) and may be indicated by being designated by a BWP identifier among a plurality of BWPs. The first active BWP may be configured for each of the downlink and the uplink, and each of a first active downlink BWP and a first active uplink BWP may be configured as a BWP identifier. The first active BWP may be used to indicate which BWP will be first activated and used when a plurality of BWPs are configured in one cell. For example, when a PCell or a PSCell and a plurality of SCells are configured to the terminal and a plurality of BWPs are configured for each PCell or PSCell or SCell, when the PCell or PSCell or SCell is activated, the terminal may activate and use the first active BWP among the plurality of BWPs configured in the PCell or PSCell or SCell. For example, the first active downlink BWP may be activated and used for the downlink, and the first active uplink BWP may be activated and used for the uplink.

An operation of switching 1e-35 and 1e-45, by the terminal, the current or activated downlink BWP for the SCell to be activated as the first active downlink BWP (or the BWP configured or indicated by the RRC message) or switching the current or activated uplink BWP 1e-40 or 1e-50 to be activated as the first active uplink BWP (or BWP configured or indicated by the RRC message) may be performed when an indication to activate the SCell or the BWP in the inactive state is received through the RRC message or the MAC control information or the DCI. In addition, the operation may be performed when an indication to transition the SCell or the BWP to the dormant state is received through the RRC message or the MAC control information or the DCI. For example, when the S Cell or the BWP is activated, because the downlink BWP will be anyway switched to be activated as the first active downlink BWP (or the BWP configured or indicated by the RRC message) or the uplink BWP will be switched to be activated as the first active uplink BWP (or the BWP configured or indicated by the RRC message), the base station may effectively use the carrier aggregation technology only when the frequency/channel should be measured and reported with respect to the first active downlink/uplink BWP even when a channel measurement report is performed in the dormant state.

The default BWP may be configured differently for each terminal (UE specific) and may be indicated by being designated by a BWP identifier among a plurality of BWPs. The default BWP may be configured only for the downlink. The default BWP may be used as a BWP to which an activated BWP among a plurality of downlink BWPs will fall back after a certain time. For example, a BWP inactivity (deactivation) timer may be configured for each cell or for each BWP through an RRC message, and the BWP inactivity timer may be started or restarted when data transmission/reception occurs in the activated BWP other than the default BWP, or may be started or restarted when the activated BWP is switched to another BWP. When the BWP inactivity timer expires, the terminal may fall back or switch the activated downlink BWP to the default bandwidth in the relevant cell. In this case, the switching may refer to a procedure of deactivating a currently-activated BWP and activating a BWP for which the switching is indicated, and the switching may be triggered by an RRC message or MAC control information (MAC CE) or L1 signaling (downlink control information (DCI) of the PDCCH). In addition, the switching may be triggered in response to indication of the BWP to be switched or to be activated, and the BWP may be indicated by a BWP identifier (e.g., 0, 1, 2, 3, or 4).

The reason for applying and using the default BWP only for the downlink is that the base station may get the terminal to fall back to the default BWP after a certain time for each cell to receive an indication from the base station (e.g., DCI of the PDCCH), thereby facilitating base station scheduling. For example, when the base station configures the default BWP of terminals accessing one cell as the initial BWP, the base station may continue to perform a scheduling indication only in the initial BWP after a certain time. When the default BWP is not configured via the RRC message, the initial BWP may be regarded as the default BWP and the terminal may fall back to the initial BWP when the BWP inactivity timer expires.

As another method, in order to increase an implementation degree of freedom of the base station, a default BWP may be defined and configured also for the uplink and used like the default BWP of the downlink.

The dormant BWP may refer to a BWP or a dormant BWP that is a dormant mode of an activated SCell (dormant BWP in activated SCell). When the dormant BWP is activated, the terminal may not exchange data with the base station, or may not monitor the PDCCH for identifying the indication of the base station, or may not transmit a pilot signal but may perform channel measurement, and may report the measurement results about the measured frequency/cell/channel periodically according to the base station configuration or when an event occurs. Thus, because the terminal does not monitor the PDCCH in the dormant BWP of the activated SCell and does not transmit a pilot signal, the battery may be saved compared to the normal BWP of the activated SCell (or the BWP other than the dormant BWP) or compared to when the normal BWP of the activated SCell (or the BWP other than the dormant BWP) is activated. In addition, unlike when the SCell is deactivated, because a channel measurement report is performed, the base station may rapidly activate the normal BWP of the activated SCell based on the measurement report or based on the measurement report of the dormant BWP of the activated SCell to enable rapid use of the carrier aggregation technology to reduce the transmission delay.

The first active BWP activated by being switched from the dormant state or from the dormant BWP (or the first active non-dormant BWP or the BWP configured or indicated by the RRC message), when the terminal operates a BWP of one activated SCell as a dormant BWP or when an activated BWP is a dormant BWP in an activated SCell or when it is switched to a dormant BWP in an SCell, in the case of instructing the terminal to switch the BWP of the activated SCell from the dormant BWP to the normal BWP (or the BWP other than the dormant BWP) through the DCI of the PDCCH or the MAC CE or the RRC message from the base station or in the case of instructing to switch or convert the active BWP from the dormant BWP to the normal BWP or in the case of instructing to switch or convert or activate the active BWP from the dormant BWP to the normal BWP (e.g., the first active BWP activated from dormancy), may be a BWP to be activated by switching the current or activated BWP of the activated SCell by the terminal according to the indication or a BWP to be activated from the dormant state configured in the RRC message.

Figure 1F:
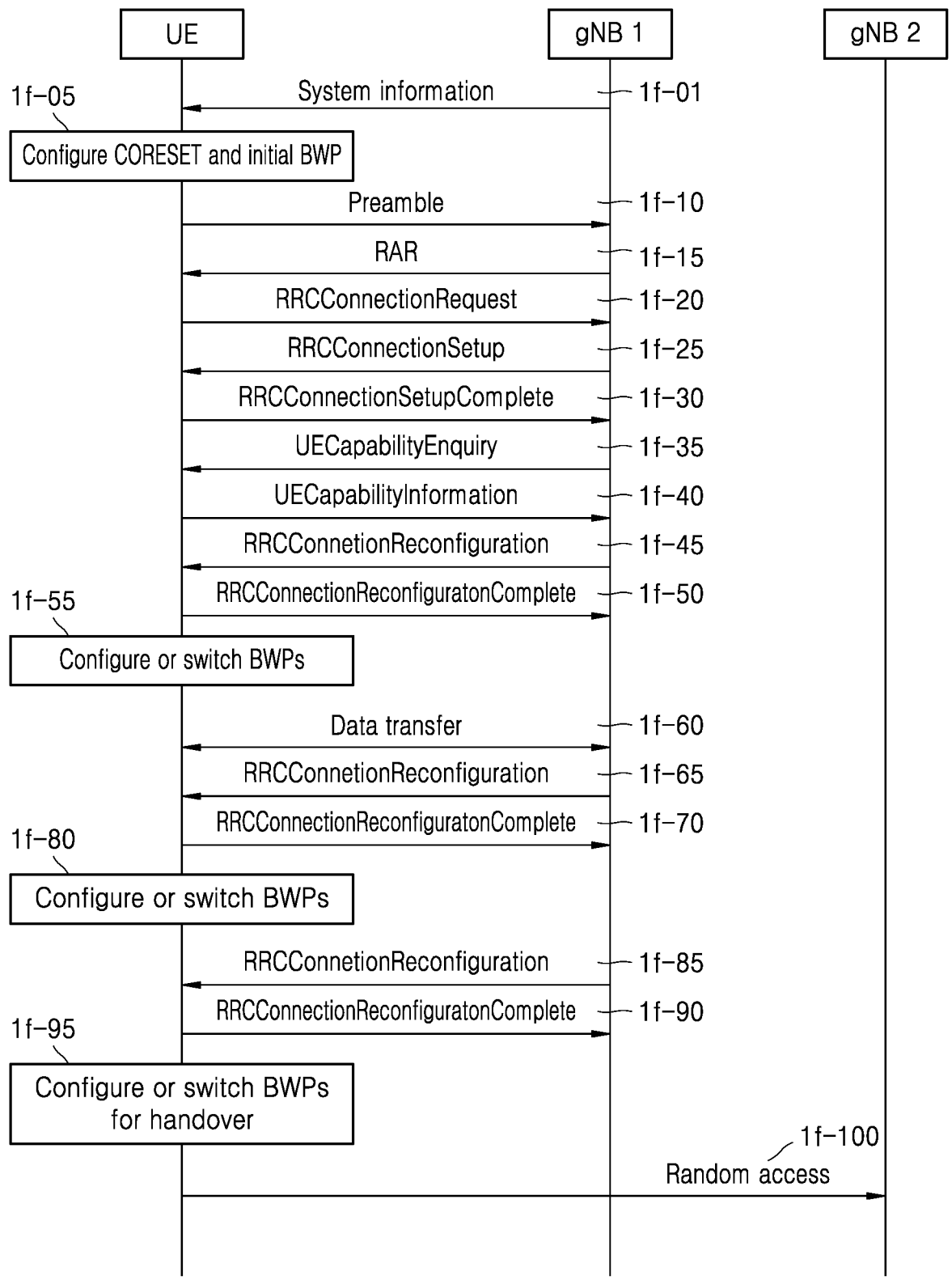
FIG. 1F is a diagram illustrating a procedure for a terminal to switch from an RRC idle mode to an RRC connected mode in a mobile communication system and for describing a method of configuring a plurality of bandwidth parts (BWPs) and configuring a default BWP or a first active BWP according to an embodiment of the disclosure.

FIG. 1F is a diagram illustrating a procedure for a terminal to switch from an RRC idle mode to an RRC connected mode in a mobile communication system and for describing a method of configuring a plurality of bandwidth parts (BWPs) and configuring a default BWP or a first active BWP according to an embodiment of the disclosure.

Referring to FIG. 1F, one cell provided a service by the base station may serve a very wide frequency band. First, the terminal may search the entire frequency band provided by a mobile network operator (e.g., PLMN), in units of certain resource blocks (e.g., in units of 12 resource blocks (RBs)). For example, the terminal may start to monitor a primary synchronization sequence (PSS)/secondary synchronization sequence (SSS) in the entire system bandwidth in units of resource blocks. When relevant signals are detected while finding the PSS/SSS in units of resource blocks, the relevant signals may be read and interpreted (decoded) to identify the boundary of a subframe and a radio transmission resource frame (radio frame). Upon completion of synchronization, the terminal may read system information of a currently camped-on cell. For example, the terminal may identify a master system information block (MIB) or minimum system information (MSI) to identify information of a control resource set (CORESET) and may read system information to identify initial BWP information (1f-01 and 1f-05). In this case, the CORESET information may refer to the position of a time/frequency transmission resource on which a control signal is transmitted from the base station, and may represent, for example, a resource position where a PDCCH channel is transmitted.

As such, when the terminal completes synchronization of a downlink signal with the base station and becomes able to receive a control signal, the terminal may perform a random access procedure in the initial BWP, receive a random access response, request an RRC connection configuration, and receive an RRC message to perform an RRC connection configuration (1f-10, 1f-15, 1f-20, 1f-25, and 1f-30).

Upon completion of a basic RRC connection configuration, the base station may transmit an RRC message to the terminal to ask the capability of the terminal in order to identify the capability of the terminal (UE capability) (UE-CapabilityEnquiry (1f-35)). As another method, the base station may ask the MME or the AMF about the capability of the terminal in order to identify the capability of the terminal. This is because the MME or the AMF may have stored the capability information of the terminal when the terminal has been previously accessed. When the base station does not have desired terminal capability information, the base station may request the terminal for the terminal capability.

The reason for the base station to transmit an RRC message to the terminal in order to identify the capability of the terminal is to identify the capability of the terminal to determine, for example, how much frequency band the terminal may read or the region of the frequency band that may be read by the terminal. In addition, after identifying the capability of the terminal, the base station may configure a suitable BWP to the terminal. When the terminal receives the RRC message asking the capability of the terminal, a response thereto may be made to indicate the range of the bandwidth supported by the terminal or to which extent the bandwidth is supported in the current system bandwidth by an offset from a reference center frequency or to directly indicate the start point and the ending point of the supported frequency bandwidth or to indicate the same by the center frequency and the bandwidth (1f-40).

The BWP may be configured by an RRCSetup message of the RRC connection configuration or an RRCResume message (1f-25) or an RRCReconfiguration message (1f-45), (1f-65), and (1f-85) and RRCReconfiguration message complete (1f-50)), and (1f-70) and (1f-90), such an RRC message may include configuration information about a PCell or a PSCell or a plurality of SCells, and a plurality of BWPs may be configured for each cell (PCell or PSCell or SCell). When a plurality of BWPs is configured for each cell, a plurality of BWPs to be used in the downlink of each cell may be configured, and in the case of a frequency division duplex (FDD) system, a plurality of BWPs to be used in the uplink of each cell may be configured separately from the downlink BWPs. In the case of a time division duplex (TDD) system, a plurality of BWPs to be commonly used in the downlink and the uplink of each cell may be configured (1f-55), (1f-80), and (1f-95).

The information for BWP configuration of each cell (PCell or PSCell or SCell) may include some of the following information.

Downlink BWP configuration information of cell
  Initial downlink BWP configuration information
  Multiple BWP configuration information and BWP identifier (BWP ID) corresponding to each BWP
  Initial state configuration information of downlink BWP of cell (e.g., active state or dormant state or inactive state)
  BWP identifier indicating first active downlink BWP
  BWP identifier indicating default BWP
  Configuration information for PDCCH monitoring for each BWP. For example, CORESET information, search space resource information, PDCCH transmission resource, period, subframe number information, or the like.
  BWP identifier indicating dormant BWP or 1-bit indicator indicating dormant BWP for each BWP in BWP configuration information
  BWP identifier indicating first active BWP to be activated from dormancy or 1-bit indicator indicating first active BWP to be activated from dormancy for each BWP in BWP configuration information
  BWP inactivity timer configuration and timer value
Uplink BWP configuration information of cell
  Initial uplink BWP configuration information
  Multiple BWP configuration information and BWP identifier (BWP ID) corresponding to each BWP
  Initial state configuration information of downlink BWP of cell (e.g., active state or dormant state or inactive state)
  BWP identifier indicating dormant BWP or 1-bit indicator indicating dormant BWP for each BWP in BWP configuration information
  BWP identifier indicating first active uplink BWP In an embodiment of the disclosure, the configured initial BWP or default BWP or first active BWP may be used for the following purposes and may operate according to the purposes as follows.

In an embodiment of the disclosure, the initial BWP (initial BWP) may be used as a cell-specific BWP that is one BWP in each cell, and may be used as a BWP in which the terminal first accessing the cell may configure a connection to the cell through a random access procedure or the terminal having configured the connection may perform synchronization. The base station may configure an initial downlink BWP to be used in the downlink and an initial uplink BWP to be used in the uplink, for each cell. Configuration information about the initial BWP may be broadcast in the first system information (system information 1 (SIB1)) indicated by the CORESET, and the base station may reconfigure a connection to the accessed terminal through an RRC message. The initial BWP may be used by being designated as the number 0 of a BWP identifier in each of the uplink and the downlink. For example, all terminals accessing the same cell may use the same initial BWP by designating the same as the same BWP identifier #0. For example, when a random access procedure is performed, because the base station may transmit a random access response (RAR) message in the initial BWP that may be read by all the terminals, a contention-based random access procedure may be facilitated (1f-100).

The first active BWP may be configured differently for each terminal (UE specific) and may be indicated by being designated by a BWP identifier among a plurality of BWPs. The first active BWP may be configured for each of the downlink and the uplink, and each of a first active downlink BWP and a first active uplink BWP may be configured as a BWP identifier. The first active BWP may be used to indicate which BWP will be first activated and used when a plurality of BWPs are configured in one cell. For example, when a PCell or a PSCell and a plurality of SCells are configured to the terminal and a plurality of BWPs are configured for each PCell or PSCell or SCell, when the PCell or PSCell or SCell is activated, the terminal may activate and use the first active BWP among the plurality of BWPs configured in the PCell or PSCell or SCell. For example, the first active downlink BWP may be activated and used for the downlink, and the first active uplink BWP may be activated and used for the uplink.

An operation of switching, by the terminal, the current or activated downlink BWP for the SCell to be activated as the first active downlink BWP (or the BWP configured or indicated by the RRC message) or switching the current or activated uplink BWP to be activated as the first active uplink BWP (or BWP configured or indicated by the RRC message) may be performed when an indication to activate a SCell or a BWP of an activated SCell in the inactive state or the dormant state is received or an indication to be switched or activated from an inactive or dormant BWP to a normal BWP is received through the RRC message or the MAC control information or the DCI. In addition, when the terminal receives an indication to transition an activated SCell or BWP to a dormant state or an indication to be switched or activated to a dormant BWP through the RRC message or the MAC control information or the DCI of the PDCCH, the BWP may be switched or transitioned to the dormant BWP or the BWP may be hibernated.

Switching to the dormancy or the dormant BWP or activation of the dormant BWP may mean performing an operation in the dormant state according to an embodiment of the disclosure. For example, without performing PDCCH monitoring, an operation of measuring a channel for a downlink BWP (or a dormant BWP) and reporting the same to the base station may be performed. As another method, when the activated SCell or BWP is activated or switched to the normal BWP, because the downlink BWP may be anyway switched to be activated to the first active downlink BWP and the uplink BWP may be switched to be activated to the first active uplink BWP, the dormant BWP may be configured as the first active downlink or uplink BWP or the default BWP.

The default BWP may be configured differently for each terminal (UE specific) and may be indicated by being designated by a BWP identifier among a plurality of BWPs. The default BWP may be configured only for the downlink. The default BWP may be used as a BWP to which an activated BWP among a plurality of downlink BWPs will fall back after a certain time. For example, a BWP inactivity (deactivation) timer may be configured for each cell or for each BWP through an RRC message, and the BWP inactivity timer may be started or restarted when data transmission/reception occurs in the activated BWP other than the default BWP, or may be started or restarted when the activated BWP is switched to another BWP. When the BWP inactivity timer expires, the terminal may fall back or switch the activated downlink BWP to the default bandwidth in the relevant cell. In this case, switching may refer to a procedure of deactivating a currently activated BWP and activating a BWP instructed to be switched, and the switching may be triggered by an RRC message or MAC control information (MAC CE) or L1 signaling (downlink control information (DCI) of the PDCCH). In addition, the switching may be triggered by indicating the BWP to be switched or to be activated, and the BWP may be indicated by a BWP identifier (e.g., 0 or 1 or 2 or 3 or 4).

The reason for applying and using the default BWP only for the downlink is that the base station may get the terminal to fall back to the default BWP after a certain time for each cell to receive an indication from the base station (e.g., DCI of the PDCCH), thereby facilitating base station scheduling. For example, when the base station configures the default BWP of terminals accessing one cell as the initial BWP, the base station may continue to perform a scheduling indication only in the initial BWP after a certain time. When the default BWP is not configured via the RRC message, the initial BWP may be regarded as the default BWP and the terminal may fall back to the initial BWP when the BWP inactivity timer expires.

As another method, in order to increase the implementation freedom of the base station, a default BWP may be defined and configured also for the uplink and used like the default BWP of the downlink.

The dormant BWP may refer to a BWP or a dormant BWP that is a dormant mode of an activated SCell (dormant BWP in activated SCell). When the dormant BWP is activated, the terminal may not exchange data with the base station, or may not monitor the PDCCH for identifying the indication of the base station, or may not transmit a pilot signal but may perform channel measurement, and may report the measurement results about the measured frequency/cell/channel periodically according to the base station configuration or when an event occurs. Thus, because the terminal does not monitor the PDCCH in the dormant BWP of the activated SCell and does not transmit a pilot signal, the battery may be saved compared to the normal BWP of the activated SCell (or the BWP other than the dormant BWP) or compared to when the normal BWP of the activated SCell (or the BWP other than the dormant BWP) is activated. In addition, unlike when the SCell is deactivated, because a channel measurement report is performed, the base station may rapidly activate the normal BWP of the activated SCell based on the measurement report or based on the measurement report of the dormant BWP of the activated SCell to enable rapid use of the carrier aggregation technology to reduce the transmission delay.

The first active BWP activated from the dormant state (or the first active non-dormant BWP), when the terminal operates a BWP of one activated SCell as a dormant BWP or when an activated BWP is a dormant BWP in an activated S Cell or when it is switched to a dormant BWP in an S Cell, in the case of instructing the terminal to switch the BWP of the activated SCell from the dormant BWP to the normal BWP (or the BWP other than the dormant BWP) through the DCI of the PDCCH or the MAC CE or the RRC message from the base station or in the case of instructing to switch or convert the active BWP from the dormant BWP to the normal BWP or in the case of instructing to switch or convert or activate the active BWP from the dormant BWP to the normal BWP (e.g., the first active BWP activated from dormancy), may be a BWP to be switched to the BWP of the activated SCell by the terminal according to the indication or a BWP to be activated from the dormant state configured in the RRC message.

In the disclosure, the meaning of switching the first BWP to the second BWP may be interpreted as activating the second BWP or as deactivating the activated first BWP and activating the second BWP.

In addition, in the RRCSetup message of the RRC connection configuration or RRCResume message 1f-25 or RRCReconfiguration message 1f-45, a state transition timer may be configured such that the terminal may itself perform a state transition even when the terminal does not receive an indication due to the RRC message or the MAC control information or the DCI of the PDCCH from the base station. For example, a cell deactivation timer (SCellDeactivationTimer) may be configured for each SCell, and when the cell deactivation timer expires, the SCell may be transitioned to the inactive state. Alternatively, by configuring a downlink (or uplink) BWP hibernation timer (DLBWPHibernationTimer or ULBWPHibernationTimer) for each SCell or for each BWP of each SCell and by configuring a cell hibernation timer (SCellHibernationTimer) for each SCell, when the cell hibernation timer or the downlink (or uplink) BWP hibernation timer expires, the SCell or the downlink (or uplink) BWP may be transitioned to the dormant state or may be switched to the dormant BWP. For example, when the cell hibernation timer or the downlink (or uplink) BWP hibernation timer has expired, the activated SCell or downlink (or uplink) BWP may be transitioned to the dormant state or may be switched to the dormant BWP, and the deactivated or hibernated SCell or downlink (or uplink) BWP may not be transitioned to the dormant state or the dormant BWP. In addition, the BWP hibernation timer may start when an indication to switch the BWP or an indication to activate the same is received through the RRC message or the MAC CE or the DCI of the PDCCH. In addition, the BWP hibernation timer may stop when an indication to switch to the dormant BWP or an indication to hibernate or an indication to activate the dormant BWP is received through the RRC message or the MAC CE or the DCI of the PDCCH.

In addition, with respect to each SCell or downlink (or uplink) BWP, by configuring a dormant cell deactivation timer (dormantSCellDeactivationTimer) or a dormant state or downlink (or uplink) dormant BWP deactivation timer (dormantDLDeactivationTimer or dormantULDeactivationTimer), the dormant S Cell or downlink (or uplink) dormant BWP may be transitioned to the inactive state. When the dormant cell deactivation timer or the dormant state or downlink (or uplink) dormant BWP deactivation timer has expired, only the dormant S Cell or downlink (or uplink) dormant BWP may be transitioned to the inactive state and the active or inactive SCell or downlink (or uplink) BWP may not be transitioned to the inactive state. In addition, the dormant BWP hibernation timer may start when an indication to switch the dormant BWP or an indication to hibernate or an indication to activate the dormant BWP is received through the RRC message or the MAC CE or the DCI of the PDCCH. In addition, the dormant BWP hibernation timer may stop when an indication to deactivate or activate the BWP or SCell or an indication to activate the normal BWP (e.g., the BWP other than the dormant BWP configured by the RRC) is received through the RRC message or the MAC CE or the DCI of the PDCCH.

When the cell deactivation timer (SCellDeactivationTimer) (or the downlink (or uplink) BWP hibernation timer) and the cell hibernation timer (SCellHibernationTimer) (or the downlink (or uplink) dormant BWP deactivation timer) are configured together, the cell hibernation timer (SCellHibernationTimer) (or the downlink (or uplink) dormant BWP hibernation timer) may be prioritized. For example, when the cell hibernation timer (SCellHibernationTimer) (or the downlink (or uplink) BWP hibernation timer) is configured, even when the cell deactivation timer (SCellDeactivationTimer) (or the downlink (or uplink) dormant BWP deactivation timer) expires, the SCell or downlink (or uplink) BWP may not be deactivated. In other words, when the cell hibernation timer (or the downlink (or uplink) BWP hibernation timer) is configured, when the SCell or downlink (or uplink) BWP may be first transitioned from the active state to the dormant state or switched to the dormant BWP due to the expiration of the timer, and the dormant cell or the cell or BWP transitioned to the dormant state due to the expiration of the BWP deactivation timer may be transitioned back to the inactive state stage by stage. Thus, when the cell hibernation timer or the BWP hibernation timer is configured, the cell deactivation timer or the dormant BWP deactivation timer may not affect the SCell or downlink (or uplink) BWP state transition, and even when the cell deactivation timer or the dormant BWP deactivation timer expires, when the cell hibernation timer or the BWP hibernation timer is configured, the SCell or downlink (or uplink) BWP may not be directly transitioned to the inactive state.

When the cell deactivation timer (or the downlink (or uplink) BWP hibernation timer) is not configured in the RRC message, the terminal may consider that the cell deactivation timer (or the downlink (or uplink) BWP hibernation timer) is configured as an infinite value.

In addition, in the RRCSetup message of the RRC connection configuration or the RRCResume message 1f-25 or the RRCReconfiguration message 1f-45, frequency measurement configuration information and frequency measurement gap information and the like may be configured, and frequency measurement object information may be included therein. In the RRCSetup message of the RRC connection configuration or the RRCResume message 1f-25 or the RRCReconfiguration message 1f-45, a function (power saving mode) for reducing the power consumption of the terminal may be configured, and configuration information, such as discontinuous reception (DRX) cycle or offset or on-duration period (the period in which the terminal should monitor the PDCCH) or time information, or short time period information or time information indicating when the PDCCH should be monitored or detected from the base station before the on-duration period in the DRX cycle, or the like may be configured together with the function for reducing the power consumption. In this case, when a function for reducing the power consumption of the terminal is configured, the terminal may configure a DRX cycle and detect a wake-up signal (WUS) signal in a period configured to monitor the PDCCH of the base station before the on-duration period. The base station may indicate to the terminal whether to skip (or not perform) or perform PDCCH monitoring in the immediately next on-duration period through the DCI of the PDCCH of the WUS signal. The terminal should always monitor the PDCCH in the on-duration period; however, through the WUS signal, the base station may instruct the terminal not to monitor the PDCCH in the on-duration period, thereby reducing the battery consumption of the terminal.

When the RRC connection configuration is completed through the above procedure, the terminal may configure a plurality of BWPs according to the indication configured by the RRC message. In addition, one of a plurality of BWPs configured or a small number of bandwidths may be activated in order to save the battery. For example, one BWP to be activated may be indicated. In addition, the base station may instruct activation of the BWP through an RRC message or MAC control information (MAC CE) or L1 signaling (a PHY layer control signal, such as DCI of the PDCCH) to instruct switch from an initial access BWP to a new BWP. As another method, in the DCI of the PDCCH, new bitmap information may be defined, and information about activation or hibernation or deactivation may be indicated. As another method, whether to activate the normal BWP (e.g., the first active BWP to be activated from dormancy) or whether to activate the dormant BWP or whether to switch to the dormant BWP or whether to perform BWP switching may be indicated by the bitmap. Because there may be many other newly-connected users in the initial access BWP, it may be more advantageous to allocate a new BWP and manage the connected users separately in terms of scheduling. This is because the initial access BWP is not configured for each terminal but may be shared and used by all the terminals. In addition, in order to reduce signaling overhead, the default BWP may be dynamically indicated by the MAC control information or the L1 signaling or the system information.

Hereinafter, a dormant BWP will be newly proposed in the next-generation mobile communication system, and a terminal operation in each BWP will be particularly proposed when each BWP is transitioned or switched.

Figure 1G:
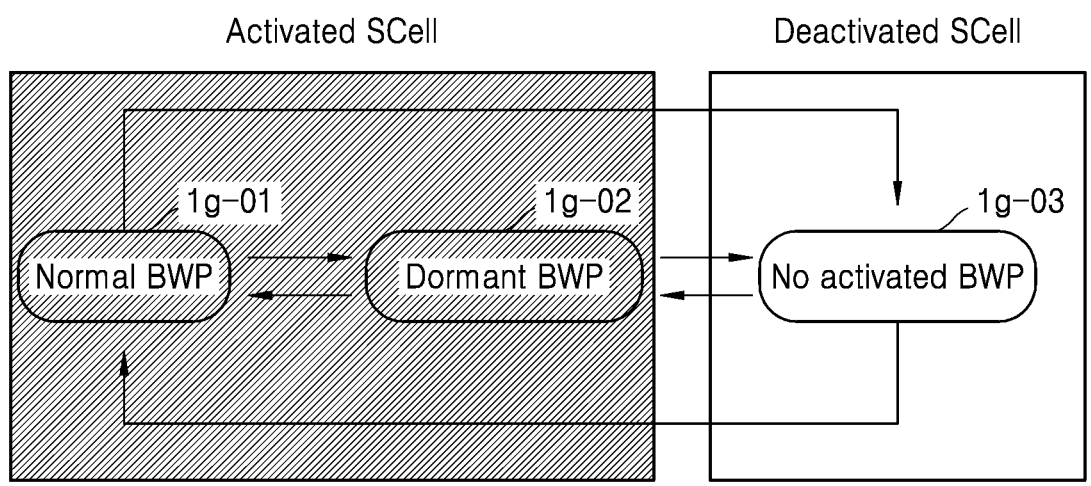
FIG. 1G is a diagram illustrating a BWP-by-BWP state transition or a BWP switching procedure according to an embodiment of the disclosure.

FIG. 1G is a diagram illustrating a BWP-by-BWP state transition or a BWP switching procedure according to an embodiment of the disclosure.

Referring to FIG. 1G, the BWP of each cell (e.g., SCell) of the terminal may be activated as a normal BWP (1g-01) or may be activated as a dormant BWP (1g-02) or may be deactivated (1g-03), and the normal BWP or the dormant BWP may be activated or deactivated due to the indication of the configuration information of the RRC message or the MAC control information or the DCI of the PDCCH. As another method, the BWP of each cell of the terminal may have an active state (1g-01) or an inactive state (1g-03) or a dormant state (1g-02), and state transition may be performed due to the indication of the configuration information of the RRC message or the MAC control information or the DCI of the PDCCH.

In the disclosure, a BWP-by-BWP state transition operation (activation or deactivation or hibernation) of the SCell or an operation of activating the normal BWP or activating the dormant BWP or activating the first active BWP activated from dormancy or deactivating the normal BWP or the dormant BWP may be performed due to the indication or configuration in one of the following cases.

When the BWP state of the SCell is configured by the RRC message, or when the BWP of each SCell is configured by the RRC message and the dormant BWP is configured in the SCell or when the first active BWP is configured as the dormant BWP, it may be characterized by being switched or activated to the dormant BWP to start the SCell and perform an operation in the dormant BWP.

When the SCell activation or deactivation or hibernation MAC CE is received,

When the MAC CE indicating to activate or deactivate the first active BWP or the dormant BWP from the normal BWP or dormancy is received, When the DCI of the PDCCH indicating to activate or deactivate or switch the first active BWP or the dormant BWP from the normal BWP or dormancy is received, When the cell hibernation timer is not configured in the active SCell and the configured cell deactivation timer expires, When the BWP hibernation timer is not configured in the active BWP, and the configured BWP state deactivation timer (e.g., bwpDeactivatedTimer) expires, When the cell hibernation timer configured in the active SCell expires, When the BWP hibernation timer configured in the active BWP expires, When the dormant SCell deactivation timer configured in the dormant SCell expires, When the dormant BWP deactivation timer (dormantBWPDeactivatedTimer) configured in the dormant BWP expires, In addition, the state transition operation or the dormant BWP operation method proposed in the disclosure may have the following characteristics.

The dormant BWP may not be configured in the SpCell (PCell or PSCell) (or the downlink BWP or the uplink BWP of the cell), and only the normal BWP may be configured to be always activated. Because the SpCell synchronizes and transmits and receives a main control signal, it should always be maintained in the active state because the connection with the base station is disconnected when the BWP of the SpCell is hibernated or deactivated or is operated as the dormant BWP.

When it is the BWP of the SCell or the SCell but the PUCCH is configured, the dormant state or the dormant BWP may not be configured. Because there may be another cell that should transmit feedback, such as HARQ ACK/NACK through the PUCCH, the active state or the normal BWP should be activated and used.

Due to such characteristics, the cell deactivation timer (SCellDeactivationTimer) or the BWP hibernation timer may not be applied to the BWP of the SpCell or SpCell and the BWP of the SCell or SCell configured with the PUCCH and may be run only for other SCells.

The cell or BWP hibernation timer (SCellHibernationTimer) may be prioritized over the cell or BWP state deactivation timer (SCellDeactivationTimer). In addition, when one value is configured by the RRC message as a timer value, the same value may be applied to all the cells. As another method, the base station may provide different timer values for each SCell or for each BWP by considering the SCell-by-SCell or BWP-by-BWP characteristics.

When the SCell or the BWP is not indicated as activation or hibernation in the RRC message, it may basically operate in the inactive state initially.

In the disclosure, the uplink may indicate the uplink BWP, and the downlink may indicate the downlink BWP. This is because only one activated or hibernated BWP may be operated for each uplink or downlink.

Hereinafter, a method of operating the state transition in the BWP units (BWP-level) described above will be described in detail to enable rapid activation of the carrier aggregation technology and to save the battery of the terminal.

In the disclosure, as described in FIG. 1F, the BWP may be configured for each cell in the RRCSetup message or the RRCReconfiguration message or the RRCResume message as follows. The RRC message may include configuration information about a PCell or a PSCell or a plurality of SCells, and a plurality of BWPs may be configured for each cell (PCell or PSCell or SCell). When a plurality of BWPs is configured for each cell in the RRC message, a plurality of BWPs to be used in the downlink of each cell may be configured, and in the case of an FDD system, a plurality of BWPs to be used in the uplink of each cell may be configured separately from the downlink BWPs. In the case of a TDD system, a plurality of BWPs to be commonly used in the downlink and the uplink of each cell may be configured.

A first method of the information configuration method for BWP configuration of each cell (PCell or PSCell or SCell) may include a method of including one or more of the following information elements and introducing a new indicator to indicate whether each BWP is the normal BWP (e.g., the BWP that may be operated or configured in the active or inactive state) or the dormant BWP (e.g., the BWP that may be operated or configured in the dormant state). For example, a BWP identifier may be used to indicate whether it is the dormant BWP.

Downlink BWP configuration information of each cell
    Initial downlink BWP configuration information
    Multiple BWP configuration information and BWP identifier (BWP ID) corresponding to each BWP
    Downlink initial state configuration information of cell (e.g., active state or dormant state or inactive state)
    BWP identifier indicating first active downlink BWP BWP identifier indicating default BWP
BWP identifier indicating dormant BWP or 1-bit indicator indicating dormant BWP for each BWP in BWP configuration information
BWP inactivity timer configuration and timer value
Uplink BWP configuration information of each cell
Initial uplink BWP configuration information
Multiple BWP configuration information and BWP identifier (BWP ID) corresponding to each BWP
Uplink initial state configuration information of cell (e.g., active state or dormant state or inactive state)
BWP identifier indicating first active uplink BWP
BWP identifier indicating dormant BWP or 1-bit indicator indicating dormant BWP for each BWP in BWP configuration information As another method of the information configuration method for BWP configuration of each cell (PCell or PSCell or SCell), a second method may not configure configuration information (e.g., search space, PDCCH transmission resource, period, or the like) required to read the PDCCH with respect to the BWP corresponding to the dormant BWP (the period may be configured to be very long, together with other configuration information, in another way) and may configure configuration information required to read the PDCCH (e.g., search space, PDCCH transmission resource, period, or the like) with respect to the normal BWP. This is because the dormant BWP is a BWP for not reading the PDCCH to reduce the battery consumption of the terminal and for performing channel measurement and reporting the channel measurement result to the PCell to enable rapid activation of the BWP or cell to allow rapid allocation of uplink or downlink transmission resources. Thus, in the disclosure, the dormant BWP may refer to a BWP in which configuration information for PDCCH monitoring (e.g., search space, PDCCH transmission resource, period, or the like) is not configured, or may refer to a BWP indicated by a dormant BWP identifier or a BWP in which configuration information for PDCCH monitoring is configured but is configured to monitor with a very long period. As another method, in the disclosure, the dormant BWP may refer to a BWP in which the PDCCH transmission resource, the period, or the like is not configured in configuration information for PDCCH monitoring so as not to perform PDCCH monitoring in the cell configured with the dormant BWP, but search space information or cross-carrier scheduling configuration information is configured such that another cell may receive an indication or switching about the dormant BWP through the cross-carrier scheduling.

Because data transmission/reception is impossible in the dormant BWP, only PDCCH configuration information (PDCCH-config) may be configured (e.g., only search space information may be configured) for the dormant BWP (or the first BWP). On the other hand, because PDCCH monitoring should also be performed and data transmission/reception should also be possible in the normal BWP (or the second BWP) other than the dormant BWP, PDCCH configuration information (e.g., CORESET configuration information or search space configuration information or PDCCH transmission resource or period or the like) or physical downlink shared channel (PDSCH) configuration information or physical uplink shared channel (PUSCH) configuration information or random access-related configuration information may be further configured.

Thus, although the uplink or downlink normal BWP should be configured for each cell, the dormant BWP may or may not be configured for each cell, and the normal BWP and/or dormant BWP configuration may be based on the base station implementation according to the purpose thereof. In addition, according to the base station implementation, the first active BWP or the default BWP or the initial BWP may be configured as the dormant BWP.

In the dormant BWP, the terminal may not exchange data with the base station, may not monitor the PDCCH for identifying the indication of the base station, may not transmit a pilot signal but may perform channel measurement, and may report the measurement results about the measured frequency/cell/channel periodically according to the base station configuration or when an event occurs. Thus, according to an embodiment of the disclosure, because the terminal does not monitor the PDCCH in the dormant BWP and does not transmit a pilot signal, the battery may be saved compared to the active mode. In addition, unlike the inactive mode, because a channel measurement report is performed, the base station may rapidly activate the cell configured with the dormant BWP based on the measurement report of the dormant BWP to use the carrier aggregation technology. In addition, in an embodiment of the disclosure, the dormant BWP may be configured in the downlink BWP configuration information and may be used only for the downlink BWP.

In the disclosure, a terminal operation for the dormant BWP or a terminal operation of the activated SCell when the dormant BWP is activated is as follows.

When the terminal is indicated to be operated or activated with the dormant BWP for a serving cell (PCell or S Cell) from the PCell or SpCell or when an indication to hibernate a serving cell (e.g., SCell) or a BWP (e.g., a downlink BWP) of a serving cell (e.g., SCell) or an indication to activate a dormant BWP is received through the DCI (L1 control signal) of the PDCCH or the MAC CE or the RRC message or when an indication to switch a BWP (e.g., a downlink BWP) to a dormant BWP is received through the DCI (L1 control signal) of the PDCCH or the MAC CE or the RRC message (when the indication is received through the L1 control signal of the PDCCH, the indication may be received in the PDCCH of its own cell by self-scheduling or the indication may be received in the PDCCH for the cell in the PCell by cross-carrier scheduling) or when the BWP hibernation timer has been configured and has expired or when the activated BWP of the activated SCell is the dormant BWP or when the activated BWP of the activated S Cell is not the normal BWP, one or more of the following operations may be performed.

The uplink BWP or the downlink BWP is switched to the BWP (e.g., the dormant BWP) configured in the RRC and the BWP is activated or hibernated.

The cell deactivation timer running or configured in the cell or the BWP is stopped.

When the BWP hibernation timer is configured in the BWP of the cell, the BWP hibernation timer is stopped.

The dormant BWP deactivation timer is started or restarted in the BWP of the cell.

The BWP deactivation timer configured for the BWP of the cell is stopped. This is to prevent an unnecessary BWP switching procedure in the cell.

The periodic downlink transmission resource (DL semi-persistent scheduling (SPS) or configured downlink assignment) or the periodic uplink transmission resource (UL SPS or configured uplink grant Type 2) configured in the BWP of the cell may be released (cleared). In this case, "releasing (clearing)" may mean that the terminal stores configuration information, such as period information configured in the RRC message but information about periodic transmission resources indicated or activated by L1 signaling (e.g., DCI) is removed and no longer used. The above method, that is, an operation of clearing the configured periodic downlink transmission resource (DL SPS or configured downlink assignment) or the configured periodic uplink transmission resource (UL SPS or configured uplink grant) may be performed only when the BWP is transitioned from the active state to the dormant state. This is because, when the BWP is transitioned from the inactive state to the dormant state, there is no information about periodic transmission resource information indicated or activated by L1 signaling. As another method, periodic transmission resources may be released only when periodic downlink transmission resources or periodic uplink transmission resources are configured or are configured and used.

- The periodic uplink transmission resource (configured uplink grant Type 1 configured by the RRC) configured in the BWP of the cell may be suspended. In this case, "suspending" may mean that the terminal stores the transmission resource configuration information configured in the RRC message but it is no longer used. The above method, that is, an operation of suspending the configured periodic uplink transmission resource (configured uplink grant Type 1) may be performed only when the BWP is transitioned from the active state to the dormant state. This is because the periodic transmission resource is not used when the BWP is transitioned from the inactive state to the dormant state. As another method, periodic transmission resources may be released only when periodic downlink transmission resources or periodic uplink transmission resources are configured or are configured and used.
- All HARQ buffers configured in the uplink or downlink BWP are emptied.
- The terminal does not transmit the SRS for the uplink BWP of the cell.
- In the BWP of the cell, the terminal performs channel measurement (CSI or CQI or precoding matrix indicator (PMI) or rank indication (RI) or precoding type indicator (PTI) or CSI-RS resource indicator (CRI) or the like) on the downlink according to the configuration of the base station and performs measurement report. For example, the channel or frequency measurement report may be periodically performed.
- In the BWP of the cell, the uplink data is not transmitted on the UL-SCH.
- The random access procedure is not performed on the BWP of the cell.
- In the BWP of the cell, the terminal does not monitor the PDCCH.
- The terminal does not monitor the PDCCH for the BWP of the cell. However, in the case of cross-scheduling, the PDCCH for the cell (e.g., SCell) may be monitored in the scheduled cell (e.g., PCell) to receive an indication thereof
- PUCCH or shortened physical uplink control channel (SPUCCH) transmission is not performed in the BWP of the cell.
- The downlink BWP may be hibernated, channel measurement may be performed and reported, and the uplink BWP of the cell may be deactivated and may not be used. This is because, in the dormant SCell, channel measurement is performed only on the downlink BWP, and the measurement result is reported in the uplink BWP of the SpCell (PCell or PSCell) or the SCell with the PUCCH.

When switching or activation is indicated to the dormant BWP for the downlink or hibernation is indicated for the BWP, the random access procedure may be performed without cancellation. This is because, in the SCell, when a random access procedure is performed, a preamble is transmitted on the uplink and a random access response is received on the downlink of the PCell. Thus, no problem arises even when the downlink BWP is hibernated or switched to the dormant bandwidth.

In the disclosure, a terminal operation for when the normal BWP (active BWP) of the activated S Cell is activated or when the BWP other than the dormant BWP is activated is as follows.

When an indication to activate the normal BWP (e.g., the downlink BWP) of the current cell (PCell or SCell) or the normal BWP other than the dormant BWP or an indication to activate the cell is received through the DCI (L1 control signal) of the PDCCH or the MAC CE or the RRC message or when an indication to switch the BWP (e.g., the downlink BWP) to the active BWP (or the BWP other than the dormant BWP) is received through the DCI (L1 control signal) of the PDCCH or the MAC CE or the RRC message or when the activated BWP of the currently activated cell is the normal BWP or when the activated BWP of the currently activated cell is not the dormant BWP (when the indication is received through the L1 control signal of the PDCCH, the indication may be received in the PDCCH of its own cell by self-scheduling or the indication may be received in the PDCCH for the cell in the PCell by cross-carrier scheduling), one or more of the following operations may be performed.

- It is switched and activated to the indicated uplink or downlink BWP. Alternatively, the uplink or downlink BWP is switched to the designated BWP (e.g., the uplink or uplink first active BWP) and the BWP is activated.
- In the activated BWP, a sounding reference signal (SRS) is transmitted such that the base station may perform channel measurement on the uplink. For example, it may be periodically transmitted.
- When the PUCCH is configured in the activated BWP, PUCCH transmission is performed.
- The BWP or cell deactivation timer is started or restarted. As another method, the BWP or cell deactivation timer may be started or restarted only when the BWP or cell hibernation timer is not configured. When the BWP or cell hibernation timer may be configured through the RRC message, the BWP or cell may be hibernated upon expiration of the timer. For example, the BWP or cell deactivation timer may be started or restarted only in the hibernated BWP or cell.
- When there is a type 1 configuration transmission resource that has been suspended, the stored type 1 transmission resource may be initialized to the original configuration and used. The type 1 configuration transmission resource may be a periodic transmission resource (uplink or downlink) previously allocated through the RRC message and may refer to a transmission resource that may be activated and used through the RRC message.
- PHR is triggered for the BWP.

In the activated BWP, the terminal may report the channel measurement result (CSI or CQI or PMI or RI or PTI or CRI or the like) on the downlink according to the configuration of the base station.

In the activated BWP, the PDCCH is monitored to read the indication of the base station.

The PDCCH is monitored to read cross-scheduling for the activated BWP.

The BWP or cell deactivation timer is started or restarted. As another method, the BWP deactivation timer may be started or restarted only when the BWP hibernation timer is not configured. When the BWP hibernation timer may be configured through the RRC message, the BWP may be switched to the dormancy or the dormant BWP upon expiration of the timer. For example, the BWP deactivation timer may be started or restarted only in the dormant BWP.

When the link BWP hibernation timer is configured for the BWP,

The BWP hibernation timer is started or restarted for the BWP.

In the disclosure, a terminal operation for when the active BWP or the BWP or the SCell is deactivated is as follows.

When an indication to deactivate the BWP (e.g., the downlink BWP) of the current cell (PCell or SCell) or the cell is received through the DCI (L1 control signal) of the PDCCH or the MAC CE or the RRC message or when an indication to deactivate the BWP (e.g., the downlink BWP) or an indication to switch to the inactive BWP is received through the DCI (L1 control signal) of the PDCCH or the MAC CE or the RRC message (when the indication is received through the L1 control signal of the PDCCH, the indication may be received in the PDCCH of its own cell by self-scheduling or the indication may be received in the PDCCH for the cell in the PCell by cross-carrier scheduling) or when the BWP or cell deactivation timer has expired in the cell or when the activated SCell is deactivated or when the BWP of the SCell is deactivated, one or more of the following operations may be performed.

The cell's or indicated uplink or downlink BWP is deactivated.

The terminal stops the BWP deactivation timer (e.g., the deactivation timer for the downlink BWP) that is configured and run in the cell or BWP.

The periodic downlink transmission resource (DL SPS or configured downlink assignment) or the periodic uplink transmission resource (UL SPS or configured uplink grant Type 2) configured in the cell or BWP may be released (cleared). In this case, "releasing (clearing)" may mean that the terminal stores configuration information, such as period information configured in the RRC message but information about periodic transmission resources indicated or activated by L1 signaling (e.g., DCI) is removed and no longer used. The periodic transmission resource may be referred to as a type 2 configuration transmission resource. In addition, an operation of releasing the periodic transmission resource may be performed only when the SCell is transitioned from the active state to the inactive state. This is because, when transitioning from the dormant state to the inactive state, a release operation is not required because there is no periodic transmission resource in the dormant state. As another method, periodic transmission resources may be released only when periodic downlink transmission resources or periodic uplink transmission resources are configured or are configured and used.

The periodic uplink transmission resource (configured uplink grant Type 1 configured by the RRC) configured in the cell or BWP may be suspended. In this case, "suspending" may mean that the terminal stores the transmission resource configuration information configured in the RRC message but it is no longer used. The periodic transmission resource may be referred to as a type 1 configuration transmission resource. In addition, an operation of releasing the periodic transmission resource may be performed only when the S Cell is transitioned from the active state to the inactive state. This is because, when transitioning from the dormant state to the inactive state, a release operation is not required because there is no periodic transmission resource in the dormant state. As another method, periodic transmission resources may be released only when periodic downlink transmission resources or periodic uplink transmission resources are configured or are configured and used.

All HARQ buffers configured for the cell or BWP are emptied.

When there is a PUSCH transmission resource configured for a periodic channel measurement report (semi-persistent CSI reporting) for the cell or BWP, it is released (cleared).

The terminal does not transmit the SRS for the cell or BWP.

For the cell or BWP, the terminal does not perform and does not report channel measurement (CSI or CQI or PMI or RI or PTI or CRI or the like) on the downlink.

In the cell or BWP, the uplink data is not transmitted on the UL-SCH.

The random access procedure is not performed on the cell or BWP.

In the cell or BWP, the terminal does not monitor the PDCCH.

The terminal does not monitor the PDCCH for the cell or BWP. In addition, even in the case of cross-scheduling, the PDCCH for the cell is not monitored in the scheduled cell.

PUCCH or SPUCCH transmission is not performed in the cell or BWP.

In the disclosure, when an active state or an inactive state or a dormant state is operated and cell or BWP transition or switching is performed, it may be performed in BWP units, and when state transition or switching occurs in BWP units, a BWP (downlink BWP or uplink BWP) indicated with state transition or switching may perform state transition or switching according to a state transition or switching indication. For example, when the BWP (downlink or uplink BWP) is transitioned from the active state to the dormant state or when it is switched (activated) to the dormant BWP, it may be transitioned to the dormant state or may be switched (or activated) to the dormant BWP.

In the disclosure, "BWP switching" may mean that, when BWP switching is indicated by the DCI of the PDCCH and when switching is indicated by a BWP identifier while allocating a downlink assignment, the downlink BWP is switched to the BWP indicated by the BWP identifier; and when BWP switching is indicated by the DCI of the PDCCH and when switching is indicated by a BWP identifier while allocating an UL grant, the uplink BWP is switched to the BWP indicated by the BWP identifier. In addition, because the DCI format of the PDCCH is different from the format for downlink assignment (format1) and the format for UL grant (format0), the terminal may operate according to the DCI format although the uplink and the downlink are not separately described.

The above method of operating the state transition in BWP units (BWP-level) and the above operation of the BWP according to each state may be extended and applied to various embodiments of the disclosure. Hereinafter, particular embodiments to which the contents proposed in the disclosure are extended and applied will be described.

Figure 1H:
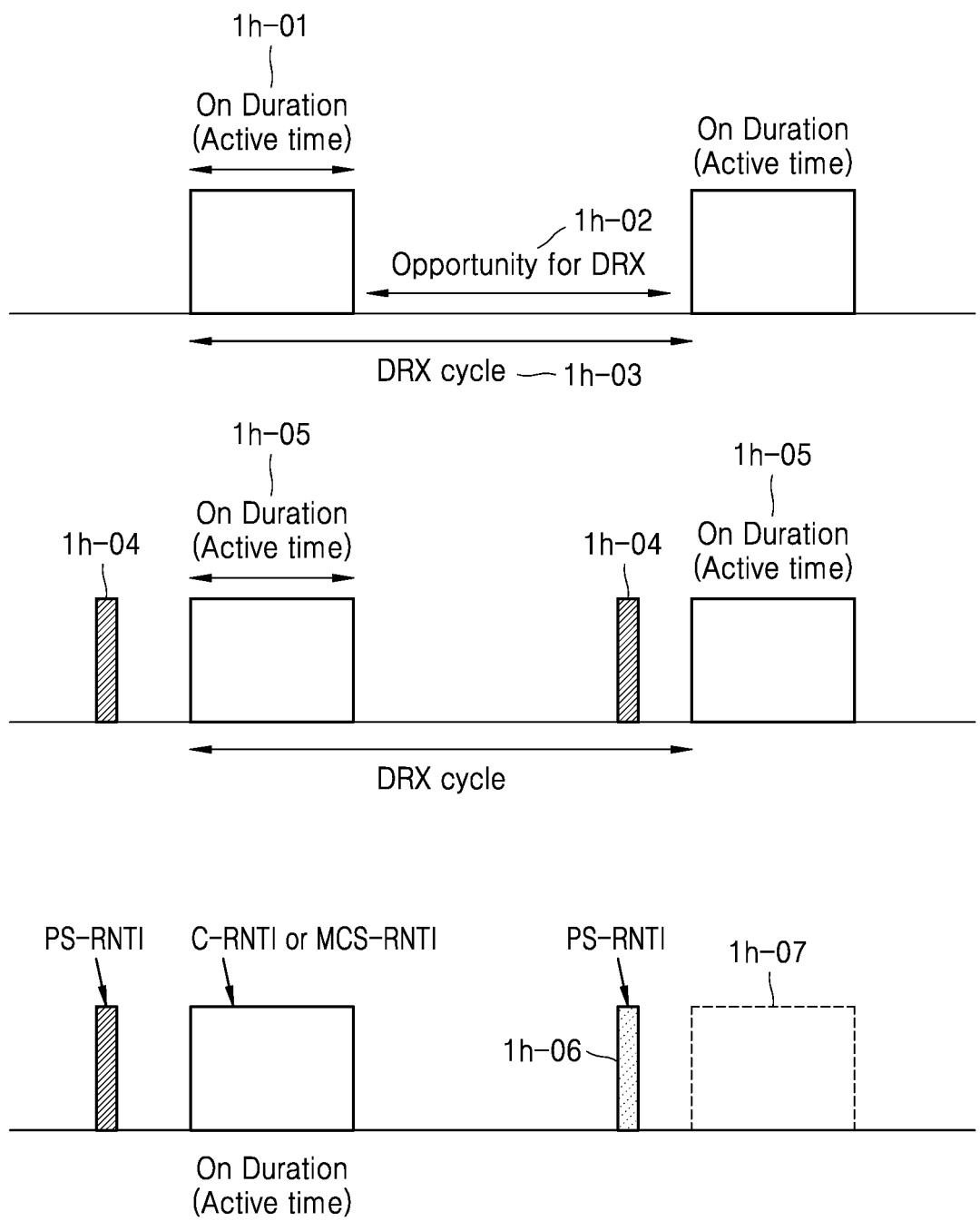
FIG. 1H is a diagram illustrating a discontinuous reception (DRX) configuration or a DRX operating method capable of saving a battery of a terminal according to an embodiment of the disclosure.

FIG. 1H is a diagram illustrating a DRX configuration or a DRX operating method capable of saving a battery of a terminal according to an embodiment of the disclosure.

Referring to FIG. 1H, the base station may configure, to the terminal, a DRX function, such as a DRX cycle or a start point or an offset or an on-duration (active period or active time) in a PCell or SCell or PSCell through an RRC message as in FIG. 1F. In the disclosure, configuring the DRX function to the PCell or SpCell or PSCell is considered.

When the DRX function is configured in the PCell (or SpCell or PSCell), the terminal may apply the DRX function by considering a DRX cycle (1h-03) and a DRX start time or an offset. When the DRX function is applied, the terminal may monitor the PDCCH or the DCI of the PDCCH that may be received in the PCell from the base station, only in an active period (on-duration or active time) (1h-01) of DRX. In addition, the terminal may not monitor the PDCCH or the DCI of the PDCCH in an outside active period (outside active time) (1h-02) of the DRX function, thus reducing the battery consumption of the terminal.

In FIG. 1F, the base station may configure a power saving mode to the terminal through an RRC message in order to further reduce the battery consumption of the terminal. When the power saving function is configured together with the DRX function, the terminal may monitor the PDCCH during a short period (1h-04) configured by RRC before the active time (1h-01) in which the terminal should monitor the PDCCH in the DRX function, and may monitor and receive a wake-up signal (WUS) signal in the outside active period. Through the bit of the DCI of the PDCCH of the WUS signal, the base station may indicate whether the terminal should or may not perform PDCCH monitoring in the next active time (1h-05 and 1h-07).

For example, the terminal configured with the power saving function or the DRX function may monitor the WUS signal during the short period (1h-04) configured in the RRC message before each active time (1h-05), and when the bit of the DCI of the PDCCH about the next active time (1h-05 and 1h-07) has a value of 0 (or 1) in the received WUS signal, it may indicate that the terminal does not monitor the PDCCH during the next active time (1h-07) or it may indicate that the terminal may not monitor the PDCCH by not running the timer corresponding to the next active time in the MAC layer. When the bit of the DCI of the PDCCH about the next active time (1h-05 and 1h-07) has a value of 1 (or 0) in the received WUS signal, it may indicate that the terminal monitors the PDCCH during the next active time (1h-05) or it may indicate that the terminal monitors the PDCCH by running the timer corresponding to the next active time in the MAC layer.

In addition, in the active period, the terminal may not monitor the WUS signal or the PDCCH for detection of the WUS signal.

In addition, the terminal configured with the power saving function or the DRX function may detect a signal by identifying the PDCCH through a first RNTI identifier (e.g., PS-RNTI) (1h-06) when monitoring the WUS signal during the short period (1h-04) configured in the RRC message before each active time (1h-05). The first RNTI identifier (e.g., PS-RNTI) may be configured to a plurality of terminals, and the base station may use the first RNTI identifier (e.g., PS-RNTI) to simultaneously instruct the plurality of terminals to monitor or not to monitor the PDCCH in the next active period.

In addition, the terminal configured with the power saving function or the DRX function may detect a signal based on a second RNTI (e.g., C-RNTI) or a third RNTI (e.g., MCS-C-RNTI) or a fourth RNTI (SPS-C-RNTI) uniquely configured to the terminal through the RRC message when monitoring and detecting the PDCCH in the active time (1h-05). The second RNTI (e.g., C-RNTI) may be used to indicate a general scheduling of the terminal, the third RNTI (e.g., MCS-C-RNTI) may be used to indicate a modulation and coding scheme (MCS) of the terminal, and the fourth RNTI (SPS-C-RNTI) may be used to indicate a periodic transmission resource of the terminal.

FIG. 1I is a diagram for describing a method of operating a dormant BWP in an activated SCell according to an embodiment of the disclosure.

Referring to FIG. 1F, for the carrier aggregation technology, the base station may configure a plurality of SCells to the terminal through an RRC message, allocate each SCell identifier, and configure a dormant BWP for each SCell. In addition, a plurality of SCells may be included and configured in each SCell group, and one SCell group may include a plurality of SCells. A SCell group identifier may be assigned to each SCell group, and a plurality of S Cell identifiers may be configured to be included in or mapped to each SCell group identifier. A SCell identifier value or a SCell group identifier value may be assigned as a value of a certain bit and may have an integer value (or a natural value).

Referring to FIG. 1I, the base station may define a new bitmap in the DCI of the PDCCH transmitted in the PCell (1i-05), may map each bit value of the bitmap to indicate each SCell identifier value or each SCell group identifier value, and may define each bit value to indicate whether to switch to a dormant BWP or whether to activate a dormant BWP for a SCell (1i-02) corresponding to the bit or SCells belonging to the SCell group. In addition, each bit value may be defined to indicate whether to switch from a dormant BWP to a normal BWP (1i-11) (e.g., a first active BWP activated from dormancy) or whether to activate a normal BWP (1i-12) (e.g., a first active BWP activated from dormancy) for a SCell corresponding to the bit or SCells belonging to the SCell group.

In FIG. 1I, after receiving DCI of the PDCCH in a PCell 1i-01, the terminal may read the DCI and determine whether there is a bitmap including an indication for a BWP of a SCell or SCell groups (1i-23) (e.g., to be switched or activated to a dormant BWP or to be switched or activated to a normal BWP) and may, when there is a bitmap, switch or activate a BWP according to a bit value for a SCell indicated by each bit of the bitmap or SCells 1i-02 and 1i-03 belonging to a SCell group. For example, when the bit of the bitmap indicates a first SCell 1i-02 (or a first SCell identifier) or indicates a SCell group including the first SCell (or a SCell group identifier) and the bit value is 0 (or 1), the terminal may activate a BWP 1i-21 to a dormant BWP 1i-22 for the first SCell 1i-02 or may switch a current BWP to the dormant BWP 1i-22 or may, when the current BWP is not a dormant BWP, switch or activate the currently-activated BWP 1i-21 to the dormant BWP 1i-22 (1i-25).

In FIG. 1I, after receiving DCI of the PDCCH in the PCell 1i-01, the terminal may read the DCI and determine whether there is a bitmap including an indication for a BWP of a SCell or SCell groups (e.g., to be switched or activated to a dormant BWP or to be switched or activated to a normal BWP (1i-31)) and may, when there is a bitmap, switch or activate a BWP according to a bit value for a SCell indicated by each bit of the bitmap or SCells 1i-02 and 1i-03 belonging to the SCell group. For example, when the bit of the bitmap indicates a second SCell 1i-03 (or a second SCell identifier) or indicates a SCell group including the second SCell (or a SCell group identifier) and the bit value is 1 (or 0), the terminal may, when the currently-activated BWP is a dormant BWP with respect to the second SCell 1i-03 (1i-32) or when the currently-activated BWP is not a normal BWP or when the current BWP (or cell) is activated and the current BWP is activated to a dormant BWP 1i-32 (or when it is activated to a BWP that is not a normal BWP), switch or activate a BWP of the second SCell 1i-03 to a BWP configured by the RRC message (e.g., a first active BWP 1i-33 activated from dormancy) (1i-35). When the bit value is 1 (or 0) and thus a SCell indicated by the bit or SCells belonging to the SCell group should be switched or activated to a dormant BWP, when the SCell or each of the SCells belonging to the SCell group is in an inactive state or the SCell is in an active state and the activated BWP is not a dormant BWP (or a normal BWP), the bit value may not be applied or may be ignored or may not be read.

Figure 1J:
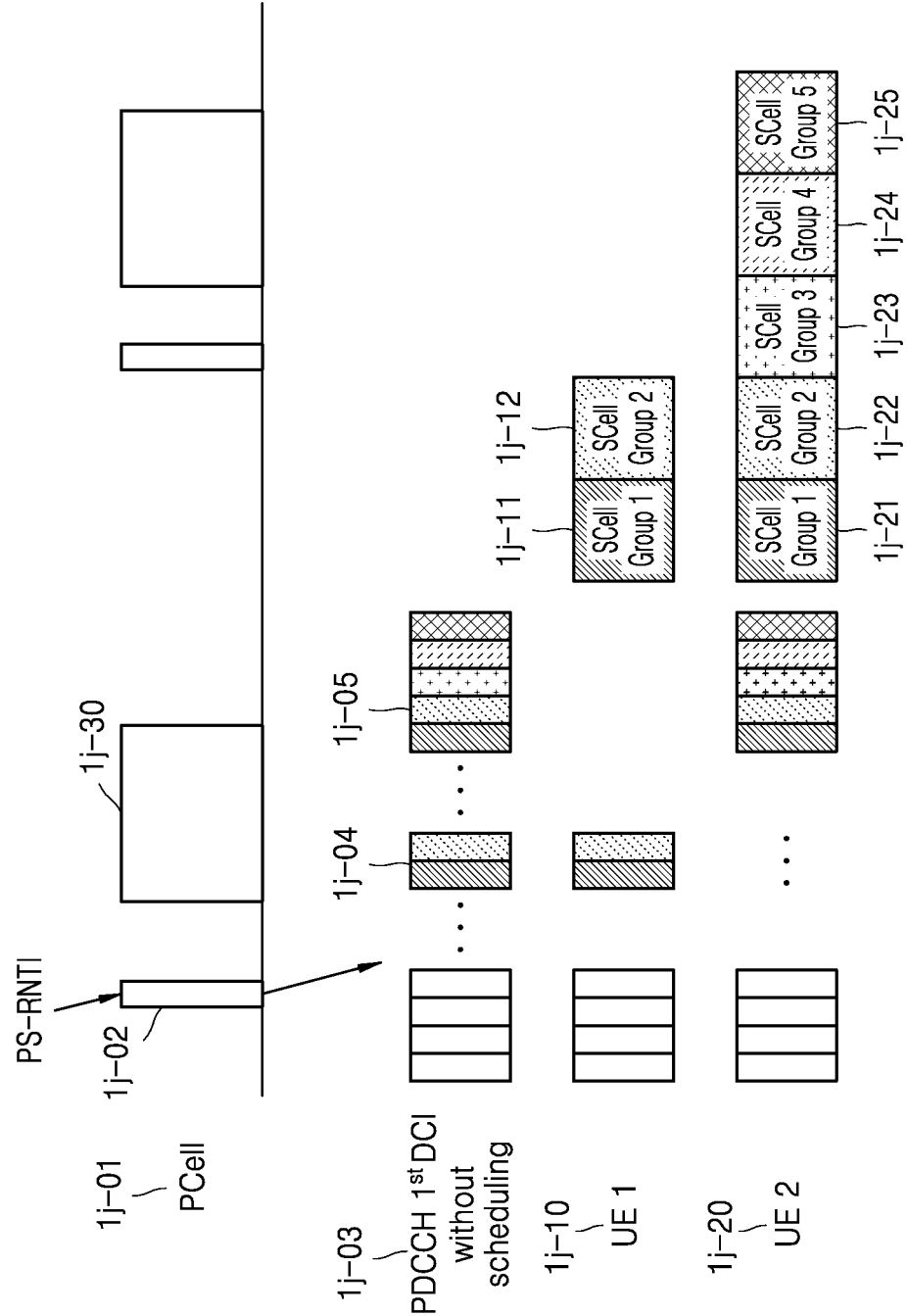
FIG. 1J illustrates Embodiment 1 of the method of operating a dormant BWP in an activated SCell described in FIG. 1I according to an embodiment of the disclosure.

FIG. 1J illustrates Embodiment 1 of the method of operating a dormant BWP in an activated SCell described in FIG. 1I according to an embodiment of the disclosure.

Referring to FIG. 1J, in Embodiment 1, for the carrier aggregation technology, the base station may configure a plurality of SCells to the terminal through an RRC message as in FIG. 1F, may allocate each SCell identifier, may configure a dormant BWP for each SCell, and may not configure a dormant BWP for a certain SCell. In addition, a plurality of SCells may be included and configured in each SCell group, and one SCell group may include a plurality of SCells. A SCell group identifier may be assigned to each SCell group, and a plurality of SCell identifiers may be configured to be included in or mapped to each SCell group identifier. A SCell identifier value or a SCell group identifier value may be assigned as a value of a certain bit and may have an integer value (or a natural value). In addition, SCell groups or SCell group identifiers configured for or to apply to Embodiment 1 of the disclosure may be referred to as first SCell groups. In Embodiment 1 of the disclosure, the first SCell groups may indicate group identifiers applying an operation of monitoring, by the terminal, the DCI of the PDCCH in a short period (out of active time) or a period outside an active period and indicating in a bitmap value of the received DCI.

Referring to FIG. 1J, the base station may configure a power saving function or a DRX function to each of a plurality of terminals through an RRC message as in FIG. 1F. In addition, time information about a short period 1j-02, in which a first DCI format or a WUS signal should be detected before an active period 1j-30 of a DRX cycle in a PCell or SpCell, or configuration information about the first DCI format may be configured to each terminal through the RRC message, and when the terminal detects the first DCI format in the PCell or SpCell in the short period 1j-02, the position of a bitmap including an indication for the first SCell groups for each terminal in the first DCI format may be configured through the RRC message. In addition, through the RRC message, to the terminal, the base station may configure a terminal identifier (e.g., PS-RNTI) or a search space for PDCCH monitoring for detecting the first DCI format during the short period 1j-02. Because the terminal does not monitor the DCI of the PDCCH when switched or activated to a dormant BWP for the SCell, it may be very inefficient for the terminal to receive the bitmap or the DCI of the PDCCH proposed herein in the SCell that is not the PCell or SpCell. Thus, it will be described that the DCI of the PDCCH proposed herein is to be monitored in the PCell or SpCell.

For example, the base station may configure a power saving function or a DRX function to a plurality of terminals and may transmit the first DCI format on a transmission resource of the PDCCH in the short period 1j-02 configured before the next active period 1j-30 of the DRX cycle configured to the terminals (1j-03), and the first DCI format may include bitmaps 1j-04 and 1j-05 including indication information for a dormant BWP about the first SCell groups configured in each of the plurality of terminals.

A first terminal 1j-10 applying the information configured by the RRC message may perform PDCCH monitoring based on the PS-RNTI as the identifier configured in the short period 1j-02 configured before the next active period 1j-30 of the DRX cycle and may detect the first DCI format from the base station in the search space (1j-03). When the first DCI format 1j-03 is detected, the first terminal may read the bitmap 1j-04 including indication information for a dormant BWP about the first SCell groups of the first terminal through the time information or the position information configured in the RRC message in the first DCI format 1j-03. The length of the bitmap may be configured to be equal to the number of first SCell groups configured to the first terminal and it may be configured up to a certain number (e.g., five). In addition, each bit value of the bitmap may be indicated by being mapped to each of the first SCell groups in ascending order of each SCell group identifier value of the first SCell groups configured in the first terminal from the right bit of the bitmap (e.g., from the least significant bit (LSB)). As another method, each bit value of the bitmap may be indicated by being mapped to each of the first SCell groups in descending order of each SCell group identifier value of the first SCell groups configured in the first terminal from the right bit of the bitmap (e.g., from the least significant bit (LSB)). As another method, each bit value of the bitmap may be indicated by being mapped to each of the first SCell groups in ascending order of each SCell group identifier value of the first SCell groups configured in the first terminal from the left bit of the bitmap (e.g., from the most significant bit (MSB)). As another method, each bit value of the bitmap may be indicated by being mapped to each of the first SCell groups in descending order of each SCell group identifier value of the first SCell groups configured in the first terminal from the left bit of the bitmap (e.g., from the most significant bit (MSB)).

When the bit value of bitmaps 1j-11 and 1j-12 is 0, the bit value 0 may indicate that it is to be switched to the dormant BWP or is to activate the dormant BWP for each activated SCell among the SCells included in the first SCell group corresponding to the bit (when the dormant BWP has been configured). As another method, when the bit value of the bitmap for the terminal is 0, the bit value 0 may indicate that it is to be switched to a dormant BWP or is to activate a dormant BWP when an activated BWP is not a dormant BWP (or when it is a normal BWP) for each activated SCell among the SCells included in the first SCell group corresponding to the bit.

When the bit value of the bitmap is 1, the bit value 1 may indicate that it is to be switched to a normal BWP (e.g., a first active BWP activated from dormancy) or is to be activated to a normal BWP (e.g., a first active BWP activated from dormancy) for each activated SCell among the SCells included in the first SCell group corresponding to the bit. As another method, when the bit value of the bitmap for the terminal is 1, the bit value 1 may indicate that it is to be switched to a normal BWP (e.g., a first active BWP activated from dormancy) or is to be activated to a normal BWP (e.g., a first active BWP activated from dormancy) when an activated BWP is a dormant BWP (or when it is not a normal BWP) for each activated SCell among the SCells included in the first SCell group corresponding to the bit, otherwise (when a current or activated BWP is not a dormant BWP (or when it is a normal BWP) for each activated SCell among the SCells included in the first SCell group corresponding to the bit), the current active BWP may be maintained as it is or may be continuously used or applied or may be activated. As another method, when the bit value of the bitmap for the terminal is 1, the bit value 1 may indicate that it is to be switched from a dormant BWP to a normal BWP (e.g., a first active BWP activated from dormancy) or is to be activated to a normal BWP (e.g., a first active BWP activated from dormancy) for each activated SCell among the SCells included in the first SCell group corresponding to the bit, or may indicate that the current active BWP is to be maintained as it is or is to be continuously used or applied or is to be activated.

In addition, a second terminal 1*j*-20 applying the information configured by the RRC message may perform PDCCH monitoring based on the PS-RNTI as the identifier configured in the short period 1*j*-02 configured before the next active period 1*j*-30 of the DRX cycle and may detect the first DCI format from the base station in the search space (1*j*-03). When the first DCI format 1*j*-03 is detected, the second terminal may read the bitmap 1*j*-05 including indication information for a dormant BWP about the first SCell groups of the second terminal through the time information or the position information configured in the RRC message in the first DCI format 1*j*-03. The length of the bitmap may be configured to be equal to the number of first SCell groups configured to the second terminal or it may be configured up to a certain number (e.g., five). In addition, each bit value of the bitmap may be indicated by being mapped to each of the first S Cell groups in ascending order of each S Cell group identifier value of the first SCell groups configured in the second terminal from the right bit of the bitmap (e.g., from the least significant bit (LSB)). As another method, each bit value of the bitmap may be indicated by being mapped to each of the first SCell groups in descending order of each SCell group identifier value of the first SCell groups configured in the second terminal from the right bit of the bitmap (e.g., from the least significant bit (LSB)). As another method, each bit value of the bitmap may be indicated by being mapped to each of the first SCell groups in ascending order of each SCell group identifier value of the first SCell groups configured in the second terminal from the left bit of the bitmap (e.g., from the most significant bit (MSB)). As another method, each bit value of the bitmap may be indicated by being mapped to each of the first SCell groups in descending order of each SCell group identifier value of the first SCell groups configured in the second terminal from the left bit of the bitmap (e.g., from the most significant bit (MSB)).

When the bit value of bitmaps 1*j*-21, 1*j*-22, 1*j*-23, 1*j*-24, and 1*j*-25 is 0, the bit value 0 may indicate that it is to be switched to the dormant BWP or is to activate the dormant BWP for each activated SCell among the SCells included in the first SCell group corresponding to the bit (when the dormant BWP has been configured). As another method, when the bit value of the bitmap for the terminal is 0, the bit value 0 may indicate that it is to be switched to a dormant BWP or is to activate a dormant BWP when an activated BWP is not a dormant BWP (or when it is a normal BWP) for each activated SCell among the SCells included in the first SCell group corresponding to the bit.

When the bit value of the bitmap is 1, the bit value 1 may indicate that it is to be switched to a normal BWP (e.g., a first active BWP activated from dormancy) or is to be activated to a normal BWP (e.g., a first active BWP activated from dormancy) for each activated SCell among the SCells included in the first SCell group corresponding to the bit. As another method, when the bit value of the bitmap for the terminal is 1, the bit value 1 may indicate that it is to be switched to a normal BWP (e.g., a first active BWP activated from dormancy) or is to be activated to a normal BWP (e.g., a first active BWP activated from dormancy) when an activated BWP is a dormant BWP (or when it is not a normal BWP) for each activated SCell among the SCells included in the first SCell group corresponding to the bit, otherwise (when a current or activated BWP is not a dormant BWP (or when it is a normal BWP) for each activated SCell among the SCells included in the first SCell group corresponding to the bit), the current active BWP may be maintained as it is or may be continuously used or applied or may be activated. As another method, when the bit value of the bitmap for the terminal is 1, the bit value 1 may indicate that it is to be switched from a dormant BWP to a normal BWP (e.g., a first active BWP activated from dormancy) or is to be activated to a normal BWP (e.g., a first active BWP activated from dormancy) for each activated SCell among the SCells included in the first SCell group corresponding to the bit, or may indicate that the current active BWP is to be maintained as it is or is to be continuously used or applied or is to be activated.

Embodiment 1 of the disclosure may operate as described above, the first DCI format of the PDCCH described in Embodiment 1 may be used in a short period, and the terminal may not be accompanied by downlink transmission resources (e.g., PDSCH) or uplink transmission resources (e.g., PUSCH). Thus, in Embodiment 1 of the disclosure, the terminal may receive the first DCI format of the PDCCH and may not transmit ACK or NACK information (e.g., HARQ ACK or NACK) thereabout.

Embodiment 1 of the disclosure described above may operate more particularly as follows.

In Embodiment 1 of the disclosure, a dormant or non-dormant operation for SCells of the terminal and an operation for a PDCCH monitoring indicator are as follows.

The terminal configured with a DRX function or a power saving function for the PCell or SpCell may monitor the PDCCH in the short period 1*h*-04 or 1*j*-01 described in FIG. 1H or 1J and may perform the following operations. In addition, the terminal may perform PDCCH monitoring in the activated downlink BWP of the PCell or SpCell.

The terminal may perform PDCCH monitoring and may perform a search for the first DCI format (e.g., DCI 2-6 format) or the WUS signal by the PS-RNTI.

The terminal may be configured with a plurality of search space sets and apply the same in order to perform PDCCH monitoring for detection of the first DCI format (e.g., 2-6 format) or the WUS signal in the activated downlink BWP of the PCell or SpCell according to the common search area configured by the RRC message.

The data (payload) size of the first DCI format may be determined by the size configured in the RRC (e.g., SizeDCI_2-6).

When the terminal has detected the WUS signal or the first DCI format, the terminal may identify the position of the PDCCH monitoring indicator of the WUS signal configured in the RRC, and when the value of the PDCCH monitoring indicator is 0, the terminal may not perform PDCCH monitoring in the active period by not starting the timer for the active period (on-duration or active time) for the next long DRX cycle. When the value of the PDCCH monitoring indicator is 1, the terminal may perform PDCCH monitoring in the active period by starting the timer for the active period (on-duration or active time) for the next long DRX cycle.

When the terminal has detected the WUS signal or the first DCI format, the terminal may identify the WUS position configured in the RRC, and when the terminal is configured with a plurality of first SCell groups for Embodiment 1 of the disclosure from the RRC message, the terminal may read the size of the bitmap corresponding to the number of first S Cell groups.

The position of the bitmap for Embodiment 1 of the disclosure may be located immediately after the PDCCH monitoring indicator.

The size of the bitmap for Embodiment 1 of the disclosure may be equal to the number of first SCell groups in which SCells configured to the terminal by RRC messages are included or configured, and each bit of the bitmap may correspond to or be mapped to each of the first SCell groups (or the SCells belonging to the first SCell group or the first SCell group identifier) in ascending order of the SCell group identifier value of the configured first SCell group. As another method, each bit of the bitmap may correspond to or be mapped to each of the first SCell groups (or the SCells belonging to the first SCell group or the first S Cell group identifier) in descending order of the SCell group identifier value of the configured first SCell group. As another method, each bit of the bitmap may correspond to or be mapped to each of the first SCell groups (or the SCells belonging to the first SCell group or the first SCell group identifier) in ascending order of the SCell group identifier value of the first SCell group in order from the right bit (from the least significant bit (LSB) or from the left bit (from the most significant bit (MSB). As another method, each bit of the bitmap may correspond to or be mapped to each of the first SCell groups (or the SCells belonging to the first SCell group or the first SCell group identifier) in descending order of the SCell group identifier value of the first SCell group in order from the right bit (from the least significant bit (LSB) or from the left bit (from the most significant bit (MSB).

When the bit value of the bitmap for the terminal is 0, the bit value 0 may indicate that it is to be switched to the dormant BWP or is to activate the dormant BWP for each activated SCell among the SCells included in the first SCell group corresponding to the bit (when the dormant BWP has been configured). As another method, when the bit value of the bitmap for the terminal is 0, the bit value 0 may indicate that it is to be switched to a dormant BWP or is to activate a dormant BWP when an activated BWP is not a dormant BWP (or when it is a normal BWP) for each activated SCell among the SCells included in the first SCell group corresponding to the bit.

When the bit value of the bitmap for the terminal is 1, the bit value 1 may indicate that it is to be switched to a normal BWP (e.g., a first active BWP activated from dormancy) or is to be activated to a normal BWP (e.g., a first active BWP activated from dormancy) for each activated SCell among the SCells included in the first SCell group corresponding to the bit. As another method, when the bit value of the bitmap for the terminal is 1, the bit value 1 may indicate that it is to be switched to a normal BWP (e.g., a first active BWP activated from dormancy) or is to be activated to a normal BWP (e.g., a first active BWP activated from dormancy) when an activated BWP is a dormant BWP (or when it is not a normal BWP) for each activated SCell among the SCells included in the first SCell group corresponding to the bit, otherwise (when a current or activated BWP is not a dormant BWP (or when it is a normal BWP) for each activated SCell among the SCells included in the first SCell group corresponding to the bit), the current active BWP may be maintained as it is or may be continuously used or applied or may be activated. As another method, when the bit value of the bitmap for the terminal is 1, the bit value 1 may indicate that it is to be switched from a dormant BWP to a normal BWP (e.g., a first active BWP activated from dormancy) or is to be activated to a normal BWP (e.g., a first active BWP activated from dormancy) for each activated SCell among the SCells included in the first SCell group corresponding to the bit, or may indicate that the current active BWP is to be maintained as it is or is to be continuously used or applied or is to be activated.

The short period 1$h$-04 or 1$j$-02 described in FIG. 1H or 1J in which the PDCCH should be monitored to detect the first DCI format or the WUS signal may be calculated or indicated by an offset configured in the RRC message, and the first DCI format or the WUS signal may be detected during a short period before the active period in the DRX cycle.

In order to save the battery, the terminal may not unnecessarily detect or monitor the first DCI format (e.g., DCI format 2_6) through PDCCH monitoring in the active period of the DRX cycle.

When the terminal has been configured with the power saving function or the DRX function (or it has been configured to search for the first DCI format in a short time) but has failed to detect the first DCI format or the WUS signal in the short period 1$h$-04 or 1$j$-02 described in FIG. 1H or 1J, the terminal may perform a basic operation for the active period in the DRX cycle as follows.

When the terminal has been configured or provided with a search space for performing PDCCH monitoring to detect the first DCI format in the active downlink BWP of the PCell or SpCell and the terminal has failed to detect the first DCI format, When the terminal has been configured with the power saving function by the RRC message or has been configured (or provided) with an indicator (e.g., power saving (ps)—Wake up Or Not) indicating whether to start the timer to perform PDCCH monitoring in the next active time for the power saving function (or whether to wake up and perform detection in the active period) or whether not to start the timer (or whether not to perform detection in the active period), the terminal may or may not start the timer for the active period according to the indicator.

When the terminal has been configured with the power saving function by the RRC message or has not been configured (or provided) with an indicator (e.g., power saving (ps)—Wake up Or Not) indicating whether to start the timer to perform PDCCH monitoring in the next active time for the power saving function (or whether to wake up and perform detection in the active period) or whether not to start the timer (or whether not to perform detection in the active period), the terminal may not start the timer for the active period.

When the terminal has been configured or provided with a search space for performing PDCCH monitoring to detect the first DCI format in the active downlink BWP of the PCell or SpCell and the terminal has not been configured (requested) to detect the first DCI format by PDCCH monitoring in a short period before the next active time of the DRX cycle or when the terminal has not been configured with a short period for detecting the first DCI format by PDCCH monitoring before the next active time of the DRX cycle, the terminal should start the timer for the next active period of the DRX cycle.

Another embodiment as a particular example of Embodiment 1 of the disclosure described above may be as follows.

---

PDCCH monitoring indication and dormancy/non-dormancy behavior for SCells
A UE configured with DRX mode operation on the PCell or on the SpCell
   a PS-RNTI for DCI format 2_6 by ps-RNTI
   a number of search space sets, by dci-Format2-6, to monitor PDCCH for detection of DCI format 2 6 on the active DL BWP of the PCell or of the SpCell according to a common search space
   a payload size for DCI format 2_6 by SizeDCI_2-6
   a location in DCI format 2_6 of a Wake-up indication bit by PSPositionDCI2-6, where
   the UE may not start the drx-onDurationTimer for the next long DRX cycle when a value of the 'PDCCH monitoring' bit is '0', and
   the UE starts the drx-onDurationTimer for the next long DRX cycle when a value of the 'PDCCH monitoring' bit is '1'
   a bitmap, when the UE is provided a number of groups of configured SCells by SCell-groups-for-dormancy-outside-active-time, where
     the bitmap location is immediately after the 'PDCCH monitoring' bit location
     the bitmap size is equal to the number of groups of configured SCells where each bit of the bitmap from LSB or MSB corresponds to a group of configured SCells from the number of groups of configured SCells in the ascending order or descending order of configured dormant SCell group identity.
     a '0' value for a bit of the bitmap indicates an active DL BWP, provided by dormant-BWP, for the UE for each activated SCell in the corresponding group of configured SCells
Option 1.
   if the previous DL BWP was a dormant DL BWP or if the active DL BWP is a dormant DL BWP, a '1' value for a bit of the bitmap indicates an active DL BWP, provided by firstActiveDownlinkBWPFromDormant, for the UE for each activated SCell in the corresponding group of configured SCells. Otherwise, it indicates to continue the current active DL BWP.
Option 2.
   if the previous DL BWP was not an active DL BWP (normal DL BWP) or if the active DL BWP is not an active DL BWP(normal DL BWP), a '1' value for a bit of the bitmap indicates an active DL BWP, provided by firstActiveDownlinkBWPFromDormant, for the UE for each activated SCell in the corresponding group of configured SCells. Otherwise, it indicates to continue the current active DL BWP.
Option 3.
   a '1' value for a bit of the bitmap indicates an active DL BWP switched from dormant DL BWP, provided by firstActiveDownlinkBWPFromDormant or the current active DL BWP, for the UE for each activated SCell in the corresponding group of configured SCells
   an offset by ps-Offset indicating a time, where the UE starts monitoring PDCCH for detection of DCI format 2_6 according to the number of search space sets, prior to a slot where the drx-onDuarationTimer would start on the PCell or on the SpCell
   for each search space set, the PDCCH monitoring occasions are the ones in the first Ts slots indicated by duration, or $T_s = 1$ slot if duration is not provided, starting from the first slot of the first $T_s$ slots and ending prior to the start of drx-onDurationTimer.
The UE does not monitor PDCCH for detecting DCI format 2_6 during Active Time.
If a UE reports for an active DL BWP a requirement for a number of slots prior to the beginning of a slot where the UE would start the drx-onDurationTimer, the UE is not required to monitor PDCCH for detection of DCI format 2_6 during the number of slots.
If a UE is provided search space sets to monitor PDCCH for detection of DCI format 2_6 in the active DL BWP of the PCell or of the SpCell and the UE does not detect DCI format 2_6
   if the UE is provided ps-WakeupOrNot, the UE is indicated by ps-WakeupOrNot whether the UE may not start or whether the UE shall start the drx-onDuration Timer for the next DRX cycle -continued if the UE is not provided ps-WakeupOrNot, the UE may not start Active Time
indicated by drx-onDurationTimer for the next DRX cycle
If a UE is provided search space sets to monitor PDCCH for detection of DCI format
2_6 in the active DL BWP of the PCell or of the SpCell and the UE
   is not required to monitor PDCCH for detection of DCI format 2_6, for all
corresponding PDCCH monitoring occasions outside Active Time prior to a next
DRX cycle, or
   does not have any PDCCH monitoring occasions for detection of DCI format
2_6 outside Active Time of a next DRX cycle
the UE shall start by drx-onDurationTimer for the next DRX cycle.

Figure 1K:
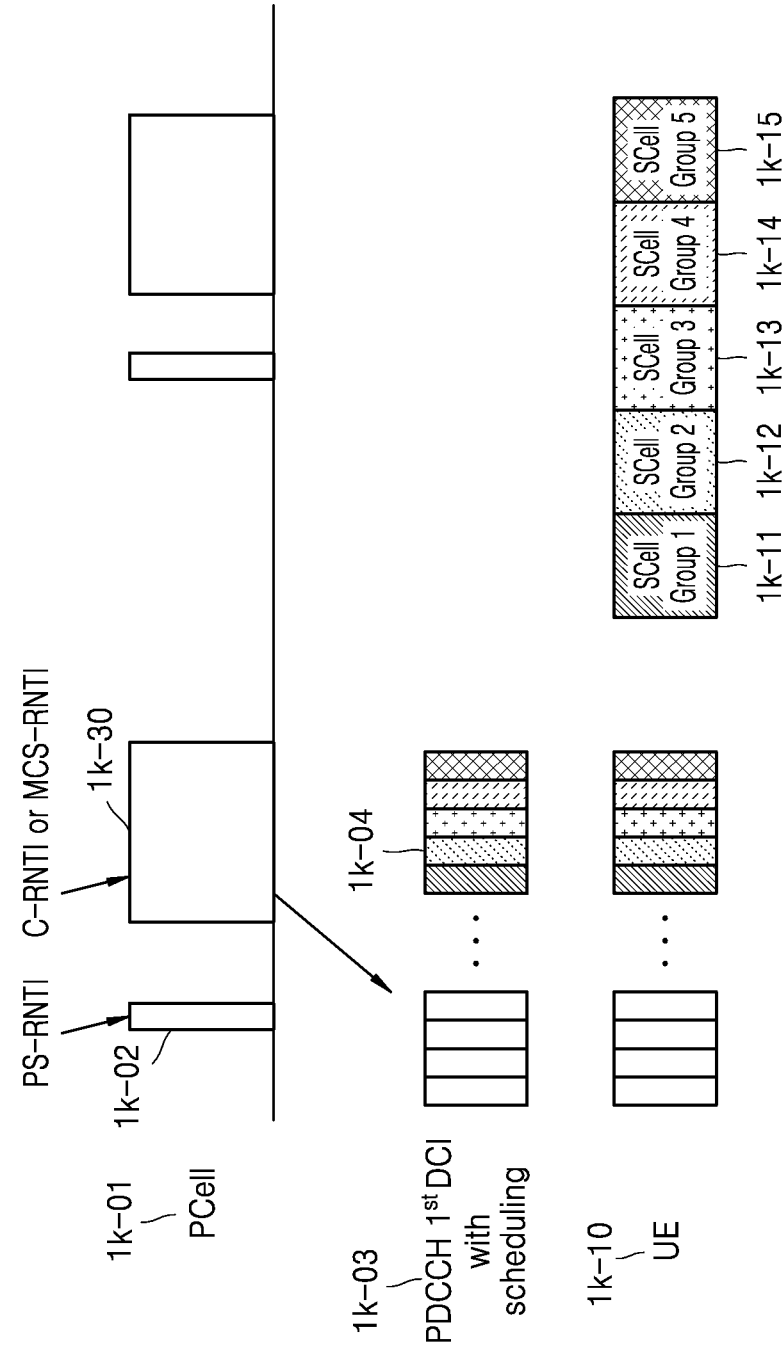
FIG. 1K illustrates Embodiment 2 of the method of operating a dormant BWP in an activated SCell described in FIG. 1I according to an embodiment of the disclosure.

FIG. 1K illustrates Embodiment 2 of the method of operating a dormant BWP in an activated SCell described in FIG. 1I according to an embodiment of the disclosure.

Referring to FIG. 1K, elements 1k-01, 1k-02, 1k-30, 1k-03, 1k-10, and 1k-04 are equivalent to 1j-01, 1j-02, 1j-30, 1j-03, n-10, and 1j-04 of FIG. 1J. Moreover, in Embodiment 2, for the carrier aggregation technology, the base station may configure a plurality of SCells to the terminal through an RRC message as in FIG. 1F, may allocate each SCell identifier, may configure a dormant BWP for each SCell, and may not configure a dormant BWP for a certain S Cell. In addition, a plurality of SCells may be included and configured in each SCell group, and one SCell group may include a plurality of SCells. A SCell group identifier may be assigned to each SCell group, and a plurality of SCell identifiers may be configured to be included in or mapped to each SCell group identifier. A SCell identifier value or a SCell group identifier value may be assigned as a value of a certain bit and may have an integer value (or a natural value). In addition, SCell groups or SCell group identifiers configured for or to apply to Embodiment 2 of the disclosure may be referred to as second SCell groups. In Embodiment 2 of the disclosure, the second SCell groups may indicate group identifiers applying an operation of monitoring, by the terminal, the DCI of the PDCCH in an active period (within active time) and indicating in a bitmap value of the received DCI.

In FIG. 1J, the base station may configure a power saving function or a DRX function to the terminal through an RRC message as in FIG. 1F. In addition, the RRC message may be configured with configuration information for the second DCI format (e.g., DCI format 0_1 or DCI format 1_1) to be detected by the terminal in an active period 1k-30 of the DRX cycle for the PCell or SpCell. When the terminal has detected the second DCI format in the PCell or SpCell, the terminal may determine whether a bitmap including an indication for the second SCell groups for the terminal is included in the second DCI format. In addition, through the RRC message, to the terminal, the base station may configure a terminal identifier (e.g., C-RNTI or MCS-C-RNTI or SPS-C-RNTI) or a search space for PDCCH monitoring for detecting the second DCI format during the active period 1k-30. Because the terminal does not monitor the DCI of the PDCCH when switched or activated to a dormant BWP for the SCell, it may be very inefficient for the terminal to receive the bitmap or the DCI of the PDCCH described herein in the SCell that is not the PCell or SpCell. Thus, it will be described that the DCI of the PDCCH proposed herein is to be monitored in the PCell or SpCell.

For example, the base station may transmit the second DCI format to the terminal in the transmission resource of the PDCCH of the active period 1k-30 in the PCell or SpCell (1k-03), and the second DCI format may include a bitmap 1k-04 including indication information for a dormant BWP for the second SCell groups configured in the terminal.

A first terminal 1k-10 applying the information configured by the RRC message may perform PDCCH monitoring based on the terminal identifier (e.g., C-RNTI or MCS-C-RNTI or SPS-C-RNTI), which is an identifier configured in the active period 1k-30 of the DRX cycle, and may detect the second DCI format from the base station in the search space (1k-03). When the second DCI format 1k-03 is detected, the first terminal may read the bitmap 1k-04 including indication information for a dormant BWP about the second SCell groups of the first terminal in the second DCI format 1k-03. The length of the bitmap may be configured to be equal to the number of second SCell groups configured to the first terminal or it may be configured up to a certain number (e.g., five). In addition, each bit value of the bitmap may be indicated by being mapped to each of the second SCell groups in ascending order of each SCell group identifier value of the second SCell groups configured in the first terminal from the right bit of the bitmap (e.g., from the least significant bit (LSB)). As another method, each bit value of the bitmap may be indicated by being mapped to each of the second SCell groups in descending order of each SCell group identifier value of the second SCell groups configured in the first terminal from the right bit of the bitmap (e.g., from the least significant bit (LSB)). As another method, each bit value of the bitmap may be indicated by being mapped to each of the second SCell groups in ascending order of each SCell group identifier value of the second SCell groups configured in the first terminal from the left bit of the bitmap (e.g., from the most significant bit (MSB)). As another method, each bit value of the bitmap may be indicated by being mapped to each of the second SCell groups in descending order of each SCell group identifier value of the second S Cell groups configured in the first terminal from the left bit of the bitmap (e.g., from the most significant bit (MSB)).

When the bit value of bitmaps 1k-11, 1k-12, 1k-13, 1k-14, and 1k-15 is 0, the bit value 0 may indicate that it is to be switched to the dormant BWP or is to activate the dormant BWP for each activated SCell among the SCells included in the second SCell group corresponding to the bit (when the dormant BWP has been configured). As another method, when the bit value of the bitmap for the terminal is 0, the bit value 0 may indicate that it is to be switched to a dormant BWP or is to activate a dormant BWP when an activated BWP is not a dormant BWP (or when it is a normal BWP) for each activated SCell among the SCells included in the second SCell group corresponding to the bit.

When the bit value of the bitmap is 1, the bit value 1 may indicate that it is to be switched to a normal BWP (e.g., a first active BWP activated from dormancy) or is to be activated to a normal BWP (e.g., a first active BWP activated from dormancy) for each activated SCell among the SCells included in the second SCell group corresponding to the bit. As another method, when the bit value of the bitmap for the terminal is 1, the bit value 1 may indicate that it is to be switched to a normal BWP (e.g., a first active BWP activated from dormancy) or is to be activated to a normal BWP (e.g., a first active BWP activated from dormancy) when an activated BWP is a dormant BWP (or when it is not a normal BWP) for each activated SCell among the SCells included in the second SCell group corresponding to the bit, otherwise (when a current or activated BWP is not a dormant BWP (or when it is a normal BWP) for each activated SCell among the SCells included in the second SCell group corresponding to the bit), the current active BWP may be maintained as it is or may be continuously used or applied or may be activated. As another method, when the bit value of the bitmap for the terminal is 1, the bit value 1 may indicate that it is to be switched from a dormant BWP to a normal BWP (e.g., a first active BWP activated from dormancy) or is to be activated to a normal BWP (e.g., a first active BWP activated from dormancy) for each activated SCell among the SCells included in the second SCell group corresponding to the bit, or may indicate that the current active BWP is to be maintained as it is or is to be continuously used or applied or is to be activated.

Embodiment 2 of the disclosure may operate as described above, the second DCI format of the PDCCH described in Embodiment 2 may be used in an active period, and the PCell of the terminal may also be accompanied by downlink transmission resources (e.g., PDSCH) or uplink transmission resources (e.g., PUSCH) about the SpCell. Thus, the terminal may receive the second DCI format of the PDCCH in Embodiment 2 and may transmit ACK or NACK information (e.g., HARQ ACK or NACK) about scheduling information (downlink transmission resource or uplink transmission resource) of the PCell or SpCell indicated in the second DCI format, and thus, the base station may determine whether the terminal has successfully received an indication of the second DCI format in Embodiment 2.

Embodiment 2 of the disclosure described above may operate more particularly as follows.

In Embodiment 2 of the disclosure, a dormant or non-dormant operation for SCells of the terminal and an operation for a PDCCH monitoring indicator are as follows.

When a search space is configured or provided or detected such that the terminal may monitor the PDCCH for detection of the second DCI format (e.g., DCI format 0_1 or DCI format 1_1) in the active period 1$k$-30 in FIG. 1K with respect to the PCell or SpCell, and when a bitmap including an indication for the second SCell groups about the terminal is included in the second DCI format, the terminal may receive the bitmap and may operate as follows. In addition, the terminal may perform PDCCH monitoring in the activated downlink BWP of the PCell or SpCell.

- The terminal may perform PDCCH monitoring and may perform a search for the second DCI format (e.g., DCI format 0_1 or DCI format 1_1) by the terminal identifier (C-RNTI or MCS-C-RNTI or SPS-C-RNTI).
- The terminal may be configured with a plurality of search space sets and apply the same in order to perform PDCCH monitoring for detection of the second DCI format in the activated downlink BWP of the PCell or SpCell according to the common search area configured by the RRC message.
- When the terminal has detected the second DCI format, when the terminal is configured with a plurality of first SCell groups for Embodiment 2 of the disclosure from the RRC message, the terminal may read the size of the bitmap corresponding to the number of second SCell groups.
- The position of the bitmap for Embodiment 2 of the disclosure may be located immediately after the PDCCH monitoring indicator.
- The size of the bitmap for Embodiment 2 of the disclosure may be equal to the number of second SCell groups in which SCells configured to the terminal by RRC messages are included or configured, and each bit of the bitmap may correspond to or be mapped to each of the second SCell groups (or the SCells belonging to the second SCell group or the second SCell group identifier) in ascending order of the SCell group identifier value of the configured second SCell group. As another method, each bit of the bitmap may correspond to or be mapped to each of the second SCell groups (or the SCells belonging to the second SCell group or the second SCell group identifier) in descending order of the SCell group identifier value of the configured second SCell group. As another method, each bit of the bitmap may correspond to or be mapped to each of the second SCell groups (or the SCells belonging to the second SCell group or the second SCell group identifier) in ascending order of the SCell group identifier value of the second SCell group in order from the right bit (from the least significant bit (LSB) or from the left bit (from the most significant bit (MSB). As another method, each bit of the bitmap may correspond to or be mapped to each of the second SCell groups (or the SCells belonging to the second SCell group or the second SCell group identifier) in descending order of the SCell group identifier value of the second SCell group in order from the right bit (from the least significant bit (LSB) or from the left bit (from the most significant bit (MSB).
- When the bit value of the bitmap for the terminal is 0, the bit value 0 may indicate that it is to be switched to the dormant BWP or is to activate the dormant BWP for each activated SCell among the SCells included in the second SCell group corresponding to the bit (when the dormant BWP has been configured). As another method, when the bit value of the bitmap for the terminal is 0, the bit value 0 may indicate that it is to be switched to a dormant BWP or is to activate a dormant BWP when an activated BWP is not a dormant BWP (or when it is a normal BWP) for each activated SCell among the SCells included in the second SCell group corresponding to the bit.
- When the bit value of the bitmap for the terminal is 1, the bit value 1 may indicate that it is to be switched to a normal BWP (e.g., a first active BWP activated from dormancy) or is to be activated to a normal BWP (e.g., a first active BWP activated from dormancy) for each activated SCell among the SCells included in the second SCell group corresponding to the bit. As another method, when the bit value of the bitmap for the terminal is 1, the bit value 1 may indicate that it is to be switched to a normal BWP (e.g., a first active BWP activated from dormancy) or is to be activated to a normal BWP (e.g., a first active BWP activated from dormancy) when an activated BWP is a dormant BWP (or when it is not a normal BWP) for each activated SCell among the SCells included in the second SCell group corresponding to the bit, otherwise (when a current or activated BWP is not a dormant BWP (or when it is a normal BWP) for each activated SCell among the SCells included in the second SCell group corresponding to the bit), the current active BWP may be maintained as it is or may be continuously used or applied or may be activated. As another method, when the bit value of the bitmap for the terminal is 1, the bit value 1 may indicate that it is to be switched from a dormant BWP to a normal BWP (e.g., a first active BWP activated from dormancy) or is to be activated to a normal BWP (e.g., a first active BWP activated from dormancy) for each activated SCell among the SCells included in the second SCell group corresponding to the bit, or may indicate that the current active BWP is to be maintained as it is or is to be continuously used or applied or is to be activated.

Another embodiment as a particular example of Embodiment 2 of the disclosure described above may be as follows.

Referring to FIG. 1L, in Embodiment 3, for the carrier aggregation technology, the base station may configure a plurality of S Cells to the terminal through an RRC message as in FIG. 1F, may allocate each SCell identifier, may configure a dormant BWP for each SCell, and may not configure a dormant BWP for a certain SCell. A SCell identifier value may be assigned as a value of a certain bit and may have an integer value (or a natural value). In addition, SCell identifiers configured in the RRC message may be used to operate or apply Embodiment 3 of the disclosure. In Embodiment 3 of the disclosure, the SCell identifies may indicate each SCell or each SCell identifier applying an operation of monitoring, by the terminal, the DCI of the PDCCH in an active period (within active time) and indicating in a bitmap value of the received DCI.

---

If a UE is provided search space sets to monitor PDCCH for detection of DCI format 0_1 and DCI format 1_1 and if one or both of DCI format 0_1 and DCI format 1_1 include a XYZ field, for PCell,
  the XYZ field is a bitmap with size equal to a number of groups of configured SCells, provided by SCell-groups-for-dormancy-within-active-time,
  each bit of the bitmap corresponds to a group of configured SCells from the number of groups of configured SCells in the ascending order or descending order of configured dormant SCell group identity
  a '0' value for a bit of the bitmap indicates an active DL BWP, provided by dormant-BWP, for the UE for each activated SCell in the corresponding group of configured SCells
Option 1.
  if the previous DL BWP was a dormant DL BWP, a '1' value for a bit of the bitmap indicates an active DL BWP, provided by first-non-dormant-BWP-ID-for-DCI-inside-active-time, for the UE for each activated SCell in the corresponding group of configured SCells. Otherwise, it indicates to continue the current active DL BWP.
Option 2.
  if the previous DL BWP was not an active DL BWP, a '1' value for a bit of the bitmap indicates an active DL BWP, provided by first-non-dormant-BWP-ID-for-DCI- inside -active-time, for the UE for each activated SCell in the corresponding group of configured SCells. Otherwise, it indicates to continue the current active DL BWP.
Option 3.
  a '1' value for a bit of the bitmap indicates an active DL BWP switched from dormant DL BWP, provided by first-non-dormant-BWP-ID-for-DCI- inside -active-time or the current active DL BWP, for the UE for each activated SCell in the corresponding group of configured SCells

---

In FIG. 1F of the disclosure, the base station may configure, to the terminal, the first SCell group configuration information applicable to Embodiment 1 and the second SCell group configuration information applicable to Embodiment 2 described in the disclosure in the RRCSetup message of the RRC connection configuration or the RRCResume message 1f-25 or the RRCReconfiguration message 1f-45, respectively. In the RRC message, the base station may allocate a SCell identifier for each SCell of the terminal, may allocate a first SCell group identifier to each group of the first SCell group, and may allocate a second SCell group identifier to each group of the second SCell group. In addition, it may allocate a first SCell group set identifier indicating the first SCell groups and may allocate a second SCell group set identifier indicating the second SCell groups. In addition, each SCell identifier may be included in or mapped to each first SCell group or each second SCell group. In addition, the base station may configure the SCell or SCell identifier to be included in or mapped to the first SCell group or the second SCell group only when the dormant BWP (e.g., the downlink dormant BWP) is configured for the SCell.

FIG. 1L illustrates Embodiment 3 of the method of operating a dormant BWP in an activated SCell described in FIG. 1I according to an embodiment of the disclosure.

Referring to FIG. 1L, the base station may configure a power saving function or a DRX function to the terminal through an RRC message as in FIG. 1F. In addition, the RRC message may be configured with configuration information for the third DCI format (e.g., DCI formant 1_1) to be detected by the terminal in an active period 1l-30 of the DRX cycle for the PCell or SpCell. When the terminal has detected the third DCI format in the PCell or SpCell, the terminal may determine whether a bitmap including an indication for each SCell or each SCell identifier for the terminal is included in the third DCI format.

The third DCI format may include a transmission resource type (resourceAllocation) field, a field for frequency domain resource assignment, a modulation and coding scheme (MCS) field, a new data indicator (NDI) field, a redundancy version (RV) field, an HARQ process number field, an antenna port field, or a DMRS sequence initialization (DMRS SI) field.

When the type indicated by the transmission resource type field (e.g., resourceAllocation) in the detected third DCI format is the first type (e.g., resourceAllocationType0) and all bits of the field for frequency transmission resource allocation are 0 or when the type indicated by the transmission resource type field (e.g., resourceAllocation) is the second type (e.g., resourceAllocationType1) and all bits of the field for frequency transmission resource allocation are 1, the terminal may not interpret the bits or fields located thereafter as the Modulation and Coding Scheme (MCS) field or the New data indicator (NDI) field or the Redundancy version (RV) field or the HARQ process number field or the antenna port field or the DMRS Sequence Initialization (DMRS SI), may regard and read the same as the bitmap field indicating switching or activation to the dormant BWP or switching or activation from the dormant BWP to the normal BWP with respect to each SCell, and may apply information indicated in the bitmap. However, when the type indicated by the transmission resource type field (e.g., resourceAllocation) in the detected third DCI format is the first type (e.g., resourceAllocationType0) and all bits of the field for frequency transmission resource allocation are not 0 or when the type indicated by the transmission resource type field (e.g., resourceAllocation) is the second type (e.g., resourceAllocationType1) and all bits of the field for frequency transmission resource allocation are not 1, the terminal may interpret, read, and apply the fields or bits located thereafter as the Modulation and Coding Scheme (MCS) field or the New data indicator (NDI) field or the Redundancy version (RV) field or the HARQ process number field or the antenna port field or the DMRS Sequence Initialization (DMRS SI) field.

When the terminal has detected the third DCI field of the PDCCH and has scrambled or detected the same by the second terminal identifier (e.g., SPS-C-RNTI), when the type indicated by the transmission resource type field (e.g., resourceAllocation) in the third DCI format is the first type (e.g., resourceAllocationType0) and all bits of the field for frequency transmission resource allocation are 0 or when the type indicated by the transmission resource type field (e.g., resourceAllocation) is the second type (e.g., resourceAllocationType1) and all bits of the field for frequency transmission resource allocation are 1, it may indicate a special command to activate or release the periodic transmission resource configured in the terminal.

Thus, in Embodiment 3 of the disclosure, only when the third DCI field of the PDCCH is detected by being scrambled by the first terminal identifier (e.g., C-RNTI or MCS-C-RNTI), when the type indicated by the transmission resource type field (e.g., resourceAllocation) in the third DCI format is the first type (e.g., resourceAllocationType0) and all bits of the field for frequency transmission resource allocation are 0 or when the type indicated by the transmission resource type field (e.g., resourceAllocation) is the second type (e.g., resourceAllocationType1) and all bits of the field for frequency transmission resource allocation are 1, the subsequent fields may be interpreted as a bitmap indicating a dormant BWP operation for each SCell of the terminal.

In addition, through the RRC message, to the terminal, the base station may configure a terminal identifier (e.g., C-RNTI or MCS-C-RNTI) or a search space for PDCCH monitoring for detecting the third DCI format during the active period 1/-30.

For example, as described above, the base station may transmit the third DCI format to the terminal in the transmission resource of the PDCCH of the active period 1/-30 in the PCell 1/-01 or SpCell (1/-03) in the short period 1/-02, and the third DCI format may include a bitmap 1/-04 including indication information for a dormant BWP for the third SCell groups configured in the terminal.

A first terminal 1/-10 applying the information configured by the RRC message may perform PDCCH monitoring based on the first terminal identifier (e.g., C-RNTI or MCS-C-RNTI), which is an identifier configured in the active period 1/-30 of the DRX cycle, and may detect the third DCI format from the base station in the search space (1/-03). When the first terminal has detected the third DCI format 1/-03, when the type indicated by the transmission resource type field (e.g., resourceAllocation) in the third DCI format 1/-03 is the first type (e.g., resourceAllocationType0) and all bits of the field for frequency transmission resource allocation are 0 or when the type indicated by the transmission resource type field (e.g., resourceAllocation) is the second type (e.g., resourceAllocationType1) and all the bits of the field for frequency transmission resource allocation are 1 (1/-20), the first terminal may interpret the subsequent fields as a bitmap indicating a dormant BWP operation for each SCell of the terminal and may read the bitmap 1/-04 including indication information for a dormant BWP about a plurality of SCells (or SCell identifiers) configured in the first terminal.

When the conditions described above are satisfied, because the length of the bitmap is interpreted by replacing the existing MCS field or NDI field or RV field or HARQ process number field or antenna port field or DMRS SI field, the bitmap may have a fixed length and may have, for example, a length of 15 bits or 16 bits.

Embodiment 3-1 to which the first bitmap mapping method is applied in Embodiment 3 described in the disclosure may be as follows.

In the first bitmap mapping method, each bit value of the bitmap may be indicated by being mapped to each SCell in ascending or descending order of each S Cell identifier value of the S Cells configured in the first terminal from the right bit of the bitmap (e.g., from the least significant bit (LSB)) or from the left bit (e.g., from the most significant bit (MSB)).

As another method, in the first bitmap mapping method, each bit value of the bitmap may be indicated by being mapped to each SCell in ascending order of each SCell identifier value of the SCells of the cell group (Master Cell Group (MCG) or Secondary Cell Group (SCG)) configured in the first terminal from the right bit of the bitmap (e.g., from the least significant bit (LSB)). When the terminal has received the third DCI format in the PCell, each bit value may be mapped to the bitmap in ascending order of the SCell identifier value only for the SCells belonging to the MCG cell group. In addition, when the terminal has received the third DCI format in the PS Cell, each bit value may be mapped to the bitmap in ascending order of the SCell identifier value only for the SCells belonging to the SCG cell group. The reason for limiting the bitmap and mapping to the SCells belonging to one cell group is that 32 SCell identifiers may be configured in one terminal and the bitmap is 15 bits or 16 bits.

As another method, in the first bitmap mapping method, each bit value of the bitmap may be indicated by being mapped to each SCell in descending order of each SCell identifier value of the SCells of the cell group (Master Cell Group (MCG) or Secondary Cell Group (SCG)) configured in the first terminal from the right bit of the bitmap (e.g., from the least significant bit (LSB)). When the terminal has received the third DCI format in the PCell, each bit value may be mapped to the bitmap in ascending order of the SCell identifier value only for the SCells belonging to the MCG cell group. In addition, when the terminal has received the third DCI format in the PSCell, each bit value may be mapped to the bitmap in descending order of the SCell identifier value only for the SCells belonging to the SCG cell group. The reason for limiting the bitmap and mapping to the SCells belonging to one cell group is that 32 SCell identifiers may be configured in one terminal and the bitmap is 15 bits or 16 bits.

As another method, in the first bitmap mapping method, each bit value of the bitmap may be indicated by being mapped to each SCell in ascending order of each SCell identifier value of the SCells of the cell group (Master Cell Group (MCG) or Secondary Cell Group (SCG)) configured in the first terminal from the left bit of the bitmap (e.g., from the most significant bit (MSB)). When the terminal has received the third DCI format in the PCell, each bit value may be mapped to the bitmap in ascending order of the SCell identifier value only for the SCells belonging to the MCG cell group. In addition, when the terminal has received the third DCI format in the PS Cell, each bit value may be mapped to the bitmap in ascending order of the SCell identifier value only for the SCells belonging to the SCG cell group. The reason for limiting the bitmap and mapping to the SCells belonging to one cell group is that 32 SCell identifiers may be configured in one terminal and the bitmap is 15 bits or 16 bits.

As another method, in the first bitmap mapping method, each bit value of the bitmap may be indicated by being mapped to each SCell in descending order of each SCell identifier value of the SCells of the cell group (Master Cell Group (MCG) or Secondary Cell Group (SCG)) configured in the first terminal from the left bit of the bitmap (e.g., from the most significant bit (MSB)). When the terminal has received the third DCI format in the PCell, each bit value may be mapped to the bitmap in ascending order of the SCell identifier value only for the SCells belonging to the MCG cell group. In addition, when the terminal has received the third DCI format in the PSCell, each bit value may be mapped to the bitmap in descending order of the SCell identifier value only for the SCells belonging to the SCG cell group. The reason for limiting the bitmap and mapping to the SCells belonging to one cell group is that 32 SCell identifiers may be configured in one terminal and the bitmap is 15 bits or 16 bits.

When a rule of mapping from the left bit or the right bit of the bitmap is applied, the number of bitmaps to be read by the terminal may be reduced, thus enabling faster terminal processing.

When the bit value of the bitmaps 1/-11, 1/-12, 1/-13, 1/-14, and 1/-15 is 0, the bit value 0 may indicate to switch to the dormant BWP or activate the dormant BWP for each activated SCell corresponding to the bit (when the dormant BWP is configured or there is or when it is included in the first SCell group or when it is included in the second SCell group). As another method, when the bit value of the bitmap for the terminal is 0, the bit value 0 may indicate that it is to be switched to a dormant BWP or is to activate a dormant BWP when an activated BWP is not a dormant BWP (or when it is a normal BWP) for each activated SCell corresponding to the bit. When the dormant BWP is not configured in the activated SCell corresponding to the bit of the bitmap, the terminal may ignore the bit value or may not read the bit value or may not apply the same.

When the bit value of the bitmap is 1, the bit value 1 may indicate that it is to be switched to a normal BWP (e.g., a first active BWP activated from dormancy) or is to be activated to a normal BWP (e.g., a first active BWP activated from dormancy) for each activated SCell corresponding to the bit. As another method, when the bit value of the bitmap for the terminal is 1, the bit value 1 may indicate that it is to be switched to a normal BWP (e.g., a first active BWP activated from dormancy) or is to be activated to a normal BWP (e.g., a first active BWP activated from dormancy) when an activated BWP is a dormant BWP (or when it is not a normal BWP) for each activated SCell corresponding to the bit, otherwise (when a current or activated BWP is not a dormant BWP (or when it is a normal BWP) for each activated S Cell corresponding to the bit), the current active BWP may be maintained as it is or may be continuously used or applied or may be activated. As another method, when the bit value of the bitmap for the terminal is 1, the bit value 1 may indicate that it is to be switched from a dormant BWP to a normal BWP (e.g., a first active BWP activated from dormancy) or is to be activated to a normal BWP (e.g., a first active BWP activated from dormancy) for each activated SCell corresponding to the bit, or may indicate that the current active BWP is to be maintained as it is or is to be continuously used or applied or is to be activated. When the dormant BWP is not configured in the activated S Cell corresponding to the bit of the bitmap, the terminal may ignore the bit value or may not read the bit value or may not apply the same.

Embodiment 3-2 to which the first bitmap mapping method is applied in Embodiment 3 proposed in the disclosure may be as follows.

In the second bitmap mapping method, each bit value of the bitmap may be indicated by being mapped to each SCell in ascending or descending order of each SCell identifier value with respect to the SCells included in the first SCell group or included in the second SCell group or configured with the normal BWP among the SCells configured in the first terminal from the right bit of the bitmap (e.g., from the least significant bit (LSB)) or from the left bit (e.g., from the most significant bit (MSB)).

As another method, in the second bitmap mapping method, each bit value of the bitmap may be indicated by being mapped to each SCell in ascending order of each SCell identifier value with respect to the SCells included in the first SCell group or included in the second SCell group or configured with the normal BWP among the SCells of the cell group (MCG or SCG) configured in the first terminal from the right bit of the bitmap (e.g., from the least significant bit (LSB)). When the terminal has received the third DCI format from the PCell, each bit value may be mapped to the bitmap in ascending order of the SCell identifier value for the SCells included in the first SCell group or included in the second SCell group or configured with the dormant BWP among the SCells belonging to the MCG cell group. In addition, when the terminal has received the third DCI format from the PSCell, each bit value may be mapped to the bitmap in ascending order of the SCell identifier value for the SCells included in the first SCell group or included in the second SCell group or configured with the dormant BWP among the SCells belonging to the SCG cell group. The reason for limiting the bitmap and mapping to the SCells belonging to one cell group is that 32 SCell identifiers may be configured in one terminal and the bitmap is 15 bits or 16 bits.

As another method, in the second bitmap mapping method, each bit value of the bitmap may be indicated by being mapped to each SCell in descending order of each SCell identifier value with respect to the SCells included in the first SCell group or included in the second SCell group or configured with the normal BWP among the SCells of the cell group (Master Cell Group (MCG) or Secondary Cell Group (SCG)) configured in the first terminal from the right bit of the bitmap (e.g., from the least significant bit (LSB)). When the terminal has received the third DCI format from the PCell, each bit value may be mapped to the bitmap in ascending order of the SCell identifier value for the SCells included in the first SCell group or included in the second SCell group or configured with the dormant BWP among the SCells belonging to the MCG cell group. In addition, when the terminal has received the third DCI format from the PSCell, each bit value may be mapped to the bitmap in descending order of the SCell identifier value for the SCells included in the first SCell group or included in the second SCell group or configured with the dormant BWP among the SCells belonging to the SCG cell group. The reason for limiting the bitmap and mapping to the SCells belonging to one cell group is that 32 SCell identifiers may be configured in one terminal and the bitmap is 15 bits or 16 bits.

As another method, in the second bitmap mapping method, each bit value of the bitmap may be indicated by being mapped to each SCell in ascending order of each SCell identifier value with respect to the SCells included in the first SCell group or included in the second SCell group or configured with the normal BWP among the SCells of the cell group (MCG or SCG) configured in the first terminal from the left bit of the bitmap (e.g., from the MSB). When the terminal has received the third DCI format from the PCell, each bit value may be mapped to the bitmap in ascending order of the SCell identifier value for the SCells included in the first SCell group or included in the second SCell group or configured with the dormant BWP among the SCells belonging to the MCG cell group. In addition, when the terminal has received the third DCI format from the PSCell, each bit value may be mapped to the bitmap in ascending order of the SCell identifier value for the SCells included in the first SCell group or included in the second SCell group or configured with the dormant BWP among the SCells belonging to the SCG cell group. The reason for limiting the bitmap and mapping to the SCells belonging to one cell group is that 32 SCell identifiers may be configured in one terminal and the bitmap is 15 bits or 16 bits.

As another method, in the second bitmap mapping method, each bit value of the bitmap may be indicated by being mapped to each SCell in descending order of each SCell identifier value with respect to the SCells included in the first SCell group or included in the second SCell group or configured with the normal BWP among the SCells of the cell group (MCG or SCG) configured in the first terminal from the left bit of the bitmap (e.g., from the MSB). When the terminal has received the third DCI format in the PCell, each bit value may be mapped to the bitmap in ascending order of the SCell identifier value only for the SCells belonging to the MCG cell group. In addition, when the terminal has received the third DCI format from the PSCell, each bit value may be mapped to the bitmap in descending order of the SCell identifier value for the SCells included in the first SCell group or included in the second SCell group or configured with the dormant BWP among the SCells belonging to the SCG cell group. The reason for limiting the bitmap and mapping to the SCells belonging to one cell group is that 32 SCell identifiers may be configured in one terminal and the bitmap is 15 bits or 16 bits.

When a rule of mapping from the left bit or the right bit of the bitmap is applied, the number of bitmaps to be read by the terminal may be reduced, thus enabling faster terminal processing.

When the bit value of the bitmaps 1*l*-11, 1*l*-12, 1*l*-13, and 1*l*-14 is 0, the bit value 0 may indicate to switch to the dormant BWP or activate the dormant BWP for each activated S Cell corresponding to the bit (when the dormant BWP is configured or there is or when it is included in the first SCell group or when it is included in the second SCell group). As another method, when the bit value of the bitmap for the terminal is 0, the bit value 0 may indicate that it is to be switched to a dormant BWP or is to activate a dormant BWP when an activated BWP is not a dormant BWP (or when it is a normal BWP) for each activated SCell corresponding to the bit.

When the bit value of the bitmap is 1, the bit value 1 may indicate that it is to be switched to a normal BWP (e.g., a first active BWP activated from dormancy) or is to be activated to a normal BWP (e.g., a first active BWP activated from dormancy) for each activated SCell corresponding to the bit. As another method, when the bit value of the bitmap for the terminal is 1, the bit value 1 may indicate that it is to be switched to a normal BWP (e.g., a first active BWP activated from dormancy) or is to be activated to a normal BWP (e.g., a first active BWP activated from dormancy) when an activated BWP is a dormant BWP (or when it is not a normal BWP) for each activated SCell corresponding to the bit, otherwise (when a current or activated BWP is not a dormant BWP (or when it is a normal BWP) for each activated S Cell corresponding to the bit), the current active BWP may be maintained as it is or may be continuously used or applied or may be activated. As another method, when the bit value of the bitmap for the terminal is 1, the bit value 1 may indicate that it is to be switched from a dormant BWP to a normal BWP (e.g., a first active BWP activated from dormancy) or is to be activated to a normal BWP (e.g., a first active BWP activated from dormancy) for each activated SCell corresponding to the bit, or may indicate that the current active BWP is to be maintained as it is or is to be continuously used or applied or is to be activated.

Embodiment 3 of the disclosure may operate as described above, the second DCI format of the PDCCH described in Embodiment 3 may be used in an active period, and the PCell of the terminal may not be accompanied by downlink transmission resources (e.g., PDSCH) or uplink transmission resources (e.g., PUSCH) about the SpCell. Thus, in Embodiment 3 of the disclosure, the terminal may receive the third DCI format of the PDCCH and may not transmit ACK or NACK information (e.g., HARQ ACK or NACK) about the indication in the third DCI format.

Embodiment 3 of the disclosure described above may operate more particularly as follows.

In Embodiment 3 of the disclosure, a dormant or non-dormant operation for SCells of the terminal and an operation for a PDCCH monitoring indicator are as follows.

When a search space is configured or provided or detected such that the terminal may monitor the PDCCH for detection of the third DCI format (e.g., DCI format 1_1) by being scrambled by the first terminal identifier (e.g., C-RNTI or MCS-C-RNTI) or based thereon in the active period 1*l*-30 in FIG. 1L with respect to PCell or SpCell, and when the type indicated by the transmission resource type field (e.g., resourceAllocation) in the third DCI format is the first type (e.g., resourceAllocationType0) and all bits of the field for frequency transmission resource allocation are 0 or when the type indicated by the transmission resource type field (e.g., resourceAllocation) is the second type (e.g., resourceAllocationType1) and all bits of the field for frequency transmission resource allocation are 1, The terminal may consider the third DCI format as including information for performing an indication to activate or switch the activated downlink BWP to the dormant BWP or the BWP first activated from dormancy with respect to each activated SCell configured in the terminal (or configured with the dormant BWP), may interpret the fields after the frequency transmission resource allocation field or the transmission resource field as a bitmap indicating a dormant BWP operation for each SCell of the terminal, and may read the bitmap 1l-04 including indication information for a dormant BWP about a plurality of SCells (or SCell identifiers) configured in the terminal.

For example, when the type indicated by the transmission resource type field (e.g., resourceAllocation) in the third DCI format is the first type (e.g., resourceAllocationType0) and all bits of the field for frequency transmission resource allocation are 0 or when the type indicated by the transmission resource type field (e.g., resourceAllocation) is the second type (e.g., resourceAllocationType1) and all bits of the field for frequency transmission resource allocation are 1, the terminal may not interpret the bits or fields located thereafter as the MCS field or the NDI field or the RV field or the HARQ process number field or the antenna port field or the DMRS SI, may regard and read the same as the bitmap field indicating switching or activation to the dormant BWP or switching or activation from the dormant BWP to the normal BWP with respect to each SCell, and may apply information indicated in the bitmap.

In the third DCI format, when the terminal reads the bitmap by satisfying the conditions described above, the first bitmap mapping method or the second bitmap mapping method described in the disclosure may be applied.

When the bit value of the bitmap for the terminal is 0, the bit value 0 may indicate that it is to be switched to the dormant BWP or is to activate the dormant BWP for each activated SCell or SCell identifier corresponding to the bit (when the dormant BWP has been configured or when it is included in the first SCell group or the second SCell group). As another method, when the bit value of the bitmap for the terminal is 0, the bit value 0 may indicate that it is to be switched to a dormant BWP or is to activate a dormant BWP for each activated SCell corresponding to the bit when the dormant BWP has been configured or when it is included in the first SCell group or the second SCell group or when an activated BWP is not a dormant BWP (or when it is a normal BWP). As another method, when the bit value of the bitmap for the terminal is 0, the bit value 0 may indicate that it is to be switched to the dormant BWP or is to activate the dormant BWP for each activated SCell or SCell identifier corresponding to the bit (when the dormant BWP has been configured or when it is included in the first SCell group or the second SCell group). As another method, when the bit value of the bitmap for the terminal is 0, the bit value 0 may indicate that it is to be switched to the dormant BWP or is to activate the dormant BWP for each activated SCell or SCell identifier corresponding to the bit. When a bit of the bitmap indicates a SCell or SCell identifier that is not configured with a dormant BWP, the terminal may ignore or may not read or may not apply the bit.

When the bit value of the bitmap for the terminal is 1, the bit value 1 may indicate that it is to be switched to a normal BWP (e.g., a first active BWP activated from dormancy) or is to be activated to a normal BWP (e.g., a first active BWP activated from dormancy) for each activated SCell corresponding to the bit. As another method, when the bit value of the bitmap for the terminal is 1, the bit value 1 may indicate that it is to be switched to a normal BWP (e.g., a first active BWP activated from dormancy) or is to be activated to a normal BWP (e.g., a first active BWP activated from dormancy) when an activated BWP is a dormant BWP (or when it is not a normal BWP) for each activated SCell corresponding to the bit, otherwise (when a current or activated BWP is not a dormant BWP (or when it is a normal BWP) for each activated SCell corresponding to the bit), the current active BWP may be maintained as it is or may be continuously used or applied or may be activated. As another method, when the bit value of the bitmap for the terminal is 1, the bit value 1 may indicate that it is to be switched from a dormant BWP to a normal BWP (e.g., a first active BWP activated from dormancy) or is to be activated to a normal BWP (e.g., a first active BWP activated from dormancy) for each activated SCell corresponding to the bit, or may indicate that the current active BWP is to be maintained as it is or is to be continuously used or applied or is to be activated. As another method, when the bit value of the bitmap for the terminal is 1, the bit value 1 may indicate that it is to be switched to a normal BWP (e.g., a first active BWP activated from dormancy) or is to be activated to a normal BWP (e.g., a first active BWP activated from dormancy) when an activated BWP is a dormant BWP (or when it is not a normal BWP) for each activated SCell corresponding to the bit, otherwise (when a current or activated BWP is not a dormant BWP (or when it is a normal BWP) for each activated SCell corresponding to the bit) or when the dormant BWP has not been configured, the current active BWP may be maintained as it is or may be continuously used or applied or may be activated.

Another embodiment as a particular example of Embodiment 3 of the disclosure described above may be as follows.

---

If a UE is provided search space sets to monitor PDCCH for detection of DCI format 1_1 scrambled by C-RNTI or MCS-C-RNTI, for PCell or SpCell and if
   resourceAllocation = resourceAllocationType0 and all bits of the frequency domain resource assignment field in DCI format 1_1 are equal to 0, or
   resourceAllocation = resourceAllocationType1 and all bits of the frequency domain resource assignment field in DCI format 1_1 are equal to 1
the UE considers the DCI format 1_1 as indicating an active DL BWP provided by dormant-BWP or by first-non-dormant-BWP-ID-for-DCI-inside-active-time for each activated SCell and interprets the sequence of fields of, for transport block 1
   Modulation and coding scheme
   New data indicator
   Redundancy version
and of
   HARQ process number
   Antenna port(s)

-continued

DMRS sequence initialization
as providing a bitmap to each configured SCell from LSB or MSB, in an ascending order of the SCell index for the cell group, where- a '0' value for a bit of the bitmap indicates an active DL BWP, provided by dormant-BWP, for the UE for a corresponding activated SCell configured with dormant BWP or belonging to SCell dormant group.
Option 1.
   if the previous DL BWP was a dormant DL BWP, a '1' value for a bit of the bitmap indicates an active DL BWP, provided by first-non-dormant-BWP-ID-for-DCI-inside-active-time, for the UE for a corresponding activated SCell. Otherwise, it indicates to continue the current active DL BWP.
Option 2.
   if the previous DL BWP was not an active DL BWP, a '1' value for a bit of the bitmap indicates an active DL BWP, provided by first-non-dormant-BWP-ID-for-DCI- inside -active-time, for the UE for a corresponding activated SCell. Otherwise, it indicates to continue the current active DL BWP.
Option 3.
   a '1' value for a bit of the bitmap indicates an active DL BWP switched from dormant DL BWP, provided by first-non-dormant-BWP-ID-for-DCI- inside -active-time or the current active DL BWP, for the UE for a corresponding activated SCell Another embodiment as a particular example of Embodiment 3 of the disclosure described above may be as follows.

If a UE is provided search space sets to monitor PDCCH for detection of DCI format 1_1 scrambled by C-RNTI or MCS-C-RNTI, for PCell or SpCell and if
   resourceAllocation = resourceAllocationType0 and all bits of the frequency domain resource assignment field in DCI format 1_1 are equal to 0, or
   resourceAllocation = resourceAllocationType1 and all bits of the frequency domain resource assignment field in DCI format 1_1 are equal to 1
the UE considers the DCI format 1_1 as indicating an active DL BWP provided by dormant-BWP or by first-non-dormant-BWP-ID-for-DCI-inside-active-time for each activated SCell and interprets the sequence of fields of, for transport block 1
   Modulation and coding scheme
   New data indicator
   Redundancy version
and of
   HARQ process number
   Antenna port(s)
   DMRS sequence initialization
as providing a bitmap to each configured SCell from LSB or MSB, in an ascending order of the SCell index configured with dormant BWP or belonging to dormant SCell group for the cell group, where- a '0' value for a bit of the bitmap indicates an active DL BWP, provided by dormant-BWP, for the UE for a corresponding activated SCell
Option 1.
   if the previous DL BWP was a dormant DL BWP, a '1' value for a bit of the bitmap indicates an active DL BWP, provided by first-non-dormant-BWP-ID-for-DCI-inside-active-time, for the UE for a corresponding activated SCell. Otherwise, it indicates to continue the current active DL BWP.
Option 2.
   if the previous DL BWP was not an active DL BWP, a '1' value for a bit of the bitmap indicates an active DL BWP, provided by first-non-dormant-BWP-ID-for-DCI- inside -active-time, for the UE for a corresponding activated SCell. Otherwise, it indicates to continue the current active DL BWP.
Option 3.
   a '1' value for a bit of the bitmap indicates an active DL BWP switched from dormant DL BWP, provided by first-non-dormant-BWP-ID-for-DCI- inside -active-time or the current active DL BWP, for the UE for a corresponding activated SCell
If an active DL BWP provided by dormant-BWP for a UE on an activated SCell is not a default DL BWP for the UE on the activated SCell, as described in Clause 12, the BWP inactivity timer is not used for transitioning from the active DL BWP provided by dormant-BWP to the default DL BWP on the activated SCell.

When applying Embodiment 1 or Embodiment 2 or Embodiment 3 of the disclosure, when the downlink dormant BWP configured in the SCell of the terminal is not configured as the downlink default BWP (default DL BWP), the BWP deactivation timer for switching or transitioning the dormant BWP to the default BWP may not be used. This is because, when the default BWP is configured to the normal BWP rather than the dormant BWP, because the BWP is automatically switched the dormant BWP to the normal BWP when the timer expires, battery consumption may occur due to PDCCH monitoring.

An embodiment of a particular operation related to the BWP deactivation timer and the BWP of the MAC layer according to Embodiment 1, Embodiment 2, or Embodiment 3 of the disclosure may be as follows, and when the default BWP has been configured and the BWP for which BWP switching is indicated is not the dormant BWP or is not the default BWP or only when the default BWP has not been configured and the BWP for which BWP switching is indicated is not the dormant BWP or is not the initial BWP, the BWP deactivation timer may be started or restarted.

When the MAC layer receives an indication of the PDCCH for BWP switching of a serving cell (PCell or PSCell or SCell), the MAC layer may operate on the serving cell configured with the BWP deactivation timer, as follows.
1> When the PDCCH about a BWP switching indication has been received and the MAC layer switches the downlink active BWP according to the indication
   2> When a downlink default BWP identifier (default-DownlinkBWP-Id) has been configured and the MAC layer switches to the BWP that is not indicated as a downlink dormant BWP or by the downlink default BWP identifier
   2> When a downlink default BWP identifier (default-DownlinkBWP-Id) has not been configured and the MAC layer switches to the BWP that is not a downlink dormant BWP or a downlink initial BWP
     3> The BWP inactivity timer (bwp-InactivityTimer) about the downlink active BWP may be started or restarted.

Another embodiment of a particular operation related to the BWP deactivation timer and the BWP of the MAC layer according to Embodiment 1 or Embodiment 2 or Embodiment 3 of the disclosure may be as follows, and the BWP deactivation timer may be started or restarted only when the switched and activated BWP is not the dormant BWP.

When the MAC layer receives an indication of the PDCCH for BWP switching of a serving cell (PCell or PSCell or SCell), the MAC layer may operate on the serving cell configured with the BWP deactivation timer, as follows.
1> When the PDCCH about a BWP switching indication has been received and the MAC layer switches the downlink active BWP according to the indication
   2> When a downlink default BWP identifier (default-DownlinkBWP-Id) has been configured and the MAC layer switches to the BWP that is not indicated by the downlink default BWP identifier
   2> When a downlink default BWP identifier (default-DownlinkBWP-Id) has not been configured and the MAC layer switches to the BWP that is not a downlink initial BWP
     3> When the switched and activated downlink BWP is not the dormant BWP or when it is not the BWP indicated by the dormant BWP identifier
         4> The BWP inactivity timer (bwp-InactivityTimer) about the downlink active BWP may be started or restarted.

Another embodiment of a particular operation related to the uplink BWP when the downlink BWP of the MAC layer according to Embodiment 1, Embodiment 2, or Embodiment 3 of the disclosure is switched to the dormant BWP may be as follows, and the active uplink BWP may be deactivated when the downlink BWP is switched to the dormant BWP. This is because the PDCCH is not monitored in the dormant BWP and data transmission/reception is not performed and thus the uplink BWP will not be used.

When the MAC layer receives an indication of the PDCCH for BWP switching of a serving cell (PCell or PSCell or SCell)
1> When there is no random access procedure in progress in the serving cell
1> Or when the random access procedure in progress in the serving cell is successfully completed when the PDCCH indicated by C-RNTI is received
   2> The terminal may switch the current BWP of the serving cell to the BWP indicated by the PDCCH.
   2> When the BWP indicated by the PDCCH is the downlink BWP having the same BWP identifier as the downlink dormant BWP identifier or when the switched and activated BWP is the downlink dormant BWP
     3> The active uplink BWP of the serving cell may be deactivated.
     3> When the BWP activation timer about the active downlink BWP is currently running in the serving cell, the BWP activation timer may be stopped. This is to prevent the dormant BWP from being activated by automatically switching to the default BWP (battery consumption due to PDCCH monitoring). This problem may be prevented when the default BWP is configured as the dormant BWP.
     3> As another method, when the cell deactivation timer is running, the cell deactivation timer may be stopped. This is an operation that may be applied to prevent the cell from being deactivated and the dormant BWP from being automatically deactivated due to the expiration of the cell timer.

Another embodiment of a particular operation related to the uplink BWP when the downlink BWP of the MAC layer according to Embodiment 1, Embodiment 2, or Embodiment 3 of the disclosure is switched to the dormant BWP to the normal BWP that is not a dormant BWP may be as follows, and the uplink BWP may be switched and activated to the first active BWP when the downlink BWP is switched from the dormant BWP to the normal BWP.

When the MAC layer receives an indication of the PDCCH for BWP switching of a serving cell (PCell or PSCell or SCell)
1> When there is no random access procedure in progress in the serving cell
1> Or when the random access procedure in progress in the serving cell is successfully completed when the PDCCH indicated by C-RNTI is received
   2> The terminal may switch the current BWP of the serving cell to the BWP indicated by the PDCCH.
   2> When the BWP indicated by the PDCCH is the downlink BWP having the same BWP identifier as the downlink dormant BWP identifier or when the switched and activated BWP is the downlink dormant BWP
     3> The active uplink BWP of the serving cell may be deactivated.
     3> When the BWP activation timer about the active downlink BWP is currently running in the serving cell, the BWP activation timer may be stopped. This is to prevent the dormant BWP from being activated by automatically switching to the default BWP (battery consumption due to PDCCH monitoring). This problem may be prevented when the default BWP is configured as the dormant BWP.
3> As another method, when the cell deactivation timer is running, the cell deactivation timer may be stopped. This is an operation that may be applied to prevent the cell from being deactivated and the dormant BWP from being automatically deactivated due to the expiration of the cell timer.
2> When the active downlink BWP (e.g., the previous downlink BWP) is the dormant BWP or is the BWP indicated by the dormant BWP identifier,
2> And when the BWP indicated by the PDCCH is the BWP having a BWP identifier different from the dormant BWP identifier or when the downlink BWP switched and activated according to the PDCCH indication is not the dormant BWP
3> The uplink BWP of the serving cell may be activated to the first active BWP or the uplink BWP indicated by the first active BWP identifier.

Another embodiment of a particular operation related to the uplink BWP when the downlink BWP of the MAC layer according to Embodiment 1, Embodiment 2, or Embodiment 3 of the disclosure is switched to the dormant BWP to the normal BWP that is not a dormant BWP may be as follows, and the uplink BWP may be switched and activated to the uplink BWP having the same BWP identifier as the BWP indicated by the PDCCH when the downlink BWP is switched from the dormant BWP to the normal BWP.

When the MAC layer receives an indication of the PDCCH for BWP switching of a serving cell (PCell or PSCell or SCell)
1> When there is no random access procedure in progress in the serving cell
1> Or when the random access procedure in progress in the serving cell is successfully completed when the PDCCH indicated by C-RNTI is received
2> The terminal may switch the current BWP of the serving cell to the BWP indicated by the PDCCH.
2> When the BWP indicated by the PDCCH is the downlink BWP having the same BWP identifier as the downlink dormant BWP identifier or when the switched and activated BWP is the downlink dormant BWP
3> The active uplink BWP of the serving cell may be deactivated.
3> When the BWP activation timer about the active downlink BWP is currently running in the serving cell, the BWP activation timer may be stopped. This is to prevent the dormant BWP from being activated by automatically switching to the default BWP (battery consumption due to PDCCH monitoring). This problem may be prevented when the default BWP is configured as the dormant BWP.
3> As another method, when the cell deactivation timer is running, the cell deactivation timer may be stopped. This is an operation that may be applied to prevent the cell from being deactivated and the dormant BWP from being automatically deactivated due to the expiration of the cell timer.
2> When the active downlink BWP (e.g., the previous downlink BWP) is the dormant BWP or is the BWP indicated by the dormant BWP identifier, 2> And when the BWP indicated by the PDCCH is the BWP having a BWP identifier different from the dormant BWP identifier or when the downlink BWP switched and activated according to the PDCCH indication is not the dormant BWP
3> The current downlink BWP of the serving cell may be activated to the uplink BWP having a BWP identifier identical to the BWP identifier indicated by the PDCCH or to the downlink BWP having the same BWP identifier as the current downlink BWP.

Another embodiment of a particular operation related to the uplink BWP when the downlink BWP of the MAC layer according to Embodiment 1, Embodiment 2, or Embodiment 3 of the disclosure is switched to the dormant BWP to the normal BWP that is not a dormant BWP may be as follows, and when the downlink BWP is switched from the dormant BWP to the normal BWP, the uplink BWP may be switched and activated to the last activated uplink BWP or the uplink BWP that has been activated when the previous downlink BWP has been switched to the dormant BWP.

When the MAC layer receives an indication of the PDCCH for BWP switching of a serving cell (PCell or PSCell or SCell)
1> When there is no random access procedure in progress in the serving cell
1> Or when the random access procedure in progress in the serving cell is successfully completed when the PDCCH indicated by C-RNTI is received
2> The terminal may switch the current BWP of the serving cell to the BWP indicated by the PDCCH.
2> When the BWP indicated by the PDCCH is the downlink BWP having the same BWP identifier as the downlink dormant BWP identifier or when the switched and activated BWP is the downlink dormant BWP
3> The active uplink BWP of the serving cell may be deactivated.
3> When the BWP activation timer about the active downlink BWP is currently running in the serving cell, the BWP activation timer may be stopped. This is to prevent the dormant BWP from being activated by automatically switching to the default BWP (battery consumption due to PDCCH monitoring). This problem may be prevented when the default BWP is configured as the dormant BWP.
3> As another method, when the cell deactivation timer is running, the cell deactivation timer may be stopped. This is an operation that may be applied to prevent the cell from being deactivated and the dormant BWP from being automatically deactivated due to the expiration of the cell timer.
2> When the active downlink BWP (e.g., the previous downlink BWP) is the dormant BWP or is the BWP indicated by the dormant BWP identifier,
2> And when the BWP indicated by the PDCCH is the BWP having a BWP identifier different from the dormant BWP identifier or when the downlink BWP switched and activated according to the PDCCH indication is not the dormant BWP
3> The current uplink BWP of the serving cell may be activated to the last activated uplink BWP or the uplink BWP that has been activated when the previous downlink BWP has been switched to the dormant BWP.

Another embodiment of a particular operation according to the cell state (active state or inactive state) of the MAC layer according to Embodiment 1 or Embodiment 2 or Embodiment 3 of the disclosure may be as follows.

When an indication to deactivate the serving cell (PCell or SCell) has been received via a MAC CE or an RRC message or when the cell deactivation timer has been configured and the timer has expired, one or more of the following operations may be performed.

The downlink or uplink BWP may be deactivated.

The cell deactivation timer running or configured in the cell or the BWP is stopped.

When the BWP deactivation timer configured for the BWP of the cell is running, the BWP deactivation timer may be stopped. This is to prevent an unnecessary BWP switching procedure in the cell.

The periodic downlink transmission resource (DL SPS or configured downlink assignment) or the periodic uplink transmission resource (UL SPS or configured uplink grant Type 2) configured in the BWP of the cell may be released (cleared). In this case, "releasing (clearing)" may mean that the terminal stores configuration information, such as period information configured in the RRC message but information about periodic transmission resources indicated or activated by L1 signaling (e.g., DCI) is removed and no longer used. The above method, that is, an operation of clearing the configured periodic downlink transmission resource (DL SPS or configured downlink assignment) or the configured periodic uplink transmission resource (UL SPS or configured uplink grant) may be performed only when the BWP is transitioned from the active state to the dormant state. This is because, when the BWP is transitioned from the inactive state to the dormant state, there is no information about periodic transmission resource information indicated or activated by L1 signaling. As another method, periodic transmission resources may be released only when periodic downlink transmission resources or periodic uplink transmission resources are configured or are configured and used.

The periodic uplink transmission resource (configured uplink grant Type 1 configured by the RRC) configured in the BWP of the cell may be suspended. In this case, "suspending" may mean that the terminal stores the transmission resource configuration information configured in the RRC message but it is no longer used. The above method, that is, an operation of suspending the configured periodic uplink transmission resource (configured uplink grant Type 1) may be performed only when the BWP is transitioned from the active state to the dormant state. This is because the periodic transmission resource is not used when the BWP is transitioned from the inactive state to the dormant state. As another method, periodic transmission resources may be released only when periodic downlink transmission resources or periodic uplink transmission resources are configured or are configured and used.

All HARQ buffers configured in the uplink or downlink BWP are emptied.

The terminal does not transmit the SRS for the uplink BWP of the cell.

In the BWP of the cell, the uplink data is not transmitted on the UL-SCH.

The random access procedure is not performed on the BWP of the cell.

In the BWP of the cell, the terminal does not monitor the PDCCH.

The terminal does not monitor the PDCCH for the BWP of the cell. However, when the dormant BWP has been configured in the cell, in the case of cross-scheduling, the PDCCH for the cell (e.g., SCell) may be monitored in the scheduled cell (e.g., PCell) to receive an indication thereof PUCCH or SPUCCH transmission is not performed in the BWP of the cell.

When an indication to deactivate the BWP (e.g., the downlink BWP) of the current cell (PCell or SCell) or the cell is received through the DCI (L1 control signal) of the PDCCH or the MAC CE or the RRC message or when an indication to switch the dormant BWP (e.g., the downlink BWP) to the active BWP (or the BWP that is not a dormant BWP) is received through the DCI (L1 control signal) of the PDCCH or the MAC CE or the RRC message (when the indication is received through the L1 control signal of the PDCCH, the indication may be received in the PDCCH of its own cell by self-scheduling or the indication may be received in the PDCCH for the cell in the PCell by cross-carrier scheduling), one or more of the following operations may be performed.

When the current downlink BWP of the serving cell is not the dormant BWP or when the serving cell was previously inactive and is activated by the indication of the MAC CE, the uplink or downlink BWP may be switched to the designated BWP (e.g., uplink BWP or uplink first active BWP) and the BWP may be activated.

When the current downlink BWP of the serving cell is not the dormant BWP or when the serving cell was previously inactive and is activated by the indication of the MAC CE, the sounding reference signal (SRS) may be transmitted such that the base station may perform channel measurement on the uplink. For example, it may be periodically transmitted.

When the current downlink BWP of the serving cell is not the dormant BWP or when the serving cell was previously inactive and are activated by the indication of the MAC CE, the PUCCH may be transmitted when the PUCCH is configured in the activated BWP.

When the current downlink BWP of the serving cell is not the dormant BWP or when the serving cell was previously inactive and is activated by the indication of the MAC CE, the BWP or cell deactivation timer may be started or restarted. As another method, the BWP or cell deactivation timer may be started or restarted only when the BWP or cell hibernation timer is not configured. When the BWP or cell hibernation timer may be configured through the RRC message, the BWP or cell may be hibernated upon expiration of the timer. For example, the BWP or cell deactivation timer may be started or restarted only in the hibernated BWP or cell.

When the current downlink BWP of the serving cell is not the dormant BWP or when the serving cell was previously inactive and is activated by the indication of the MAC CE, when there is a suspended type 1 configuration transmission resource, a stored type 1 transmission resource may be initialized and used according to the original configuration. The type 1 configuration transmission resource may be a periodic transmission resource (uplink or downlink) previously allocated through the RRC message and may refer to a transmission resource that may be activated and used through the RRC message.

When the current downlink BWP of the serving cell is not the dormant BWP or when the serving cell was previously inactive and is activated by the indication of the MAC CE, the PHR may be triggered for the BWP.

In the activated BWP, the terminal may report the channel measurement result (CSI or CQI or PMI or RI or PTI or CRI or the like) on the downlink according to the configuration of the base station.

When the current downlink BWP of the serving cell is not the dormant BWP or when the serving cell was previously inactive and is activated by the indication of the MAC CE, the PUCCH may be monitored to read the indication of the base station in the activated BWP.

When the current downlink BWP of the serving cell is not the dormant BWP or when the serving cell was previously inactive and is activated by the indication of the MAC CE, the PUCCH may be monitored to read cross-scheduling for the activated BWP.

When the current downlink BWP of the serving cell is not the dormant BWP or when the serving cell was previously inactive and is activated by the indication of the MAC CE, the BWP deactivation timer may be started or restarted. As another method, the BWP deactivation timer may be started or restarted only when the BWP hibernation timer is not configured. When the BWP hibernation timer may be configured through the RRC message, the BWP may be switched to the dormancy or the dormant BWP upon expiration of the timer. For example, the BWP deactivation timer may be started or restarted only in the dormant BWP.

When the current downlink BWP of the serving cell is not the dormant BWP or when the serving cell was previously inactive and is activated by the indication of the MAC CE and when the BWP hibernation timer has been configured for the BWP The BWP hibernation timer is started or restarted for the BWP.

In addition, in an embodiment of the disclosure, when the base station triggers a random access procedure for the SCell, the base station does not indicate to switch the downlink BWP to the dormant BWP for the SCell. This is because the random access procedure may not be successfully performed because the uplink BWP is deactivated when switched to the downlink dormant BWP.

In addition, in an embodiment of the disclosure, an operation related to switching of the dormant BWP or the normal BWP (e.g., the BWP that is not the dormant BWP) may be performed when the cell (e.g., SCell) in which the BWP is operated is activated. Thus, when MAC control information (MAC Control Element (MAC CE)) including an indicator for activating or deactivating the cell is received, when the cell is operating the downlink dormant BWP and receives the MAC CE including an indicator for activating the cell, the indicator may be ignored, and when the cell is operating the downlink dormant BWP and receives the MAC CE including an indicator for deactivating the cell, the downlink dormant BWP of the cell may be deactivated. As another method, in an embodiment of the disclosure, the cell deactivation timer may be stopped when the cell deactivation timer is running when the downlink BWP is switched to the dormant BWP. This is an operation that may be applied to prevent the cell from being deactivated and the dormant BWP from being automatically deactivated due to the expiration of the cell timer.

In the disclosure, Embodiment 4 of operating a BWP-by-BWP state transition and an operation thereof may be as follows.

In Embodiment 4 of the disclosure, as illustrated in FIG. 1F, when a plurality of BWPs are configured for each cell to the terminal through an RRC message, a dormant BWP may be configured by using an indicator or a BWP identifier. In addition, when the base station transmits a MAC CE including an indicator for deactivating a particular cell to the terminal, when a dormant BWP has been configured in the cell, the terminal may deactivate the particular cell as indicated by the MAC CE and may switch to the dormant BWP. The terminal may not perform PDCCH monitoring in the dormant BWP in the particular cell and may not perform data transmission/reception but may perform a channel measurement report to reduce the terminal battery consumption and enable rapid BWP activation. In addition, when the base station needs to perform data transmission/reception for the deactivated cell switched to the dormant BWP, the base station may transmit a MAC CE including an indicator for activating a particular cell to the terminal, and when the terminal receives the MAC CE, the particular cell may be activated and may be switched and activated to the first active BWP. In addition, the PDCCH may be monitored again in the switched BWP, and data transmission/reception may be started. However, in Embodiment 4 of the disclosure, when deactivation is indicated by an RRC message with respect to a particular cell, all BWPs may be deactivated even when a dormant BWP is configured in the particular cell. In addition, when receiving an indication to deactivate the cell by the MAC CE with respect to the deactivated cell by the RRC message, when the dormant BWP has been configured for the cell, the terminal may activate the dormant BWP, may perform an operation in the dormant BWP, and may start a channel measurement report.

Embodiment 4 of the disclosure may be characterized as operating or using a dormant BWP in the cell in an inactive state. In addition, in Embodiment 4 of the disclosure, switching the BWP to the dormant BWP may be characterized in that switching is indicated for the downlink BWP. This is because an operation of not monitoring the PDCCH and an operation of performing a channel measurement report are operations on the downlink BWP of the cell of the terminal.

In Embodiment 4 of the disclosure, as for the state of the cell (e.g., SCell), an active state or an inactive state may be maintained for operation and a state transition between the states may be supported, and as for the state for the BWP, an active state or a dormant state or an inactive state may be maintained for operation and a state transition of the BWP or a switching of the BWP may be operated according to the cell state.

An embodiment of a particular operation according to the cell state (active state or inactive state) of the MAC layer according to Embodiment 4 of the disclosure may be as follows.

When the terminal is indicated to operate in the dormant BWP for the serving cell (PCell or SCell) or when an indication to deactivate the cell is received through the MAC CE or the RRC message or when an indication to switch the BWP (e.g., the downlink BWP) to the dormant BWP is received through the DCI (L1 control signal) of the PDCCH or the MAC CE or the RRC message or when the cell deactivation timer has been configured and the timer has expired, one or more of the following operations may be performed.

When the dormant BWP has been configured in the serving cell, the downlink BWP may be switched to the BWP indicated by the dormant BWP identifier. Alternatively, the BWP may be hibernated.

The uplink BWP may be deactivated.

The cell deactivation timer running or configured in the cell or the BWP is stopped.

When the BWP deactivation timer configured for the BWP of the cell is running, the BWP deactivation timer may be stopped. This is to prevent an unnecessary BWP switching procedure in the cell.

The periodic downlink transmission resource (DL SPS or configured downlink assignment) or the periodic uplink transmission resource (UL SPS or configured uplink grant Type 2) configured in the BWP of the cell may be released (cleared). In this case, "releasing (clearing)" may mean that the terminal stores configuration information, such as period information configured in the RRC message but information about periodic transmission resources indicated or activated by L1 signaling (e.g., DCI) is removed and no longer used. The above method, that is, an operation of clearing the configured periodic downlink transmission resource (DL SPS or configured downlink assignment) or the configured periodic uplink transmission resource (UL SPS or configured uplink grant) may be performed only when the BWP is transitioned from the active state to the dormant state. This is because, when the BWP is transitioned from the inactive state to the dormant state, there is no information about periodic transmission resource information indicated or activated by L1 signaling. As another method, periodic transmission resources may be released only when periodic downlink transmission resources or periodic uplink transmission resources are configured or are configured and used.

The periodic uplink transmission resource (configured uplink grant Type 1 configured by the RRC) configured in the BWP of the cell may be suspended. In this case, "suspending" may mean that the terminal stores the transmission resource configuration information configured in the RRC message but it is no longer used. The above method, that is, an operation of suspending the configured periodic uplink transmission resource (configured uplink grant Type 1) may be performed only when the BWP is transitioned from the active state to the dormant state. This is because the periodic transmission resource is not used when the BWP is transitioned from the inactive state to the dormant state. As another method, periodic transmission resources may be released only when periodic downlink transmission resources or periodic uplink transmission resources are configured or are configured and used.

All HARQ buffers configured in the uplink or downlink BWP are emptied.

The terminal does not transmit the SRS for the uplink BWP of the cell.

When a dormant BWP has been configured in the cell, in the dormant BWP, the terminal may perform channel measurement (CSI or CQI or PMI or RI or PTI or CRI or the like) on the downlink according to the configuration of the base station and may perform measurement report. For example, the channel or frequency measurement report may be periodically performed.

In the BWP of the cell, the uplink data is not transmitted on the UL-SCH.

The random access procedure is not performed on the BWP of the cell.

In the BWP of the cell, the terminal does not monitor the PDCCH.

The terminal does not monitor the PDCCH for the BWP of the cell. However, when the dormant BWP has been configured in the cell, in the case of cross-scheduling, the PDCCH for the cell (e.g., SCell) may be monitored in the scheduled cell (e.g., PCell) to receive an indication thereof PUCCH or SPUCCH transmission is not performed in the BWP of the cell.

When the dormant BWP has been configured in the cell, the downlink BWP may be hibernated, channel measurement may be performed and reported, and the uplink BWP of the cell may be deactivated and may not be used. This is because, in the dormant SCell, channel measurement is performed only on the downlink BWP, and the measurement result is reported in the uplink BWP of the SpCell (PCell or PSCell) or the SCell with the PUCCH.

In the disclosure, a terminal operation for the active BWP may be as follows.

When an indication to deactivate the BWP (e.g., the downlink BWP) of the current cell (PCell or SCell) or the cell is received through the DCI (L1 control signal) of the PDCCH or the MAC CE or the RRC message or when an indication to switch the BWP (e.g., the downlink BWP) to the active BWP (or the BWP that is not a dormant BWP) is received through the DCI (L1 control signal) of the PDCCH or the MAC CE or the RRC message (when the indication is received through the L1 control signal of the PDCCH, the indication may be received in the PDCCH of its own cell by self-scheduling or the indication may be received in the PDCCH for the cell in the PCell by cross-carrier scheduling), one or more of the following operations may be performed.

It is switched and activated to the indicated uplink or downlink BWP. Alternatively, the uplink or downlink BWP is switched to the designated BWP (e.g., the uplink or uplink first active BWP) and the BWP is activated.

In the activated BWP, a sounding reference signal (SRS) is transmitted such that the base station may perform channel measurement on the uplink. For example, it may be periodically transmitted.

When the PUCCH is configured in the activated BWP, PUCCH transmission is performed.

The BWP or cell deactivation timer is started or restarted. As another method, the BWP or cell deactivation timer may be started or restarted only when the BWP or cell hibernation timer is not configured. When the BWP or cell hibernation timer may be configured through the RRC message, the BWP or cell may be hibernated upon expiration of the timer. For example, the BWP or cell deactivation timer may be started or restarted only in the hibernated BWP or cell.

When there is a type 1 configuration transmission resource that has been suspended, the stored type 1 transmission resource may be initialized to the original configuration and used. The type 1 configuration transmission resource may be a periodic transmission resource (uplink or downlink) previously allocated through the RRC message and may refer to a transmission resource that may be activated and used through the RRC message.

PHR is triggered for the BWP.

In the activated BWP, the terminal may report the channel measurement result (CSI or CQI or PMI or RI or PTI or CRI or the like) on the downlink according to the configuration of the base station.

In the activated BWP, the PDCCH is monitored to read the indication of the base station.

The PDCCH is monitored to read cross-scheduling for the activated BWP.

The BWP or cell deactivation timer is started or restarted. As another method, the BWP deactivation timer may be started or restarted only when the BWP hibernation timer is not configured. When the BWP hibernation timer may be configured through the RRC message, the BWP may be switched to the dormancy or the dormant BWP upon expiration of the timer. For example, the BWP deactivation timer may be started or restarted only in the dormant BWP.

When the link BWP hibernation timer is configured for the BWP,

The BWP hibernation timer is started or restarted for the BWP.

In the disclosure, various embodiments may be configured and operated by combining or extending Embodiment 1 or Embodiment 2 or Embodiment 3 or Embodiment 4 in which a state transition and an operation according thereto are operated in BWP units. For example, Embodiment 5 of operating the state transition and the operation thereof in BWP units may be as follows.

In Embodiment 5 of the disclosure, as illustrated in FIG. 1F, when a plurality of BWPs are configured for each cell to the terminal through an RRC message, a dormant BWP may be configured by using an indicator or a BWP identifier. In addition, the base station may use the DCI of the PDCCH, which is L1 signaling, to indicate to switch the BWP to the dormant BWP with respect to the cell in the active state, and may not perform PDCCH monitoring and may not perform data transmission/reception but may perform channel measurement report in the dormant BWP to reduce the terminal battery consumption and enable rapid BWP activation. The base station may indicate BWP switching by transmitting the DCI of the PDCCH, which is L1 signaling, in the cell (self scheduling) or by transmitting the same in the PCell (cross-carrier scheduling).

In addition, when data transmission/reception is required for the activated cell switched to the dormant BWP, the base station may transmit the MAC CE including an indicator to activate the cell to the terminal, may indicate switching the dormant BWP to the BWP (or the active BWP) that is not the dormant BWP among a plurality of BWPs configured by the RRC message, may again monitor the PDCCH in the switched BWP, and may start data transmission/reception.

In addition, when the base station transmits the MAC CE including a cell deactivation indicator to the terminal, the terminal may deactivate the uplink or downlink BWP of a particular cell and may perform deactivation operations proposed in this disclosure. Embodiment 5 of the disclosure may be characterized as not operating or using a dormant BWP in the cell in an inactive state. In addition, in Embodiment 5 of the disclosure, switching the BWP to the dormant BWP may be characterized in that switching is indicated for the downlink BWP, and switching the dormant BWP to the active BWP may be characterized in that switching is performed by the cell activation indicator of the MAC CE. Particular operations related to the cell state and the BWP switching operation may be operated based on the operations proposed in Embodiment 1 or Embodiment 2 or Embodiment 3 of the disclosure.

As described above, various embodiments may be configured and operated by combining or extending Embodiment 1 or Embodiment 2 or Embodiment 3 or Embodiment 4 or Embodiment 5 of the disclosure.

Figure 1M:
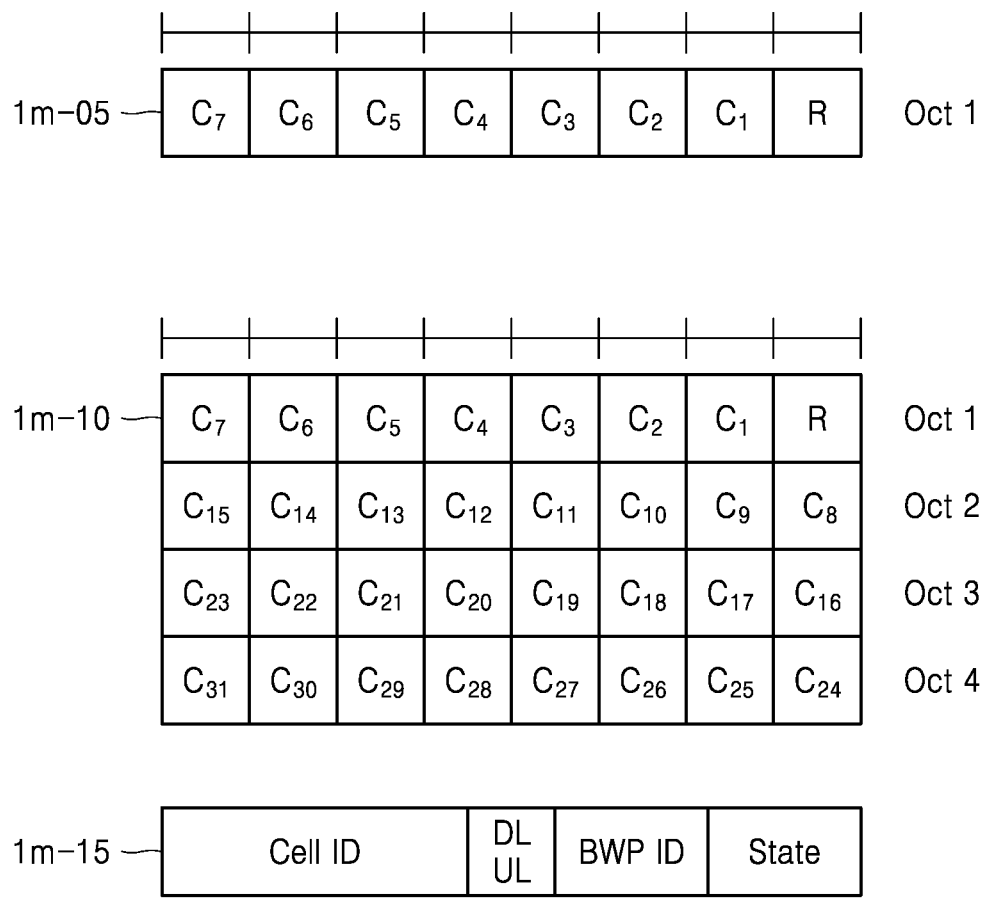
FIG. 1M is a diagram illustrating medium access control (MAC) control information indicating a state transition to an active (activated) state, a dormant (hibernation) state, or an inactive (deactivated) state according to an embodiment of the disclosure.

FIG. 1M is a diagram illustrating MAC control information indicating a state transition to an active (activated) state, a dormant (hibernation) state, or an inactive (deactivated) state according to an embodiment of the disclosure.

Referring to FIG. 1M, the active and inactive MAC CE described in the disclosure may have the structure illustrated in FIG. 1M as an embodiment of the disclosure, and MAC CE structures may be classified into a MAC CE structure 1$m$-05 having a size of 1 byte supporting 7 SCells and a MAC CE structure 1$m$-10 having a size of 4 bytes supporting 31 SCells. In addition, it may have the following features.

When a dormant MAC CE is not received and only active and inactive MAC CEs are received, the terminal may operate as follows.

When each field of the active and inactive MAC CEs represents each SCell identifier, and a value corresponding to each field may indicate whether to activate or deactivate the SCell. When the value of the indicator for the SCell indicated by the SCell identifier is 1, the SCell may be activated when the state of the SCell is inactive. However, when the state of SCell is not the inactive state, the indicator value may be ignored. When the value of the indicator for the SCell indicated by the SCell identifier is 0, the SCell may be deactivated. For example, when the value of the indicator for the S Cell is 0, the S Cell may be deactivated regardless of the state of the S Cell.

The active and inactive MAC CE described in the disclosure may have the structure illustrated in FIG. 1M as an embodiment of the disclosure, and MAC CE structures may be classified into a MAC CE structure 1$m$-05 having a size of 1 byte supporting 7 SCells and a MAC CE structure 1$m$-10 having a size of 4 bytes supporting 31 SCells. In addition, it may have the following features.

When active and inactive MAC CEs are not received and only a dormant MAC CE is received, the terminal may operate as follows.

When each field of the dormant MAC CE represents each SCell identifier, and a value corresponding to each field may indicate whether to activate or hibernate the SCell. When the value of the indicator for the SCell indicated by the SCell identifier is 1, the SCell may be hibernated. For example, when the value of the indicator for the SCell is 1, the SCell may be hibernated regardless of the state of the SCell. When the value of the indicator for the SCell indicated by the SCell identifier is 0, the SCell may be activated when the state of the SCell is dormant. However, when the state of SCell is not the dormant state, the indicator value may be ignored.

When the active and inactive MAC CEs and the dormant MAC CE are simultaneously received by one MAC layer, the terminal may operate as follows.

When each field of the active and inactive MAC CEs and the dormant MAC CE represents each SCell identifier, a combination of values corresponding to the respective fields may indicate a state transition, such as activation or hibernation or deactivation of the SCell. As for the active and inactive MAC CEs and the dormant MAC CE, MAC CEs having a size of 1 byte or MAC CEs having a size of 4 bytes may be simultaneously received in one MAC layer. When two types of MAC CEs are received together, the state transition of each SCell indicated by the MAC CEs may be determined according to a combination of indication values of the MAC CEs as in Table 1 below.

TABLE 1

| Hibernation MAC control element Ci | Activation/ Deactivation MAC control element Ci | SCell shall be |
|---|---|---|
| 0 | 0 | Deactivated |
| 0 | 1 | Activated |
| 1 | 0 | Reserved MAC control element combination |
| 1 | 1 | Dormant |

State indication about activation and deactivation and hibernation for each link may be performed by using an R field included in the structure of the cell activation and deactivation MAC CEs or the cell hibernation MAC CE described above. For example, when the R field is 0, it may indicate that the downlink of the cell is to be transitioned to an active or inactive or dormant state, and when the R field is 1, it may indicate that the uplink of the cell is to be transitioned to an active or inactive or dormant state. As another method, the R field may be defined and used to indicate only the state transition of the downlink (or uplink). In addition, as in $1m$-15, the MAC CE including each cell identifier and each link indicator or a state indicator may be defined to indicate the state transition for each link for each cell.

In addition, new MAC CEs for supporting the embodiments of the disclosure and extending to various embodiments may be designed or the existing MAC CE functions may be extended.

For example, the MAC CEs proposed and described in FIG. 1M of the disclosure may be applied, and the functions described in FIG. 1M of the disclosure may be extended and applied by extending reserved bits (R bits) in $1m$-05 or $1m$-10 in FIG. 1M.

For example, when the reserved bit is configured to 0, a 1-bit indicator indicating the identifier of each cell may be defined and used as follows.
When the 1-bit indicator is configured to 0, the state transition about the cell or BWP may be performed as follows.
The cell or BWP in the inactive state may be transitioned to the inactive state or may be maintained as it is.
The cell or BWP in the active state may be transitioned to the inactive state.
The cell or BWP in the dormant state may be transitioned to the inactive state.
When the 1-bit indicator is configured to 1, the state transition about the cell or BWP may be performed as follows.
The cell or BWP in the active state may be transitioned to the active state or may be maintained as it is.
The cell or BWP in the inactive state may be transitioned to the active state.
The cell or BWP in the dormant state may be transitioned to the dormant state or may be maintained as it is.
When the reserved bit is configured to 1, a 1-bit indicator indicating the identifier of each cell may be defined and used as follows. As another method, a logical identifier may be newly defined, and a new MAC CE may be defined and used as follows.
When the 1-bit indicator is configured to 0, the state transition about the cell or BWP may be performed as follows.
The cell or BWP in the active state may be transitioned to the active state or may be maintained as it is.
The cell or BWP in the dormant state may be transitioned to the active state.
The cell or BWP in the inactive state may be transitioned to the inactive state or may be remained as it is.
When the 1-bit indicator is configured to 1, the state transition about the cell or BWP may be performed as follows.
The cell or BWP in the active state may be transitioned to the dormant state.
The cell or BWP in the inactive state may be transitioned to the dormant state.
The cell or BWP in the dormant state may be transitioned to the dormant state or may be maintained as it is.

For example, the functions of the MAC CE described above may be variously extended and designed to indicate the state transition or switching of the cell or BWP, for application to various embodiments of the disclosure.

Figure 1N:
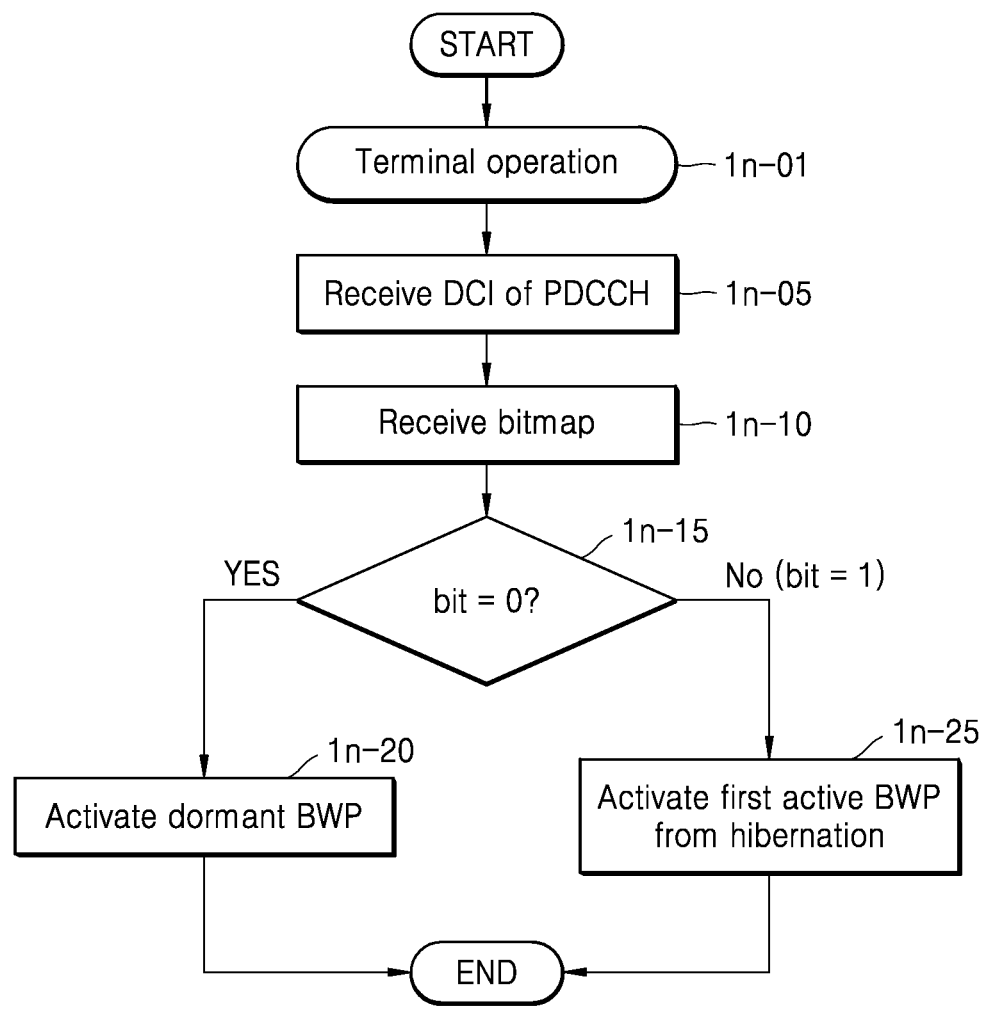
FIG. 1N is a diagram illustrating a terminal operation according to Embodiment 1, Embodiment 2, or Embodiment 3 according to an embodiment of the disclosure.
Figure 10:
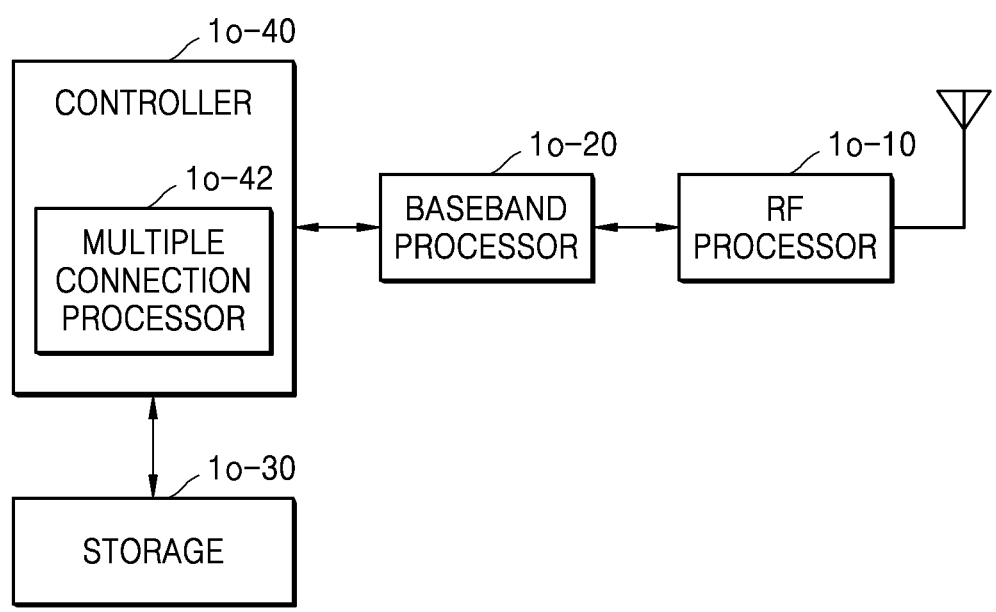

FIG. 1N is a diagram illustrating a terminal operation according to Embodiment 1, Embodiment 2, or Embodiment 3 according to an embodiment of the disclosure.

In embodiments of the disclosure, starting from operation $1n$-01, the terminal may monitor the DCI of the PDCCH in the PCell or SpCell in operation $1n$-05, and may identify a bitmap including an indication for switching or activation to the first active BWP from the dormant BWP described in the disclosure, in the found DCI format in operation $1n$-10.

The terminal may identify each bit value in the bitmap in operation $1n$-10, and when the bit value of the bitmap is 0 in operation $1n$-20, the bit value 0 may indicate that it is to be switched to the dormant BWP or is to activate the dormant BWP with respect to each activated SCell or SCell identifier corresponding to the bit or the activated SCell included in the first SCell group or the activated SCell included in the second SCell group (when the dormant BWP has been configured or when it is included in the first SCell group or the second SCell group) in operation $1n$-25. As another method, when it is determined in operation $1n$-15 that the bit value of the bitmap for the terminal is 0, the bit value 0 may indicate that it is to be switched to the dormant BWP or is to activate the dormant BWP with respect to each activated SCell corresponding to the bit or the activated SCell included in the first SCell group or the activated SCell included in the second SCell group when the dormant BWP has been configured or when it is included in the first SCell group or the second SCell group or when the activated BWP is not the dormant BWP (or when it is the normal BWP). As another method, when the bit value of the bitmap for the terminal is 0, the bit value 0 may indicate that it is to be switched to the dormant BWP or is to activate the dormant BWP with respect to each activated SCell or SCell identifier corresponding to the bit or the activated SCell included in the first SCell group or the activated SCell included in the second SCell group (when the dormant BWP has been configured or when it is included in the first SCell group or the second SCell group). As another method, when the bit value of the bitmap for the terminal is 0, the bit value 0 may indicate that it is to be switched to the dormant BWP or is to activate the dormant BWP with respect to each activated S Cell or SCell identifier corresponding to the bit or the activated SCell included in the first SCell group or the activated SCell included in the second SCell group. When a bit of the bitmap indicates a SCell or SCell identifier that is not configured with a dormant BWP, the terminal may ignore or may not read or may not apply the bit.

The terminal may identify each bit value in the bitmap in operation 1*n*-10, and when the bit value of the bitmap is 1 in operation 1*n*-20, the bit value 1 may indicate that it is to be switched to the normal BWP (e.g., the first active BWP activated from dormancy) or is to be activated the normal BWP (e.g., the first active BWP activated from dormancy) with respect to each activated SCell corresponding to the bit or the activated SCell included in the first SCell group or the activated SCell included in the second SCell group. As another method, when the bit value of the bitmap for the terminal is 1, the bit value 1 may indicate that it is to be switched to the normal BWP (e.g., the first active BWP activated from dormancy) or is to be activated to the normal BWP (e.g., the first active BWP activated from dormancy) with respect to each activated SCell corresponding to the bit or the activated SCell included in the first SCell group or the activated SCell included in the second SCell group when the current or activated BWP is the dormant BWP (or when it is not the normal BWP), otherwise (when the current or activated BWP is not the dormant BWP (or when it is the normal BWP) with respect to each activated SCell corresponding to the bit), the current active BWP may be maintained as it is or may be continuously used or applied or may be activated. As another method, when the bit value of the bitmap for the terminal is 1, the bit value 1 may indicate that it is to be switched from the dormant BWP to the normal BWP (e.g., the first active BWP activated from dormancy) or is to be activated to the normal BWP (e.g., the first active BWP activated from dormancy) with respect to each activated SCell corresponding to the bit or the activated SCell included in the first SCell group or the activated SCell included in the second SCell group, or may indicate that the current active BWP is to be maintained as it is or is to be continuously used or applied or is to be activated. As another method, when the bit value of the bitmap for the terminal is 1, the bit value 1 may indicate that it is to be switched to the normal BWP (e.g., the first active BWP activated from dormancy) or is to be activated to the normal BWP (e.g., the first active BWP activated from dormancy) with respect to each activated SCell corresponding to the bit or the activated SCell included in the first SCell group or the activated SCell included in the second SCell group when the current or activated BWP is the dormant BWP (or when it is not the normal BWP), otherwise (when the current or activated BWP is not the dormant BWP (or when it is the normal BWP) with respect to each activated SCell corresponding to the bit) or when the dormant BWP has not be configured, the current active BWP may be maintained as it is or may be continuously used or applied or may be activated.

FIG. 1O illustrates a structure of a terminal according to an embodiment of the disclosure.

Referring to FIG. 1O, the terminal may include a radio frequency (RF) processor 1*o*-10, a baseband processor 1*o*-20, a storage 1*o*-30, and a controller 1*o*-40.

The RF processor 1*o*-10 may perform functions for transmitting or receiving signals through wireless channels, such as band conversion and amplification of signals. For example, the RF processor 1*o*-10 may up-convert a baseband signal provided from the baseband processor 1*o*-20 into an RF band signal and transmit the same through an antenna and may down-convert an RF band signal received through the antenna into a baseband signal. For example, the RF processor 1*o*-10 may include a transmission filter, a reception filter, an amplifier, a mixer, an oscillator, a digital-to-analog converter (DAC), and an analog-to-digital converter (ADC). Although only one antenna is illustrated in FIG. 1O, the terminal may include a plurality of antennas. In addition, the RF processor 1*o*-10 may include a plurality of RF chains. In addition, the RF processor 1*o*-10 may perform beamforming. For beamforming, the RF processor 1*o*-10 may adjust the phase or magnitude of each of the signals transmitted/received through a plurality of antennas or antenna elements. In addition, the RF processor 1*o*-10 may perform multiple-input multiple-output (MIMO) and may receive multiple layers when performing a MIMO operation. Under the control of the controller, the RF processor 1*o*-10 may perform reception beam sweeping by suitably configuring a plurality of antennas or antenna elements or may adjust the direction and width of a reception beam so that the reception beam may be coordinated with a transmission beam.

The baseband processor 1*o*-20 may perform a conversion function between a baseband signal and a bit string according to the physical layer standard of the system. For example, during data transmission, the baseband processor 1*o*-20 may generate complex symbols by encoding or modulating a transmission bit string. In addition, during data reception, the baseband processor 1*o*-20 may restore a reception bit string by demodulating or decoding the baseband signal provided from the RF processor 1*o*-10. For example, according to an OFDM scheme, during data transmission, the baseband processor 1*o*-20 may generate complex symbols by encoding or modulating a transmission bit string, map the complex symbols to subcarriers, and then configure OFDM symbols through an inverse fast Fourier transform (IFFT) operation or cyclic prefix (CP) insertion. In addition, during data reception, the baseband processor 1*o*-20 may divide a baseband signal provided from the RF processor 1*o*-10 into OFDM symbol units, restore signals mapped to the subcarriers through a fast Fourier transform (FFT) operation, and then restore a reception bit string through demodulation or decoding.

The baseband processor 1*o*-20 or the RF processor 1*o*-10 may transmit or receive signals as described above. Accordingly, the baseband processor 1*o*-20 or the RF processor 1*o*-10 may be referred to as a transmitter, a receiver, a transceiver, or a communicator. In addition, at least one of the baseband processor 1*o*-20 or the RF processor 1*o*-10 may include a plurality of communication modules to support a plurality of different radio access technologies. In addition, at least one of the baseband processor 1*o*-20 or the RF processor 1*o*-10 may include different communication modules to process signals of different frequency bands. For example, the different radio access technologies may include LTE networks, NR networks, and the like. In addition, the different frequency bands may include a super high frequency (SHF) (e.g., 2.5 GHz or 5 GHz) band and a millimeter wave (e.g., 60 GHz) band. The terminal may transmit/ receive signals to/from the base station by using the baseband processor 1o-20 and the RF processor 1o-10. Here, the signals may include control information and data.

The storage 1o-30 may store data, such as a basic program, an application program, or configuration information for operation of the terminal. The storage 1o-30 may provide the stored data at the request of the controller 1o-40, and the storage 1o-30 may include a storage medium or any combination of storage mediums, such as ROMs, RAMs, hard disks, CD-ROMs, and DVDs. In addition, the storage 1o-30 may include a plurality of memories.

The controller 1o-40 may control overall operations of the terminal. For example, the controller 1o-40 may transmit/receive signals through the baseband processor 1o-20 and the RF processor 1o-10. In addition, the controller 1o-40 may write/read data into/from the storage 1o-30. For this purpose, the controller 1o-40 may include at least one processor (e.g., a multiple connection processor 1o-42). For example, the controller 1o-40 may include a communication processor (CP) for performing control for communication or an application processor (AP) for controlling an upper layer, such as an application program.

Figure 1P:
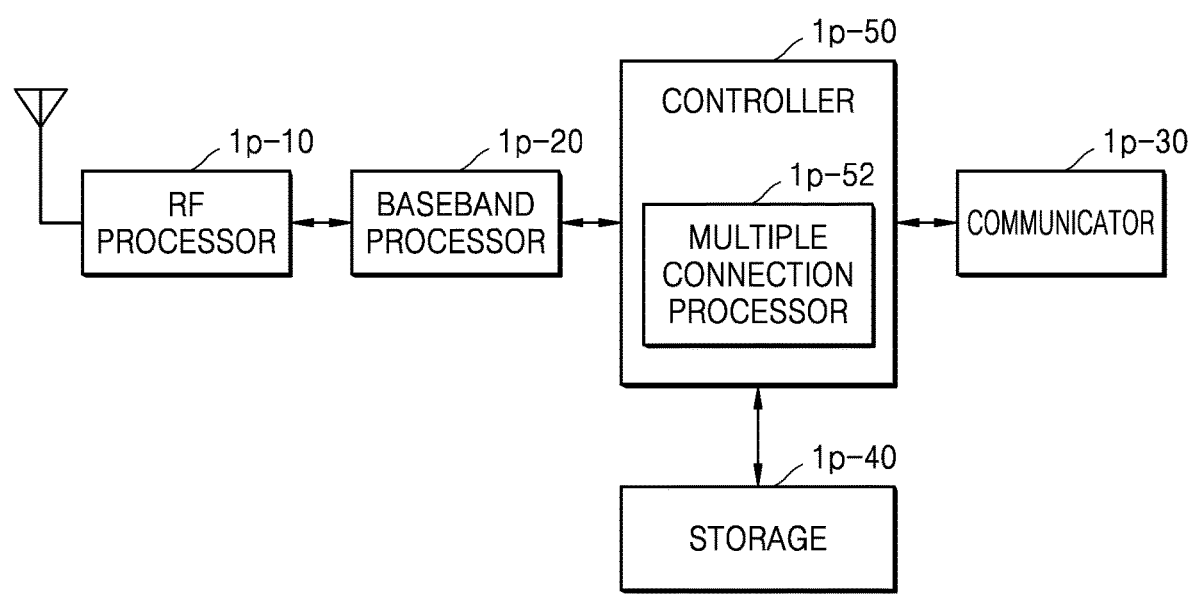
FIG. 1P is a block diagram of a transmission reception point (TRP) in a wireless communication system according to an embodiment of the disclosure.

FIG. 1P is a block diagram of a transmission reception point (TRP) apparatus in a wireless communication system according to an embodiment of the disclosure.

Referring to FIG. 1P, according to an embodiment of the disclosure, the TRP may be a base station. However, the disclosure is not limited thereto, and the TRP may be an entity in a network capable of transmission and reception. Referring to FIG. 1P, the base station may include an RF processor 1p-10, a baseband processor 1p-20, a communicator 1p-30, a storage 1p-40, and a controller 1p-50.

The RF processor 1p-10 may perform functions for transmitting/receiving signals through wireless channels, such as band conversion and amplification of signals. For example, the RF processor 1p-10 may up-convert a baseband signal provided from the baseband processor 1p-20 into an RF band signal and transmit the same through an antenna and may down-convert an RF band signal received through the antenna into a baseband signal. For example, the RF processor 1p-10 may include a transmission filter, a reception filter, an amplifier, a mixer, an oscillator, a DAC, and an ADC. Although only one antenna is illustrated in FIG. 1P, the base station may include a plurality of antennas. In addition, the RF processor 1p-10 may include a plurality of RF chains. In addition, the RF processor 1p-10 may perform beamforming. For beamforming, the RF processor 1p-10 may adjust the phase or magnitude of each of the signals transmitted/received through a plurality of antennas or antenna elements. The RF processor 1p-10 may perform a downlink MIMO operation by transmitting one or more layers.

The baseband processor 1p-20 may perform a conversion function between a baseband signal and a bit string according to the physical layer standard of the radio access technology. For example, during data transmission, the baseband processor 1p-20 may generate complex symbols by encoding or modulating a transmission bit string. In addition, during data reception, the baseband processor 1p-20 may restore a reception bit string by demodulating or decoding the baseband signal provided from the RF processor 1p-10. For example, according to the OFDM scheme, during data transmission, the baseband processor 1p-20 may generate complex symbols by encoding or modulating a transmission bit string, map the complex symbols to sub-carriers, and then configure OFDM symbols through an IFFT operation or CP insertion. In addition, during data reception, the baseband processor 1p-20 may divide a baseband signal provided from the RF processor 1p-10 into OFDM symbol units, restore signals mapped to the subcarriers through an FFT operation, and then restore a reception bit string through demodulation or decoding. The baseband processor 1p-20 or the RF processor 1p-10 may transmit or receive signals as described above. Accordingly, the baseband processor 1p-20 or the RF processor 1p-10 may be referred to as a transmitter, a receiver, a transceiver, a communicator, or a wireless communicator.

The communicator 1p-30 may provide an interface for communicating with other nodes in the network. The base station may transmit/receive signals to/from the terminal by using the baseband processor 1p-20 and the RF processor 1p-10. Here, the signals may include control information and data. In addition, according to an embodiment of the disclosure, the communicator 1p-30 may be a backhaul communicator.

The storage 1p-40 may store data, such as a basic program, an application program, or configuration information for operation of the base station. Particularly, the storage 1p-40 may store information about a bearer allocated to a connected terminal, a measurement result reported from the connected terminal, or the like. In addition, the storage 1p-40 may store information that is a reference for determining whether to provide or terminate a multiple connection to the terminal. In addition, the storage 1p-40 may provide the stored data at the request of the controller 1p-50. The storage 1p-40 may include a storage medium or any combination of storage mediums, such as ROMs, RAMs, hard disks, CD-ROMs, and DVDs. In addition, the storage 1p-40 may include a plurality of memories.

The controller 1p-50 may controls overall operations of the main base station. For example, the controller 1p-50 may transmit/receive signals through the baseband processor 1p-20 and the RF processor 1p-10 or through the communicator 1p-30. In addition, the controller 1p-50 may write/read data into/from the storage 1p-40. For this purpose, the controller 1p-50 may include at least one processor (e.g., a multiple connection processor 1p-52).

The methods according to the embodiments of the disclosure described in the specification or the claims may be implemented by hardware, software, or a combination thereof.

When the methods are implemented by software, a computer-readable storage medium may be provided to store one or more programs (software modules). The one or more programs stored in the computer-readable storage medium may be configured for execution by one or more processors in an electronic device. The one or more programs may include instructions for causing the electronic device to execute the methods according to the embodiments of the disclosure described in the specification or the claims.

These programs (software modules or software) may be stored in random access memories (RAMs), nonvolatile memories including flash memories, read only memories (ROMs), electrically erasable programmable ROMs (EEPROMs), magnetic disc storage devices, compact disc-ROMs (CD-ROMs), digital versatile discs (DVDs), other types of optical storage devices, or magnetic cassettes. Alternatively, the programs may be stored a memory including any combination of some or all thereof. In addition, each of the memories may be provided in plurality.

In addition, the programs may be stored in an attachable storage device that may be accessed through a communication network, such as Internet, Intranet, local area network (LAN), wide LAN (WLAN), or storage area network (SAN), or through a communication network configured as any combination thereof. Such a storage device may be connected through an external port to an apparatus performing an embodiment of the disclosure. In addition, a separate storage device on a communication network may be connected to an apparatus performing an embodiment of the disclosure.

In the above particular embodiments of the disclosure, the components included in the disclosure are expressed in the singular or plural according to the presented particular embodiments of the disclosure. However, the singular or plural expressions are selected suitably according to the presented situations for convenience of description, the disclosure is not limited to the singular or plural components, and the components expressed in the plural may even be configured in the singular or the components expressed in the singular may even be configured in the plural.

According to an embodiment of the disclosure, it is possible to provide a dormant mode in which an RRC connected mode terminal establishing a connection with a network may rapidly activate and deactivate the carrier aggregation technology in a mobile communication system. By proposing a method of operating a dormant (or hibernation) mode in BWP units (BWP-level), the carrier aggregation technology may be rapidly activated and the battery of the terminal may be saved.

It should be understood that the embodiments of the disclosure described herein should be considered in a descriptive sense only and not for purposes of limitation. For example, it will be understood by those of ordinary skill in the art that various changes in form and details may be made in the embodiments of the disclosure without departing from the scope of the disclosure. In addition, the embodiments of the disclosure may be operated in combination when necessary. For example, the base station and the terminal may be operated according to a combination of portions of an embodiment and another embodiment of the disclosure. In addition, other modifications based on the technical concept of the above embodiments may be implemented in various systems, such as FDD LTE systems, TDD LTE systems, or 5G or NR systems.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A terminal for managing a bandwidth part in a wireless communication system, the terminal comprising:
   a transceiver; and
   at least one processor configured to:
      receive, from a base station, a radio resource control (RRC) message including bandwidth part (BWP) configuration information, wherein based on the BWP configuration information, a first BWP is configured with a first active BWP activated from dormancy and a second BWP is configured with a dormant BWP,
      receive, from the base station, downlink control information (DCI) including a bitmap, wherein a bit of the bitmap indicates which BWP is activated as a downlink (DL) BWP with respect to a secondary cell (SCell) group among at least one S Cell group,
      when a value of the bit of the bitmap is 0, determine an active DL BWP configured for at least one SCell belonging to the SCell group corresponding to the bit as the second BWP, and
      when the value of the bit of the bitmap is 1:
         identify whether a current active DL BWP configured for the at least one SCell is the second BWP,
         when the current active DL BWP is the second BWP, set the active DL BWP to the first BWP, and
         when the current active DL BWP is not the second BWP, determine to maintain the current active DL BWP,
   wherein each bit of the bitmap corresponds to each of the at least one S Cell group in ascending order of a group identifier indicating each of the at least one SCell group from most significant bit (MSB) to least significant bit (LSB).

2. The terminal of claim 1, wherein bits of the bitmap are respectively mapped to SCells belonging to one cell group.

3. The terminal of claim 1, wherein, when the DCI is transmitted as a first format to one or more terminals via a wake up signal, the DCI is identified based on power saving radio network temporary identity (PS-RNTI).

4. The terminal of claim 1, wherein, when the DCI is transmitted as a second format to the terminal on discontinuous reception (DRX) active time, the DCI is identified based on cell radio network temporary identity (C-RNTI), configured scheduling RNTI (CS-RNTI), semi-persistent channel state information RNTI (SP-CSI-RNTI) or modulation coding scheme cell RNTI (MCS-C-RNTI).

5. The terminal of claim 1, wherein the at least one processor is further configured to:
   identify, on discontinuous reception (DRX) active time, the DCI of a third format based on cell radio network temporary identity (C-RNTI) or modulation coding scheme cell RNTI (MCS-C-RNTI),
   identify that all bits of a frequency domain resource assignment field are equal to 0 or 1, and
   determine that a subsequent field is a bitmap associated with SCell dormancy when the all bits of the frequency domain resource assignment field are equal to 0 or 1,
   wherein the subsequent field includes a modulation and coding scheme field, a new data indicator field, a redundancy version field, a hybrid automatic repeat request (HARQ) process number filed, an antenna port field, and a demodulation reference signal (DMRS) sequence initialization field.

6. A base station for managing a bandwidth part in a wireless communication system, the base station comprising:
   a transceiver; and
   at least one processor configured to:
      transmit, to a terminal, a radio resource control (RRC) message including bandwidth part (BWP) configuration information, wherein based on the BWP configuration information, a first BWP is configured with a first active BWP activated from dormancy and a second BWP is configured with a dormant BWP, and
      transmit, to the terminal, downlink control information (DCI) including a bitmap, wherein a bit of the bitmap indicates which BWP is activated as a downlink (DL) BWP with respect to a secondary cell (SCell) group among at least one SCell group,
   wherein, when a value of the bit of the bitmap is 0, the bit indicates that an active DL BWP configured for at least one SCell belonging to the SCell group corresponding to the bit is the second BWP, wherein, when the value of the bit of the bitmap is 1 and a current active DL BWP configured for the at least one SCell is the second BWP, the bit indicates that the active DL BWP is the first BWP, wherein, when the value of the bit of the bitmap is 1 and the current active DL BWP is not the second BWP, the bit indicates that the current active DL BWP is maintained, and wherein each bit of the bitmap corresponds to each of the at least one SCell group in ascending order of a group identifier indicating each of the at least one SCell group from most significant bit (MSB) to least significant bit (LSB).

7. The base station of claim 6, wherein bits of the bitmap are respectively mapped to SCells belonging to one cell group.

8. The base station of claim 6, wherein, when the DCI is transmitted as a first format to one or more terminals via a wake up signal, the DCI is identified based on power saving radio network temporary identity (PS-RNTI).

9. The base station of claim 6, wherein, when the DCI is transmitted as a second format to the terminal on discontinuous reception (DRX) active time, the DCI is identified based on cell radio network temporary identity (C-RNTI), configured scheduling RNTI (CS-RNTI), semi-persistent channel state information RNTI (SP-CSI-RNTI) or modulation coding scheme cell RNTI (MCS-C-RNTI).

10. The base station of claim 6,
wherein, when the DCI is transmitted as a third format to the terminal on discontinuous reception (DRX) active time, the DCI is identified based on cell radio network temporary identity (C-RNTI), or modulation coding scheme cell RNTI (MCS-C-RNTI),
wherein all bits of a frequency domain resource assignment field are equal to 0 or 1,
wherein a subsequent field is determined as a bitmap associated with SCell dormancy when the all bits of the frequency domain resource assignment field are equal to 0 or 1, and
wherein the subsequent field includes a modulation and coding scheme field, a new data indicator field, a redundancy version field, a hybrid automatic repeat request (HARQ) process number filed, an antenna port field, and a demodulation reference signal (DMRS) sequence initialization field.

11. A method, performed by a terminal, for managing a bandwidth part in a wireless communication system, the method comprising:
receiving, from a base station, a radio resource control (RRC) message including bandwidth part (BWP) configuration information, wherein based on the BWP configuration information, a first BWP is configured with a first active BWP activated from dormancy and a second BWP is configured with a dormant BWP;
receiving, from the base station, downlink control information (DCI) including a bitmap, wherein a bit of the bitmap indicates which BWP is activated as a downlink (DL) BWP with respect to a secondary cell (SCell) group among at least one SCell group;
when a value of the bit of the bitmap is 0, determining an active DL BWP configured for at least one SCell belonging to the SCell group corresponding to the bit as the second BWP; and when the value of the bit of the bitmap is 1:
identifying whether a current active DL BWP configured for the at least one SCell is the second BWP,
when the current active DL BWP is the second BWP, setting the active DL BWP to the first BWP, and
when the current active DL BWP is not the second BWP, determining to maintain the current active DL BWP,
wherein each bit of the bitmap corresponds to each of the at least one S Cell group in ascending order of a group identifier indicating each of the at least one SCell group from most significant bit (MSB) to least significant bit (LSB).

12. The method of claim 11, further comprising:
identifying, on discontinuous reception (DRX) active time, the DCI of a third format based on cell radio network temporary identity (C-RNTI) or modulation coding scheme cell RNTI (MCS-C-RNTI);
identifying all bits of a frequency domain resource assignment field are equal to 0 or 1; and
determining that a subsequent field is a bitmap associated with SCell dormancy when the all bits of the frequency domain resource assignment field are equal to 0 or 1,
wherein the subsequent field includes a modulation and coding scheme field, a new data indicator field, a redundancy version field, a hybrid automatic repeat request (HARQ) process number filed, an antenna port field, and a demodulation reference signal (DMRS) sequence initialization field.

13. A method, performed by a base station, for managing a bandwidth part in a wireless communication system, the method comprising:
transmitting, to a terminal, a radio resource control (RRC) message including bandwidth part (BWP) configuration information, wherein based on the BWP configuration information, a first BWP is configured with a first active BWP activated from dormancy and a second BWP is configured with a dormant BWP; and
transmitting, to the terminal, downlink control information (DCI) including a bitmap, wherein a bit of the bitmap indicates which BWP is activated as a downlink (DL) BWP with respect to a secondary cell (SCell) group among at least one SCell group,
wherein, when a value of the bit of the bitmap is 0, the bit indicates that an active DL BWP configured for at least one SCell belonging to the SCell group corresponding to the bit is the second BWP,
wherein, when the value of the bit of the bitmap is 1 and a current active DL BWP configured for the at least one SCell is the second BWP, the bit indicates that the active DL BWP is the first BWP,
wherein, when the value of the bit of the bitmap is 1 and the current active DL BWP is not the second BWP, the bit indicates that the current active DL BWP is maintained, and
wherein each bit of the bitmap corresponds to each of the at least one S Cell group in ascending order of a group identifier indicating each of the at least one SCell group from most significant bit (MSB) to least significant bit (LSB).

* * * * *